United States Patent [19]

Shiga et al.

[11] Patent Number: 4,973,896
[45] Date of Patent: Nov. 27, 1990

[54] AUTOMOBILE GENERATOR APPARATUS

[75] Inventors: Naomichi Shiga; Hisatoshi Tsuchiya, both of Numazu; Yasuyuki Sakakibara, Fuji; Katsumi Kibe, Atami, all of Japan

[73] Assignee: Toyo Densan Company, Ltd., Numazu, Japan

[21] Appl. No.: 260,918

[22] Filed: Oct. 21, 1988

[30] Foreign Application Priority Data

| Oct. 21, 1987 | [JP] | Japan | 62-264000 |
| Oct. 21, 1987 | [JP] | Japan | 62-264001 |
| Feb. 26, 1988 | [JP] | Japan | 63-42214 |
| Apr. 5, 1988 | [JP] | Japan | 63-82166 |
| Apr. 6, 1988 | [JP] | Japan | 63-83028 |
| Jun. 1, 1988 | [JP] | Japan | 63-71778[U] |
| Jun. 30, 1988 | [JP] | Japan | 63-160648 |
| Jun. 30, 1988 | [JP] | Japan | 63-160649 |
| Aug. 30, 1988 | [JP] | Japan | 63-213666 |

[51] Int. Cl.$^5$ .................. H02J 7/14; H02P 9/30
[52] U.S. Cl. .................. 322/28; 290/40 C; 307/16; 322/90
[58] Field of Search .......... 322/28, 38, 89, 90; 290/40 B, 40 C; 307/16

[56] References Cited

U.S. PATENT DOCUMENTS

| 3,267,353 | 8/1966 | Franklin | 322/90 |
| 4,322,630 | 3/1982 | Mezera et al. | 290/40 C |
| 4,661,761 | 4/1987 | Katsumata | 322/38 X |
| 4,682,044 | 7/1987 | Hotate et al. | 290/40 C X |
| 4,694,238 | 9/1987 | Norton | 322/90 X |
| 4,751,629 | 6/1988 | Shimizu et al. | 322/1 X |

*Primary Examiner*—R. J. Hickey
*Attorney, Agent, or Firm*—Oblon, Spivak, McClelland, Maier & Neustadt

[57] ABSTRACT

An automobile generator apparatus for producing commercial line power when driven by an automobile engine comprises a generator, an inverter unit, a controller for controlling the generator field and an accelerator actuator.

The accelerator actuator is mounted opposite the accelerator pedal in such manner as to prevent erroneous operation thereof.

The generator field is controlled while monitoring both the low-voltage side output and the high-voltage side output so as to prevent a large output current from flowing through the low-voltage side load. A circuit is further provided for preventing the occurrence of an overvoltage as a result of field control transistor malfunction.

The switching elements constituting the output stage of the inverter unit are controlled to vary the duty ratio of the output waveform so as to stabilize the inverter output voltage and controlled to remove the center portion of the output waves so as to cope with the startup load.

The inverter unit is also provided with an improved constant voltage circuit.

There is further provided a synchronized operation control for combining the outputs of a plurality of automobile generator apparatuses.

The generator is a single-shaft, dual-output type wherein the windings of the high-voltage side coils are disposed at the bottom of slots in the stator while the windings of the low-voltage side coils are disposed near the entrance of the slots.

21 Claims, 45 Drawing Sheets

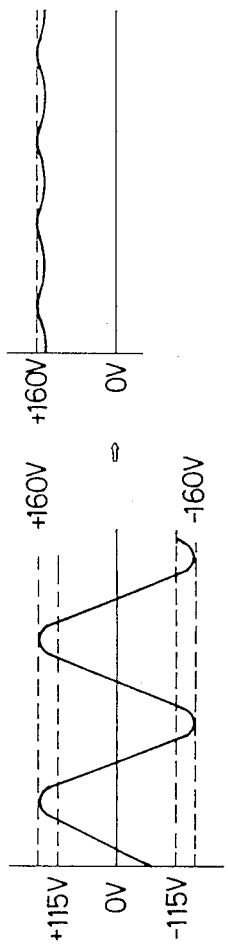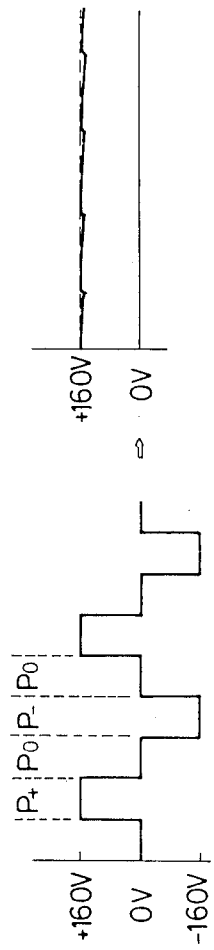

AUTOMOBILE GENERATOR APPARATUS

BACKGROUND OF THE INVENTION

1. Field of the Invention

This invention relates to an automobile generator apparatus driven by an automobile engine, for producing electric power equivalent to ordinary household ac line power.

2. Prior Art Statement

There have been proposed various automobile generator apparatuses for producing the equivalent of household ac line power (referred to hereinafter as "ac line power") by using an automobile engine as a power source. One example of such an apparatus is the internal combustion engine-driven generator apparatus disclosed in Japanese Utility Model Public Disclosure No. SHO 59-132398. As shown in the block diagram of FIG. 60, in this prior art system the output from an ac generator 150 driven by an internal combustion engine is supplied to a rectifier circuit 151 which converts it into dc current and the dc output from the rectifier circuit 151 is converted to ac line power by an invertor circuit 152. The invertor circuit 152 is controlled by the output from an oscillator 154 which is supplied with a constant voltage from a constant voltage circuit 153.

However, the aforesaid publication describes only the basic construction of the apparatus in terms of well-known means commonly used in generator apparatuses of this type and is totally silent on such specifics as the method used for adjusting the power output in response to the ac load, the method used for stabilizing the ac line power output, and what type of countermeasures are implemented when an excessively high output voltage is produced.

In fact, however, in the generator apparatus set out in the aforesaid publication, or for that matter in any automobile generator of this type, it is essential to ensure the output of a stable, high-quality ac line power at all times regardless of whether the automobile is stopped (when the engine is idling) or running and irrespective of the size of the ac load. This is the first problem requiring attention.

Moreover, for assuring production of an ac line power output adequate for the load when the automobile is stopped, it is not sufficient to merely provide the throttle mechanism with an actuator for increasing the throttle valve opening angle produced by the throttle lever, but in view of the fact that malfunctioning of the actuator when the vehicle is running could well lead to a serious accident, it is further necessary to provide measures to cope with such a case. This is the second issue requiring attention.

Further, where an invertor is used for producing the ac line power, there is the risk of residual energy stored by the capacitance between the emitter and collector of the switching transistor being discharged to the ac load, or, in the case wither the ac load is an inductive load, the risk that electromagnetic energy stored in the load will discharge to produce a high-voltage output. While the conventional way used to alleviate these problems has been to insert a bleeder resistor in parallel with the ac load, this is an inefficient expedient since electric power is constantly consumed by the bleeder resistor. This is the third problem requiring attention.

While generators to be driven by an engine are generally of the self-exiting type which are capable of field adjustment, it is preferable for saving under-hood space and realizing a simpler mechanical arrangement to use a single-shaft, dual-output generator system. In some single-shaft, dual-output generators the low-voltage output is derived from the center tap of star-connected stator coils and the high-voltage output taken from the ends of the coils, with both outputs being controllable by controlling the field produced by a single field coil. In generators of the single-shaft, dual-output type having a single stator coil, the general practice is to monitor the low-voltage output and, when the low voltage decreases, to restore it to its original level by increasing the flow of exciting current through the field coil to thereby boost the low-voltage output. With this control method, however, the high-voltage output, which is output as including the low-voltage output, is affected by the increase in the low-voltage output and is apt to rise considerably above the permissible maximum. This is the fourth problem requiring attention.

Again, where the ac load connected to the invertor is relatively large or complex, it sometimes happens that the invertor will be subject to an instantaneous overload and the invertor switching transistor, which is easily damaged by instantaneous large currents, may be destroyed. While the conventional way of avoiding such overload situations has generally been to provide an overcurrent protection circuit, this leads to the problem that the output of the invertor circuit is stopped not only at the start of operation but every time during the course of operation that the load becomes momentarily large. This is the fifth problem requiring attention.

There has also been a problem regarding the low-voltage output. In a generator, when the amount of current becomes higher than the rated level, the amount of magnetic leakage becomes large. When the amount of current rises over a certain level, the produced voltage drops off automatically. This is called the self-drooping characteristic of the generator and in a generator exclusively for generating a low-voltage dc output, occurs from around 600 to 700 VA. On the low-voltage side it therefore suffices to use circuit components with a rated current capacity of around 60 A. In the case of the aforementioned single-shaft, dual-output generator having only a single stator coil, however, since it is necessary to take a large amount of power from the generator for use as the ac line power, the current capacity is on the order of 3 kVA, and self-drooping arises from above 3 kVA. Thus in this type of generator, if field control is carried out solely with reference to the monitored low-voltage output, the current flow through the low-voltage side circuit will become larger than necessary at the time the load falls to zero on the high-voltage side. This means that the low-voltage side must be constituted as a circuit capable of standing up under large amounts of power. As a result, a high-capacity rectification diode has to be used on the low-voltage side and it becomes necessary to use a large heat sink for heat dissipation and a large cooling fan. It also becomes necessary to use wire with a large cross-sectional area for the stator coil. The overall result is that the size of the generator becomes large. This is the sixth problem requiring attention.

Still another problem exists in connection with the switching regulator that has conventionally been inserted between rectifier circuit and the invertor circuit for the purpose of stabilizing the ac line power output from the inverter circuit. Namely, this switching regulator requires a smoothing filter comprising a choke coil and a capacitor as well as a diode for effectively discharging the energy stored in the choke coil to the load. However, from the fact that the ac line power output has to be on the order of several KVA, it is obvious that these components have to be of a large capacity permitting the flow of large currents. This again increases the size of the apparatus, making it unsuitable for use in an automobile. This is the seventh problem requiring attention.

It must also be noted that the field current through the aforesaid field coil is controlled by a regulator unit and that this regulator unit has a control transistor connected in series with the field coil. This control transistor is driven to control the field current upon receiving a signal representing the generator output voltage. However, if some problem should occur with this control transistor resulting in its collector and emitter becoming fused together in an electrically conductive state, current would pass constantly through the field coil with the very dangerous result that an exceedingly high voltage would be produced. This is the eighth problem requiring attention.

Furthermore, it may sometimes be desired to obtain a larger amount of ac line power than can be output by a single automobile generator apparatus. This can be accomplished by combining the outputs of two or more ac power sources only on the condition that the voltage maximum is substantially the same in the voltage waves of all ac power sources and that the outputs of the respective power sources are of the same frequency and phase. It is thus not possible to obtain the desired large amount of ac power simply by connecting in parallel generator systems of tow or more automobiles. This is the ninth problem requiring attention.

Furthermore, in a single-shaft, dual-output generator of the type mentioned above which provides low-and high-voltage outputs with a stator having a center tap, if the first coil and second coil divided by the center tap are simply wound together in the same slot, the fields produced by the two coils will interfere with each other, reducing the generation efficiency and giving rise to the risk that a voltage exceeding the rated level may be produced when there is no load on the high-voltage side. This is the tenth problem requiring attention.

Also, in a single-shaft, dual-output generator having a plurality of field members, the rotor becomes long because the plurality of members are disposed in a line in the axial direction and this in turn makes the axial length of the armature shaft great. As a result, the iron core of the armature becomes large. This increases the size and weight of the generator and makes it unsuitable as an automobile generator, which by nature must be light and compact. Moreover, when the armature coil is wound continuously on an axially long iron core, air is prevented from circulating between the windings of the armature coil so that the armature coil is not adequately cooled. This is the eleventh problem requiring attention.

OBJECT AND SUMMARY OF THE INVENTION

The above and other features of the present invention will become apparent from the following description made with reference to the drawings.

The first object of the invention is to overcome the first problem mentioned above and to provide an automobile generator apparatus capable of producing ac line power which remains stable irrespective of the running/standing state of the automobile and of the size of the load.

For achieving this object, the present invention provides an automobile generator apparatus consisting of a generator disposed within an automobile and driven by the engine thereof, an inverter electrically connected to the generator for converting the frequency of the voltage produced by the generator to that of household ac line power, a controller unit electrically connected with the generator for supplying control field current to the generator for adjusting the voltage produce by the generator to a constant value, and a current sensor provided in the circuit between the generator and the inverter unit and electrically connected with the controller unit, the electric power produced by the generator being supplied to the invertor unit to provide a source of electric power for outside utilization, the signal from the current sensor being supplied to the controller unit as a detected inverter unit load current signal, a detected voltage signal being supplied to the controller from the generator, and the controller unit controlling the field of the generator on the basis of the detected inverter load current signal and the detected voltage signal.

Moreover, the invention provides an automobile generator apparatus further provided with an accelerator actuator operated by the controller unit, wherein the controller unit receives the aforesaid signals and in response thereto drives the actuator to control the rotation speed of the automobile engine.

With this arrangement, since the controller which receives the aforesaid signals controls both the magnetic field of the generator and the rotation speed of the engine, it becomes possible to realize a stable source of ac line power under all operating conditions.

The second object of the invention is to overcome the second problem mentioned above and to provide an automobile generator apparatus wherein measures are implemented to prevent malfunctioning of an accelerator actuator for increasing the speed of rotation of the automobile engine at the time the automobile is stopped so as ensure the desired ac line power output.

For achieving this object, the present invention provides an automobile generator system further comprising an accelerator actuator which controls the accelerator pedal of the automobile by varying the position of an operator in response to a signal received from the aforesaid controller unit, the accelerator actuator being detachably fixed on a mount provided in the vicinity of the accelerator pedal. This arrangement ensures increased safety during driving of the automobile because the operator can detach the accelerator actuator from the mount as required.

Moreover, the invention provides an automobile generator apparatus provided with an accelerator actuator having a rotating arm one end of which is pivotally attached to a base member positioned above the accelerator pedal and the other free end of which has a eccentric cam, the rotating arm being rotated down onto the accelerator pedal when electric power is to be generated when the automobile is stationary. With this arrangement, there is no risk of malfunction since when the automobile is being driven the accelerator actuator can be rotated upward to a position apart from the accelerator pedal.

The third object of the invention is to overcome the third problem mentioned above and to provide an automobile generator apparatus wherein no abnormally high voltage is produced in the ac output by residual energy stored in the output stage switching transistors of the inverter unit or by electromagnetic energy stored in any inductive load.

For achieving this object, this invention provides an automobile generator apparatus wherein, in the output stage of the aforesaid inverter unit, a series circuit constituted of first and second switching elements and a series circuit constituted of third and fourth switching circuits are connected in parallel between the terminals of a dc power source, the load is inserted between the point of connection of the first and second switching elements and the point of connection of the third and fourth switching elements, a first conduction period is established by turning on the first switching element and the fourth switching element to form a first closed circuit from one terminal of the dc power source through the first switching element, the load, and the fourth switching element to the other terminal of the dc power source, a second conduction period is established by turning on the second switching element and the third switching element to form a second closed circuit from one terminal of the dc power source through the second switching element, the load, and the third switching element to the other terminal of the dc power source, establishing rest periods during which neither the first closed circuit nor the second closed circuit is established, the occurrence in order of the first conduction period, a rest period, the second conduction period, a rest period is defined as a unit cycle, and the inverter unit is driven in the manner of a single-phase inverter by repeating the unit cycle at a predetermined frequency, the second and fourth switching elements being on during the rest period.

With this arrangement, since second first and fourth switching elements (which may, for example, be switched transistors) are both on during each rest period, the residual energy of the switching elements and the electromagnetic energy in any inductive load is discharged during each rest period, so that no abnormally high voltage is produced in the output.

The fourth object of the invention is to overcome the fourth problem mentioned above and to provide an automobile generator apparatus which eliminates the trouble conventionally encountered that the voltage of the ac line power output is likely to rise higher than permissible when the magnetic field is controlled with reference to the monitored low-voltage output supplied to the battery of the automobile.

For achieving this object, the invention provides an automobile generator apparatus wherein the aforesaid generator produces two or more voltages including a relatively high ac voltage and a relatively low ac voltage, the aforesaid controller unit is equipped with a regulator, the low ac voltage is rectified and the voltage of the resulting low dc voltage is detected, the regulator controls the current supplied to the field coil of the generator to maintain the low dc voltage constant, the high ac voltage or the dc output voltage of a rectifier circuit in the invertor unit is monitored, and in accordance with the monitored voltage the duty ratio relating to the on/off control of the switching elements in the output stage of the inverter unit is variably controlled.

With this arrangement, when the output voltage of the inverter threatens to become too high, the duty ratio is lowered so as to shorten the on-time of the switching elements in the invertor unit output stage, and when the output voltage of the invertor unit threatens to become too low, control is implemented to increase the aforesaid duty ratio, whereby a stable ac line power output can be obtained.

The fifth object of this invention is to overcome the fifth problem mentioned above and to provide an automobile generator apparatus wherein temporary control of the ac output current is achieved at the time an overcurrent condition arises in the inverter unit by removing the center portions of the squarewaves in the invertor unit output waveform.

By removing the center portions of the squarewaves output by the inverter can be realized a large current limiting effect with only a slight decrease in the output voltage, whereby it becomes unnecessary to momentarily stop the inverter output as has conventionally been done at the time of an overload.

The sixth object of this invention is to overcome the sixth problem mentioned above and to provide an automobile generator apparatus employing a generator of the single-shaft, dual-output type designed for supplying ac line power, wherein there is no need for the low-voltage side circuit to be constituted of circuit components rated to withstand overcurrents and, moreover, which is capable of preventing burn-out of wires and other load side components owing to the supply of low-voltage load current in excess of the rated level.

This object is realized by providing an automobile generator apparatus wherein protection of the low-voltage side circuit for supplying a low-voltage output to the automobile battery is achieved not by current limitation relying on the intrinsic self-drooping characteristic of the generator but by a more positive current limiting countermeasure according to the control method described in the following.

The aforesaid method is one for controlling a multi-voltage generator wherein at least one first coil for producing a relatively high-voltage output is divided into second and third coils by a center tap thereof, at least one of the second and third coils is used for outputting a relatively high voltage, and causing the magnetic field flux produced by a field coil wound on a single rotor to act in common on all of the aforesaid coils and is characterized in that the value of the low-voltage output current through the low-voltage output terminal of the multi-voltage generator is either directly detected or detected indirectly from the high voltage appearing at the high-voltage output terminal, that, up to the time that the detected value of the low-voltage output current exceeds a prescribed level, the value of the low-voltage output appearing at the low-voltage output terminal is detected and monitored and the current supplied to the field coil is controlled to maintain the value of the low-voltage output constant, and that, from the time that the detected value of the low-voltage output current exceeds the prescribed level, the high-voltage output appearing at the high-voltage output terminal is instead detected and monitored and current supplied to the field coil is controlled to maintain the value of the high-voltage output constant.

Differently from the conventional method relying solely on the self-drooping characteristic of the generator, in the present control method the low-voltage output current is also positively measured so that there is no risk of excessive current flowing in the low-voltage side circuit and thus no need to constitute this circuit of circuit components rated to withstand overcurrents.

The seventh object of this invention is similar to the fourth object and specifically is to overcome the seventh problem mentioned above and to provide an automobile generator apparatus wherein the invertor unit can be made light and compact and thus highly suitable for installation in an automobile.

For achieving this object, the present invention provides an automobile generator apparatus equipped with an invertor unit wherein the constant voltage stabilization circuit provided between the rectification circuit for rectifying the high-voltage output from the generator and the switching output stage for converting the rectified output to ac line power is constituted as a single switching transistor inserted in series with the main circuit.

With this arrangement, voltage input to the main circuit is chopped by the on/off operation of the switching transistor inserted in the main circuit, whereby the output voltage can be controlled to the rated value. As the switching transistor is connected in parallel with the main circuit, the output impedance of the generator becomes high. As a result, no current is shorted trough the capacitor, making provision of a choke coil and a diode unnecessary.

The eighth object of this invention is to overcome the eighth problem mentioned above and to provide an automobile generator apparatus wherein an excessively large output voltage will not be produced even if the control transistor of the regulator unit for controlling the field current should break down.

For achieving this object, the present invention provides an automobile generator apparatus wherein a shorting circuit is connected in parallel with the field coil within a generator having a control transistor for controlling field current connected in series therewith, and a voltage detection circuit is provided for detecting the voltage produced by the generator and outputting an excessive voltage signal when the detected voltage reaches an excessively high level, the production of an excessively high voltage being prevented by applying the excessive voltage signal output by the voltage detection circuit to the shorting circuit for causing it to establish a short circuit between the opposite ends of the field coil.

With this arrangement, even if a malfunction of the control transistor should result in sustained flow of field current and the output from the generator of an excessively high voltage, the excessively high voltage will be detected by the voltage detection circuit and the output of the voltage detection circuit will operate the shorting circuit to establish a short circuit between the opposite ends of the field coil.

As this will cause the current that had been flowing through the field coil to pass though the short circuit, flow of current through the field coil will be stopped and the control transistor will be destroyed by the large amount of short circuit current, thus establishing a safe electrically non-conductive state.

By deliberate destruction of the control transistor in this way, not only is continued flow of the short circuit current prevented but the field coil is electrically isolated. Thus no current flows through the field coil and the generation of an excessively high voltage is suppressed.

The ninth object of this invention is to overcome the ninth problem mentioned above and to provide an automobile generator apparatus which can be connected in parallel with one or more like automobile generator apparatuses, whereby there can be easily obtained a large supply of ac line power.

For achieving this object, the present invention provides an automobile generator apparatus equipped with a synchronized operation control device of the structure describe in the following.

In an automobile generator apparatus comprising a generator installed in an automobile and driven by the engine thereof, an inverter unit for converting the output from the generator into ac line power under the control of a frequency control signal from an internal frequency control unit and an accelerator actuator for automatically controlling the output of the engine in accordance with the load connected to the output terminals of the invertor unit, the aforesaid synchronized operation control device intended for synchronizing the operation of a plurality of like automobile generator apparatuses comprises an external frequency control unit for supplying a frequency control signal to the inverter unit during synchronized operation a switch means for selectively supplying to the inverter unit either the frequency control signal output by the internal frequency control unit or the frequency control signal output by the external frequency control unit, and an output connector for parallel connection of the output terminals of a plurality of inverter units, the switch means being switched during synchronized operation to supply the frequency control signal produced by the external frequency control unit to a plurality of inverter units, whereby the combined outputs of the plurality of inverter units can be obtained.

With the aforesaid synchronized operation control device of the automobile generator apparatus, during synchronized operation a plurality of invertor units in a like number of automobile generator apparatuses can be controlled in unison by a single frequency control signal supplied by the external frequency control unit. Therefore, the frequency and phase of the ac outputs at the terminals of the respective inverters can all be controlled to precisely the same frequency and phase.

Moreover, since the voltages output by the generators are all adjusted to one and the same level by the operation of the control units of the respective generators the ac voltages output by the respective inverters all have substantially the same voltage maximum.

Therefore, the combined output of all of the inverters units can be obtained as a large amount of ac line power from the output connector which the output terminals of the respective inverter units are connected in parallel.

The tenth object of this invention is to overcome the tenth problem mentioned above and to provide an automobile generator apparatus employing a single-shaft, dual-output generator wherein no voltage higher than the rated level occurs in the high-voltage side coil.

For achieving this purpose, there is provided an automobile generator apparatus using an automobile generator wherein windings of each of a plurality of coil pairs each consisting of a first coil and a second coil are inserted in the same slots in a stator core, the field produced by a rotor is caused to act in common on all coils, a first voltage is obtained from the first coils and a second voltage which is lower than the first voltage is obtained from the second coils, the present invention provides an automobile generator apparatus wherein the windings of the high-voltage side first coils are disposed at the bottom of the slots and the windings of the low-voltage side second coils are disposed near the entrance of the slots.

With this arrangement, during rotation of the rotor the same magnetic field acts on both the high-voltage side first coils and the low-voltage side second coils, which are inserted into the same slots of the stator core, whereby the coils of each type produce a voltage and two different voltages can be obtained from the coil terminals.

As the high-voltage side first coils are disposed at the bottom of the slot and the low-voltage side second coils are provided near the entrance of the slot, the magnetic flux acting on the low-voltage side coils and the magnetic flux acting on the high-voltage side coils become nearly identical, whereby the output voltage of the high-voltage side coil can be maintained constant even when the speed of rotation of the rotor is increased.

The eleventh object of the invention is to overcome the eleventh problem mentioned above and to provide an automobile generator apparatus with a generator which is of a size and weight suitable for installation in an automobile.

For achieving this object, using an automobile generator comprising a rotor having a plurality of N and S pole pieces appropriately spaced alternately in the circumferential direction thereof and a stator surrounding the rotor so as to face the stator across a slight gap, this invention provides an automobile generator apparatus wherein the rotor comprises two field members axially aligned in back-to-back relation, each field member being constituted of a plurality of N and S pole pieces appropriately spaced alternately in the circumferential direction thereof, two armatures are disposed to face the magnetic members across a slight gap, the two armatures are connected in the axial direction by a connector ring to form a stator, the lines of magnetic force passing through the two field member-armature pairs are made of opposite phase, and the armatures are wound with parallel first and second coils, whereby outputs of different voltages can be obtained from the first and second coils.

With this arrangement, when field current is passed through the field coils, the axially aligned field members will produce magnetic lines of force of opposite phase which will intersect the armature coils provided on the armatures associated with the field members, giving rise to electromotive forces in the armature coils. Moreover, the provision of the connector ring between the two armatures unifies the armatures and enables elimination of a part of the iron core of the armature.

The above and other features of the invention will become apparent from the following description made with reference to the drawings.

BRIEF DESCRIPTION OF THE DRAWINGS

FIG. 20(A) is a waveform diagram of ordinary ac line power and FIG. 20(B) is a waveform diagram of the same after rectification.

FIG. 21(A) is a waveform diagram of an alternating squarewave output by an invertor unit of the automobile generator apparatus according to this invention and FIG. 21(B) is a waveform diagram of the same after rectification.

DETAILED DESCRIPTION OF THE PREFERRED EMBODIMENTS

Figure 1:
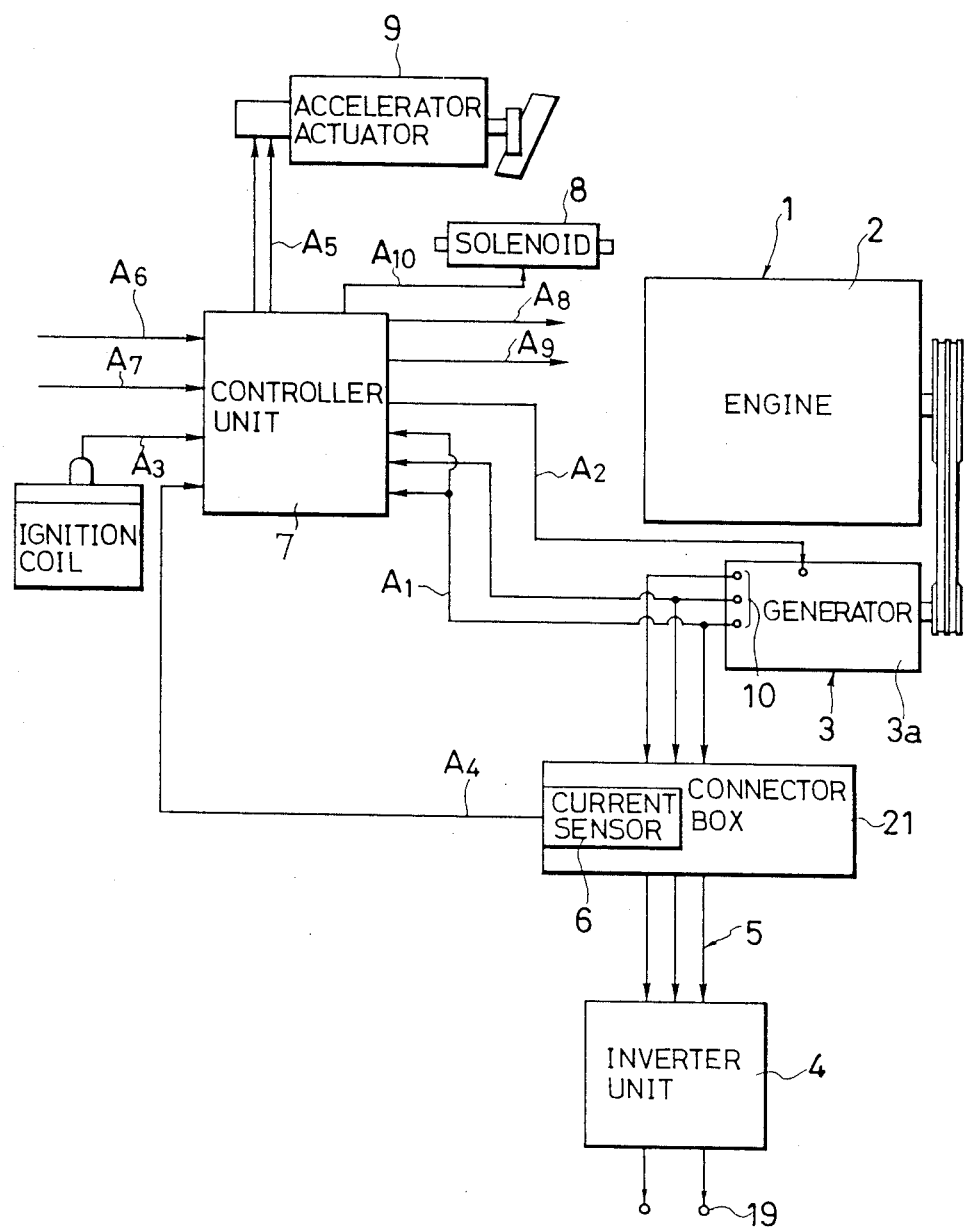
FIG. 1 is a schematic view of a first embodiment of the automobile generator apparatus in accordance with the present invention.

The present invention will now be explained with reference to the embodiments illustrated in the drawings.

Figure 2:
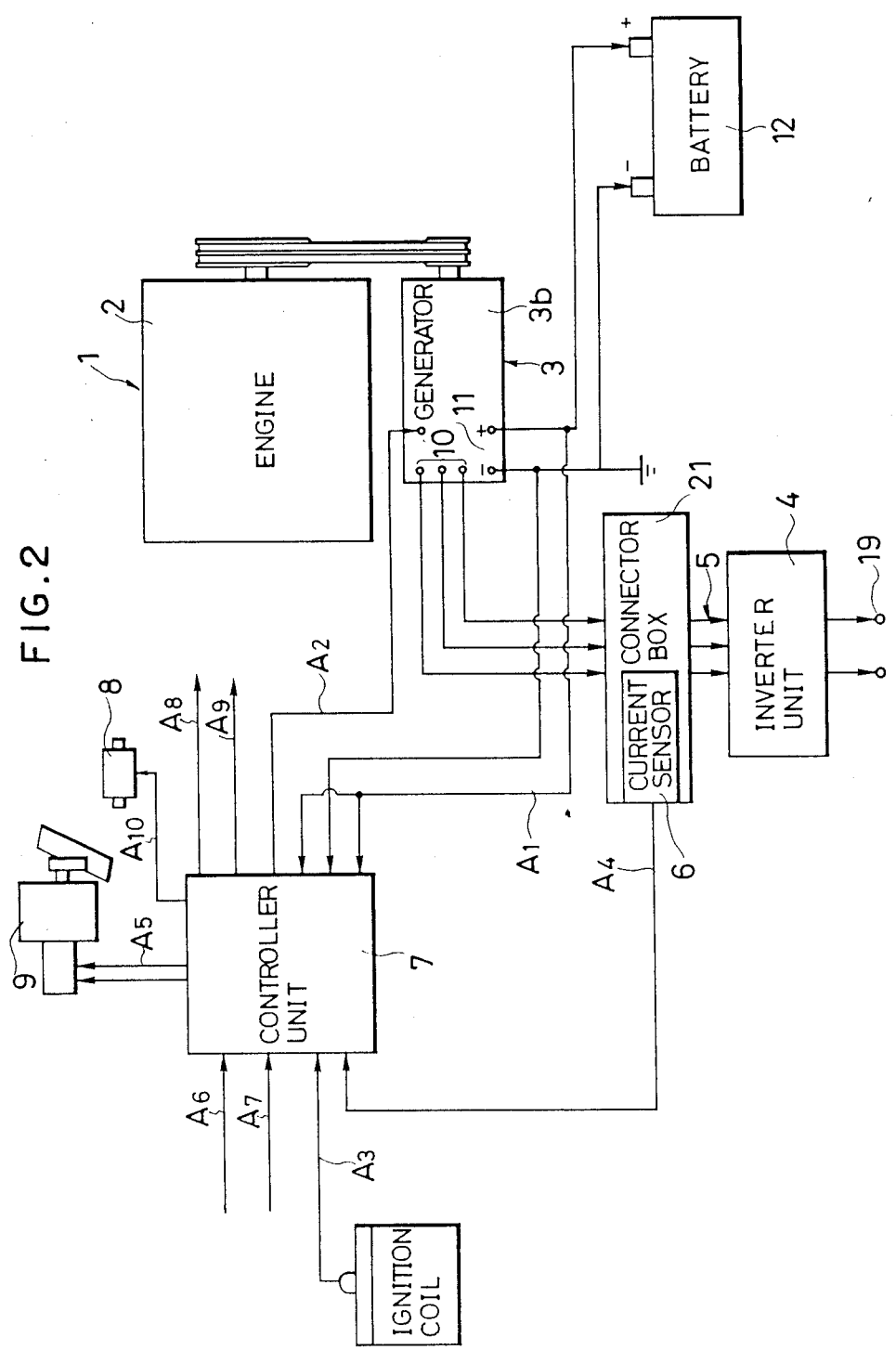
FIG. 2 is a schematic view of another embodiment of the automobile generator apparatus in accordance with the present invention.
Figure 3:
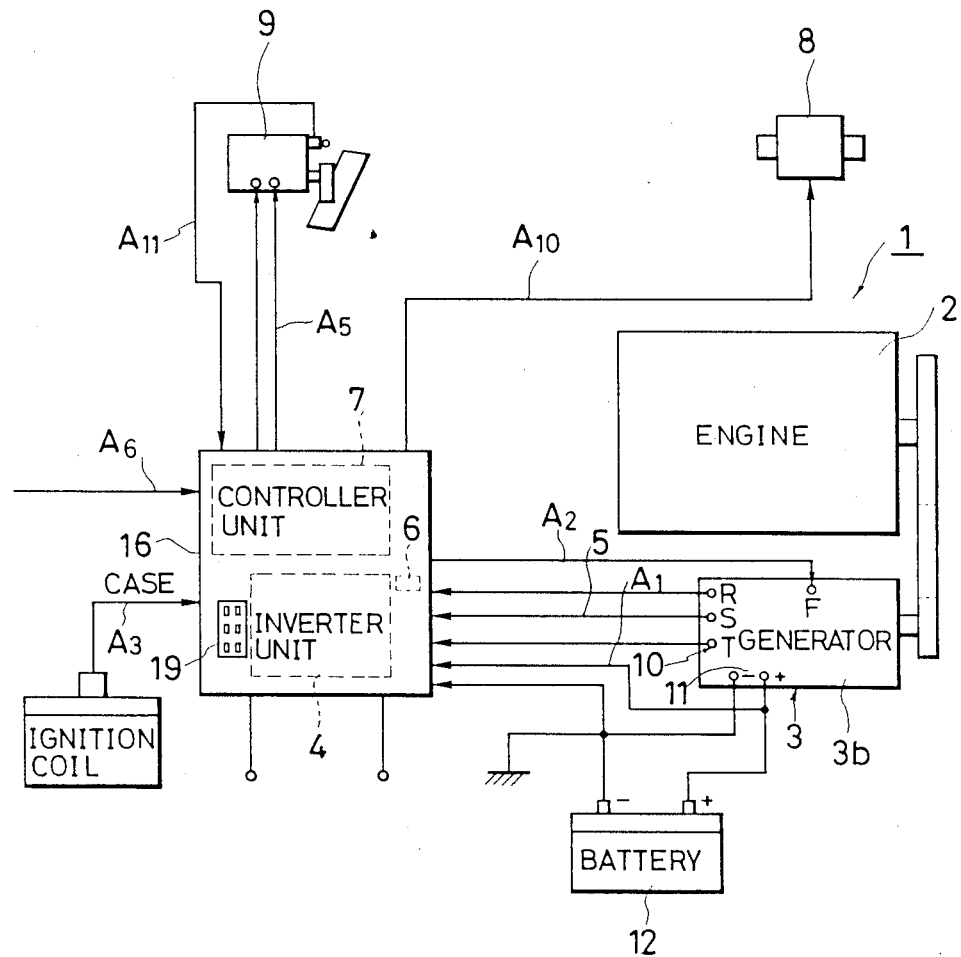
FIG. 3 is a schematic view of another embodiment of the automobile generator apparatus in accordance with the present invention, in which an invertor unit, a controller unit and the like are integrated as a system controller.

As shown in FIGS. 1-3, the automobile generator apparatus 1 according to this invention is installed within the engine compartment of an automobile and, as its fundamental components, comprise a generator 3 driven by an engine 2 of the automobile, an inverter unit 4 which is electrically connected with the generator 3, and a controller unit 7 which is supplied with a signal from a current sensor 6 provided in a circuit 5 for electrically connecting the generator 3 and the inverter unit 4. The embodiment under discussion is further provided with a solenoid 8 actuated by the controller unit 7 for increasing the idling speed of the engine 2 and with an accelerator actuator 9 actuated by the controller unit 7 when a large amount of power is to be consumed at the time the automobile is stopped.

As the generator 3, there can be used a single-voltage, high-frequency generator as denoted by the reference symbol 3a in FIG. 1 or a dual-voltage, high-frequency generator as denoted by the reference symbol 3b in FIGS. 2 and 3.

In the case where the single-voltage, high-frequency generator 3a is used as the generator 3, the alternator already installed in the engine compartment is left as it is and its output is supplied to the automobile battery, while the power produced by the single-voltage, high-frequency generator 3a is supplied to the invertor unit 4 via the circuit 5.

However, where the dual-voltage, high-frequency generator 3b is used as the generator 3, the alternator already installed in the engine compartment is removed and the high-frequency side output section 10 of the dual-voltage, high-frequency generator 3b is connected to the circuit 5 while the dc side output section 11 thereof is connected with the battery 12 in the engine compartment.

As an example of a dual-voltage, high-frequency generator which can be used in the automobile generator apparatus according to this invention, there can be mentioned the single-shaft, dual-voltage generator disclosed in Japanese Patent Application No. SHO 61-218088 filed by the same applicant.

Figure 5:
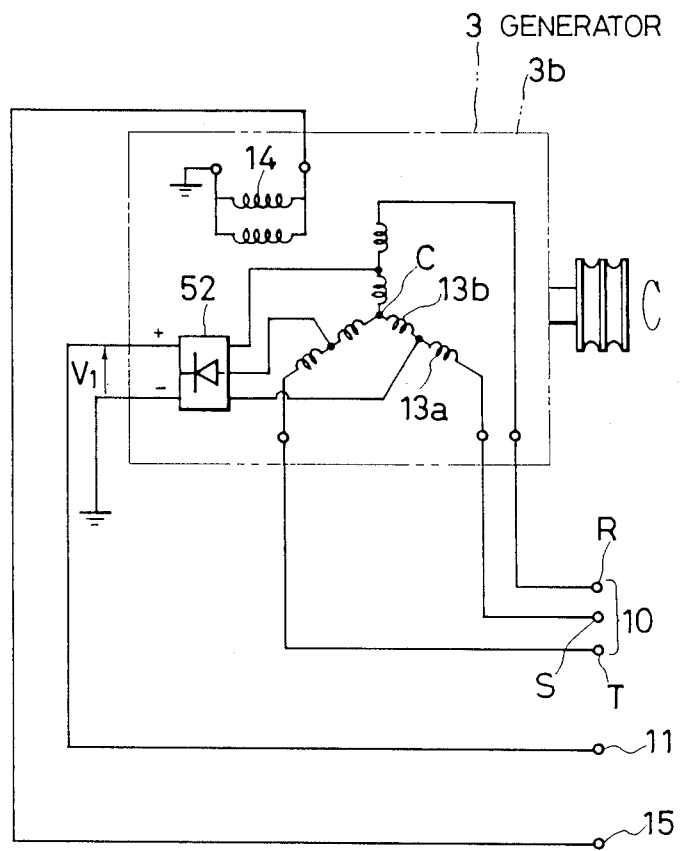
FIG. 5 is a schematic view of a generator that can be used in the automobile generator apparatus according to this invention.

As shown in FIG. 5, this dual-voltage, high-frequency generator has first coils 13a for producing a high voltage and second coils 13b for producing a low voltage connected in series and these coils are wound one on top of the other in the same slot of the stator core. The one ends of the second coils 13b are grouped to constitute the center point C of a star connection, the other end of the each second coils 13b is connected to one end of a first coil 13a, the other ends of the first coils 13a are grouped to constitute the high-frequency side output section 10, and the connection points between the second coils 13b and the first coils 13a are grouped to constitute the dc side output section 11. A diode is provide in the dc side output section 11 and the output from the dc side output section 11 is on the order of 14 V, 60 A.

While FIG. 5 shows an embodiment in which the first coils 13a (high-voltage coils) and the second coils 13b (low-voltage coils) are connected in series, it is also possible as will be explained later with reference to FIG. 59 to connect the high-voltage coils and low-voltage coils in parallel. The same is true in the embodiments that are described hereinafter.

On the other hand, terminal 15 of the field coil 14 provided in the single-voltage, high-frequency generator 3a is connected to the controller unit 7.

Thus in the present invention there can be used either a single-voltage, high-frequency generator 3a or a dual-voltage, high-frequency generator 3b as the generator 3 and the more appropriate type is selected in consideration of the automobile specifications, the amount of power consumed by the load, etc.

The inverter unit 4, the controller unit 7 and the like can be separate units as shown in FIGS. 1 and 2 (an apparatus with such separate units will sometimes be called a "modular type apparatus" in this specification) or can be consolidated as a system controller within a single case 16 as shown in FIG. 3.

Figure 4:
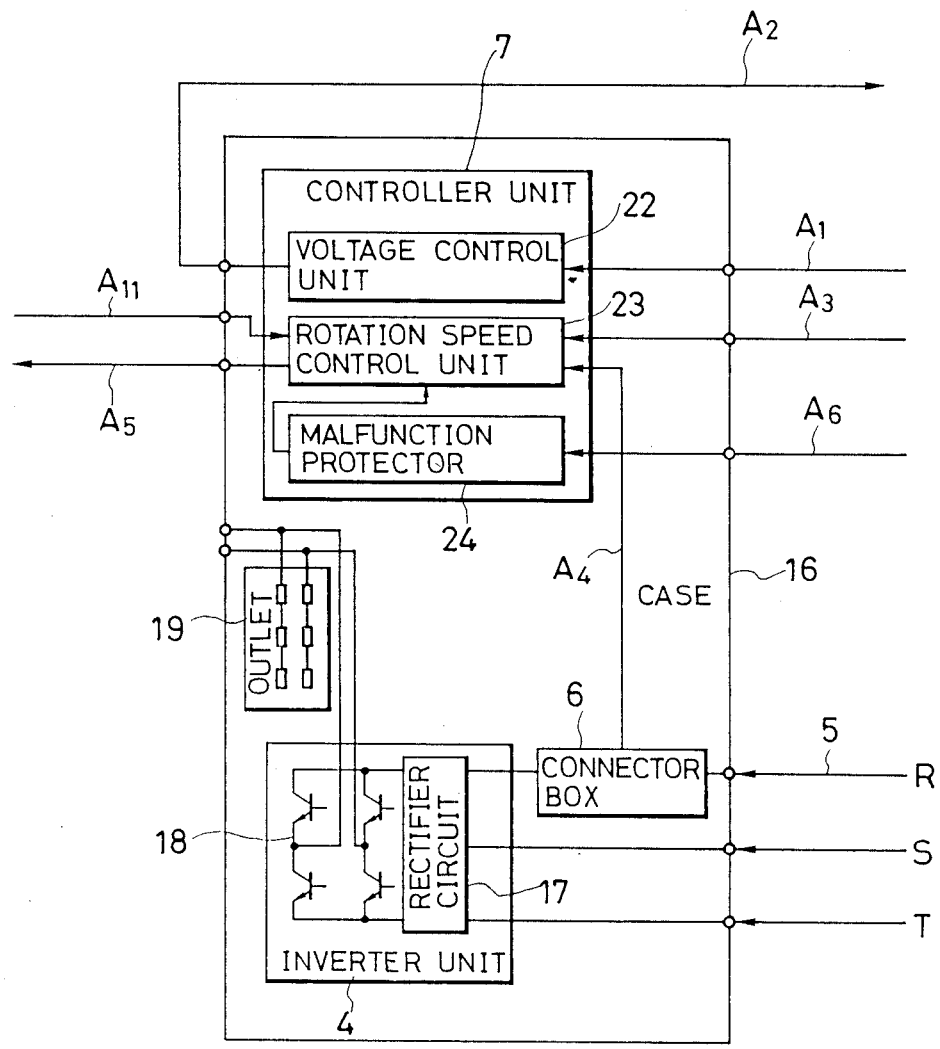
FIG. 4 is a block diagram of the system controller of FIG. 3.
Figure 6:
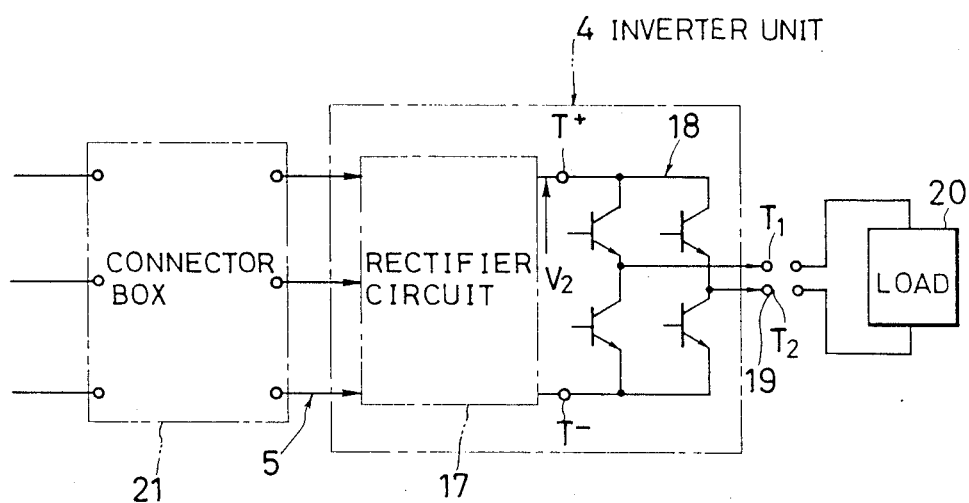
FIG. 6 is a schematic diagram of an invertor unit.

As shown in FIGS. 4 and 6, in the invertor unit 4 connected to the high-frequency side output section, the output from the generator 3, which may for example be a three-phase 115 V output, is received via the circuit 5 and converted into a direct current by a diode 17, whereafter the so-obtained dc voltage is converted into ac line voltage by switching elements 18 constituted of transistors. Therefore, when a piece of electric equipment 20 constituting a load is plugged into an outlet 19, the piece of equipment 20 can be operated using the output (e.g. 60 Hz, ac115 V line power) received from inverter unit 4. (The ensuing description will be based on the assumption that the automobile generator apparatus according to the invention is intended for use in the USA, where the ac line power is rated at 60 Hz, ac115 V.) Where the inverter unit 4 is provided as a separate unit, it can be disconnected from the connector box 21 and stored in the trunk of the automobile when there is no need for an external supply of ac line power, and when an external supply of ac line power is required, it can be used after the circuit 5 on the inverter unit 4 side has been plugged into the connector box 21. The connector box 21 should preferably be mounted at a place where it is easy of access but relatively inconspicuous, such as at the side of the front bumper or at the side of the rear seat. On the other hand, the controller unit 7 should be provided at a place where it can be easily operated by the driver, such as on a side panel near the driver's seat.

In contrast, where a consolidated single-unit system controller is used, the case 16 can be located under the automobile's center console box, which is advantageous in that it simplifies the wiring, fabrication and installation work as well as in that it eliminates the need for the extra work of separately installing the connector box 21.

Figure 7:
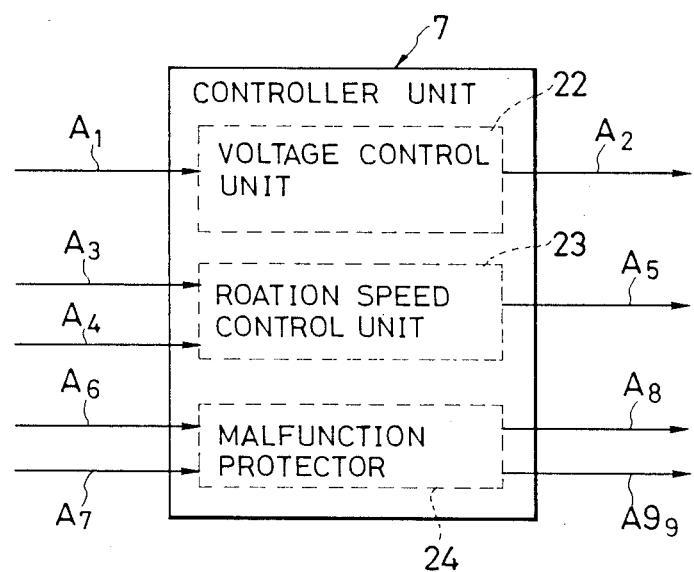
FIG. 7 is a schematic diagram of a controller unit.

As shown in FIG. 7, the controller unit 7 has therein a voltage control unit 22 for controlling the output voltage of the generator 3, a rotation speed control unit 23 for controlling the speed of the engine 2, and a malfunction protector 24. The voltage control unit 22 receives a detected voltage signal A1 from the generator 3 and outputs a field control signal A2 to the field coil 14. The rotation speed control unit 23 receives a detected engine speed signal A3 from the ignition coil and the detected load current signal A4 from the current sensor 6 and on the basis of these two signals outputs a drive signal A5 to the accelerator actuator 9 when the automobile is stopped. In response, the accelerator actuator 9 adjusts the position of the accelerator for controlling the speed of the engine 2. The malfunction protector 24 receives a hand brake discrimination signal A6 from inside the automobile and, where the apparatus is of the modular type, receives a connection state discrimination signal A7 from the connector box 21. On the basis of these two signals, it outputs a first protection drive signal A8 and a second protection drive signal A9.

The first protection drive signal A8 is for ensuring safety even if the driver should make an operational mistake. For example, if while the automobile is traveling the driver should erroneously put the controller unit 7 in the condition for generation of electricity in the stopped state of the automobile, the controller unit 7 will detect that the hand brake is not on and output the first protection signal so as to prevent the operation of the accelerator actuator 9. Further, in a case where the automobile is stopped and the automobile generator apparatus is being used for generating power, if the hand brake is released the first protection drive signal A8 will be output to put the accelerator actuator 9 in the idling state so as to prevent sudden, unintentional movement of the automobile. The second protection drive signal A9 is used in the case where the controller unit 7 is provided as a separate unit. For example, it serves as a warning signal for sounding an alarm when the driver attempts to drive the car with the inverter unit 4 plugged into the connector box 21. On the other hand, where a single-unit controller is used, the second protection drive signal A9 is unnecessary since the invertor unit 4 cannot be disconnected.

While the aforesaid controller 7 is provided with a number of devices, some or all of these may be incorporated in the generator 3.

As explained in the foregoing, the automobile generator apparatus according to this invention is constituted primarily of the engine 2, the generator 3, the inverter unit 4 and the controller unit 7. The controller unit 7 has a mode switch which the operator, for example the driver of the automobile, can operate to select a Drive mode (solely for driving the automobile), a Drive-and-Generate mode (for driving and simultaneous generation of electric power) and a Generate-When-Stopped mode (for generating power when the automobile is stationary).

In the case of the embodiment illustrated in FIG. 1, when the Drive mode is implemented, i.e. when no ac line power is to be used during driving of the automobile, the single-voltage, high-frequency generator 3a is not used and the conventional alternator installed in the engine compartment is used for supplying charging current to the battery 12. In the case of the embodiments shown in FIGS. 2 and 3, on the other hand, the dual-voltage, high-frequency generator 3b is provided with the same function as that of an alternator and is thus used for the purpose of supplying 14 V dc power to the automobile consumer equipment. Therefore, it is possible to set the idling speed of the engine at the normal 650-700 rpm.

Figure 8:
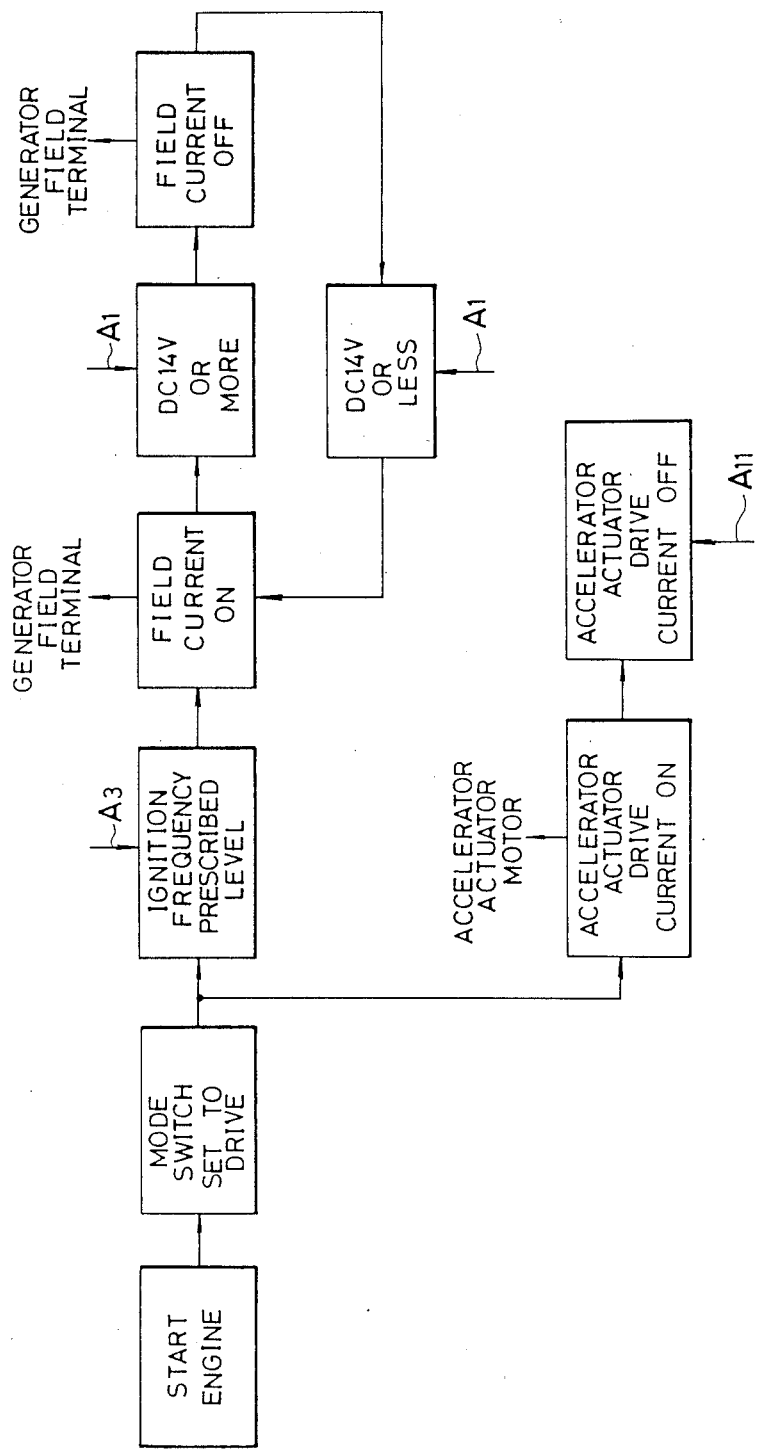
FIG. 8 is a flow chart showing the operation of the automobile generator apparatus in Drive mode operation.

The operation in Drive mode will be better understood from FIG. 8. When the engine is started and the mode switch of the controller unit 7 is set to Drive, the frequency of the ignition voltage is determined from the detected engine speed signal A3 input to the controller unit 7, whereby it is determined that the engine is operating. If it is found that said frequency is above the rated level, a field control signal A2 is supplied to the generator 3. By these operations, it is possible to avoid supplying needless field current to the generator 3 when the engine is not in operation.

Here it should be noted that if a detector which is capable of detecting frequency is used as the current sensor 6, it will be possible to ascertain the rotation speed of the engine 2 from the signal produced by this current frequency detector and to carry out control similarly.

When field current is supplied to the field coil 14 of the generator 3 mentioned above, the generator 3 begins to generate electric power and a rectifier within the generator 3 converts the output from ac to 14 V dc, which is used for charging the battery 12 and for operating automobile consumer equipment. When the speed of the engine increases or the load decreases, the voltage generated by the generator 3 tends to increase and this in turn tends to increase the terminal voltage of the battery 12. To prevent this, when the generated voltage comes to exceed 14 V, the controller unit 7 limits the field control signal A2 on the basis of the detected generator voltage signal input thereto. When as a result of this control of the power generation state of generator 3 the voltage becomes not more than 14 V again, the field control signal A2 is again supplied from the controller unit 7 to the field coil 14 of the generator 3.

Thus the voltage control unit 22 of the controller unit 7 constantly maintains the output voltage of the generator 3 at dc 14 V.

When the aforesaid accelerator actuator 9 is arranged to act directly on the accelerator pedal, it will have to be detached by the driver prior to driving the automobile since it will otherwise interfere with his foot-operation of the accelerator pedal. When this is done, the accelerator actuator 9 and the accelerator mechanism are completely disconnected from each other and the safety is enhanced.

On the other hand, it is preferable for the operator or eccentric cam of the accelerator actuator 9 to be in the start position during operation in the Generate-When-Stopped mode. Therefore, an origin switch is provided at the start position and a signal A11 is supplied from this switch to the controller unit, whereby the degree of opening of the throttle lever is adjusted. More specifically, when the accelerator actuator is set and the mode of operation is switched to one other than Generate-When-Stopped or the side brake is released during Generate-When-Stopped mode operation, causing issuance of a safety protect signal or the like, or some other such operation is carried out, the controller unit 7 supplies drive current to a motor for the accelerator actuator until the operator or eccentric cam of the accelerator 9 returns to the start position and operates the origin switch. Then, upon receiving the signal produced by operation of the origin switch, the controller unit discontinues the supply of the aforesaid drive current.

The Drive-and-Generate mode is for providing an external ac line power supply of, for example, 115 V during driving of the automobile. In this case the single-shaft generator 3 supplies two types of power supply, namely, a dc 14 V supply and an ac 115 V supply. However, in this case the idling speed of the engine 2 is set slightly higher than that in the Drive mode, e.g. at between 900 and 1,000 rpm. This is because it is necessary to rotate the generator 3 at a sufficiently high speed in order to supply stable ac line power of, for example, 115 V when the engine is idling.

Figure 9:
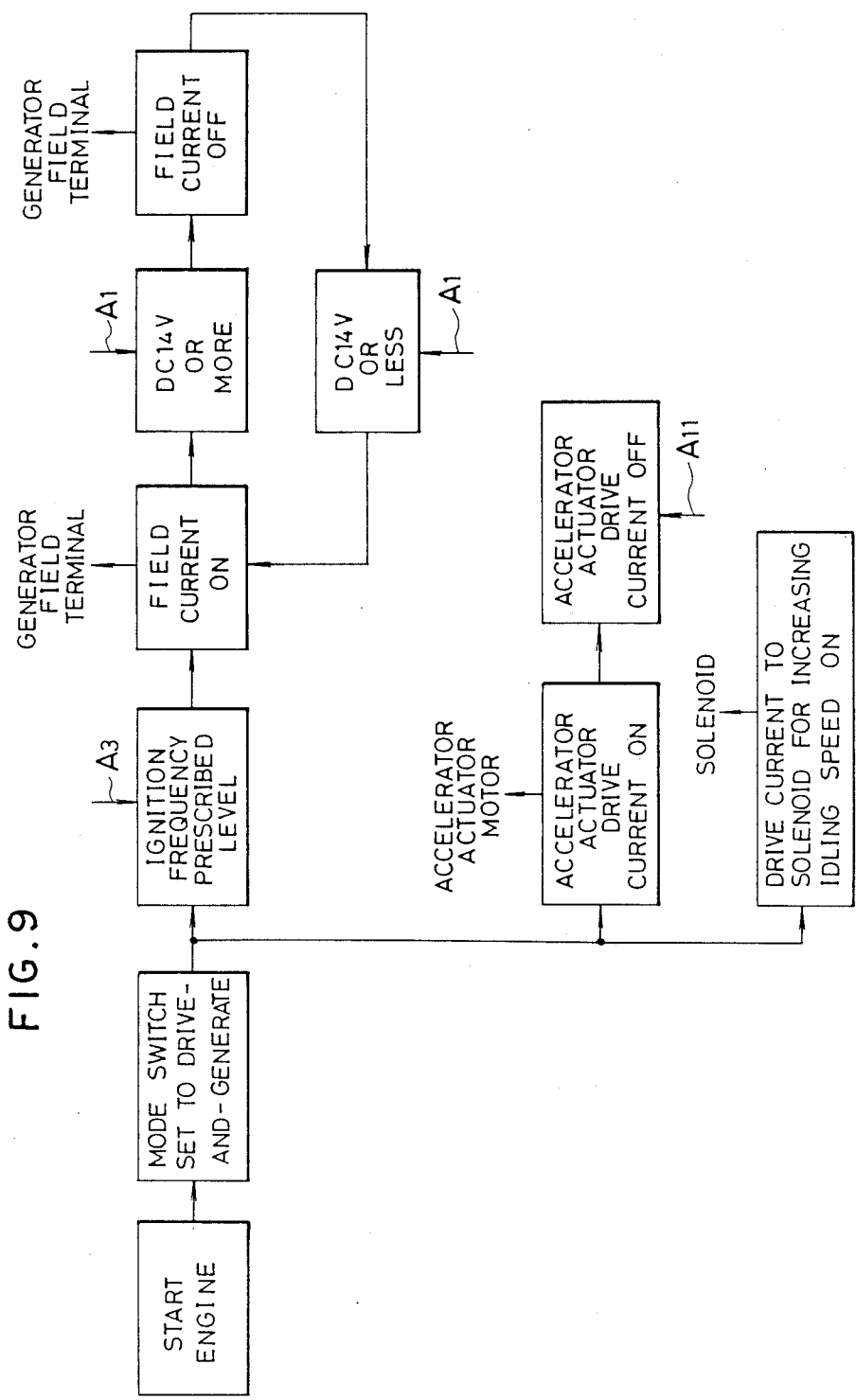
FIG. 9 is a flow chart showing the operation of the automobile generator apparatus in Drive-and-Generate mode operation.

The operation in Drive-and-Generate mode will be better understood from FIG. 9. When the engine 2 is started and the mode switch of the controller unit 7 is set to Drive-and-Generate, the operation is the same as that in the Drive mode described above. However, for increasing the speed of the engine 2 during idling to higher than that in the Drive mode, it is necessary to use the solenoid 8. The operation of the solenoid 8 for raising the idling speed will now be explained.

When the engine is started and the mode switch of the controller unit 7 is set to Drive-and-Generate, in addition to implementing the same operation as in the Drive mode, the solenoid 8 is also operated.

The solenoid 8 for raising the idling speed is the same as that installed in most automobiles equipped with air conditioners for increasing the idling speed from the ordinary 650-700 rpm, at which the air conditioner cannot perform properly, to 900-1,000 rpm.

Therefore, for enabling use of the 115 V ac line power during operation in the Drive-and-Generate mode, the idling speed of the generator 3 has to be somewhat increased and for this purpose, the controller unit 7 supplies drive current to the solenoid 8, whereby the speed of the engine at the time of idling is increased.

Since as mentioned above the generator 3 is of the single-shaft, dual-output type, it produces not only a dc 14 V output but also an ac 115 V output. However, as the ac 115 V output is of a high frequency, it cannot be directly used for operating a home appliance or the like. Therefore, the output is first converted to dc. In the case of the modular type apparatus, this is done by the inverter unit 4 which is normally stored in, for example, the automobile trunk, while where a single-unit system controller is employed, it is done by the invertor unit 4 housed within the case 16. The so-converted dc output is then converted to 50 or 60 Hz ac line power by the switching elements 18, whereby there is supplied to the outlet 19 ac line power which can be used for operating household appliances and the like.

As the output capacity of the generator 3 is proportional to the speed at which it is rotated, it has a larger output capacity when the automobile is traveling at a high speed and a lower output capacity when it is traveling at a low speed. Therefore, the output capacity in the Drive-and-Generate mode is determined by the lowest engine speed during low-speed driving, namely by the engine speed during idling.

The Generate-When-Stopped mode is for providing an external ac line power supply of, for example, 115 V when the automobile is stationary. In this case also the single-shaft generator 3 supplies two types of power supply, namely, a dc 14 V supply and an ac 115 V supply. In this mode, it is possible to generate a fair amount of electricity even during idling although the actual amount will of course depend on the engine displacement and the size of the generator. When the solenoid 8 is put into operation, it becomes even easier to meet the power requirements. Therefore, the power output is generally adequate to operate the piece of equipment 20.

However, differently from the case of the Drive-and-Generate mode, it is preferable to vary the engine speed in proportion to the amount of power being consumed by the load. More specifically, it is preferable to increase the engine speed when the amount of power being consumed by the load is large and to reduce the same when it is small. This is done by inputting the detected engine speed signal A3 from the ignition coil and the detected load current signal from the current sensor 6 to the controller unit 7 and causing the rotation speed control unit 23 to output a drive signal A5 to the accelerator actuator 9 for driving the accelerator actuator 9 to control the speed of the engine 2.

Figure 10:
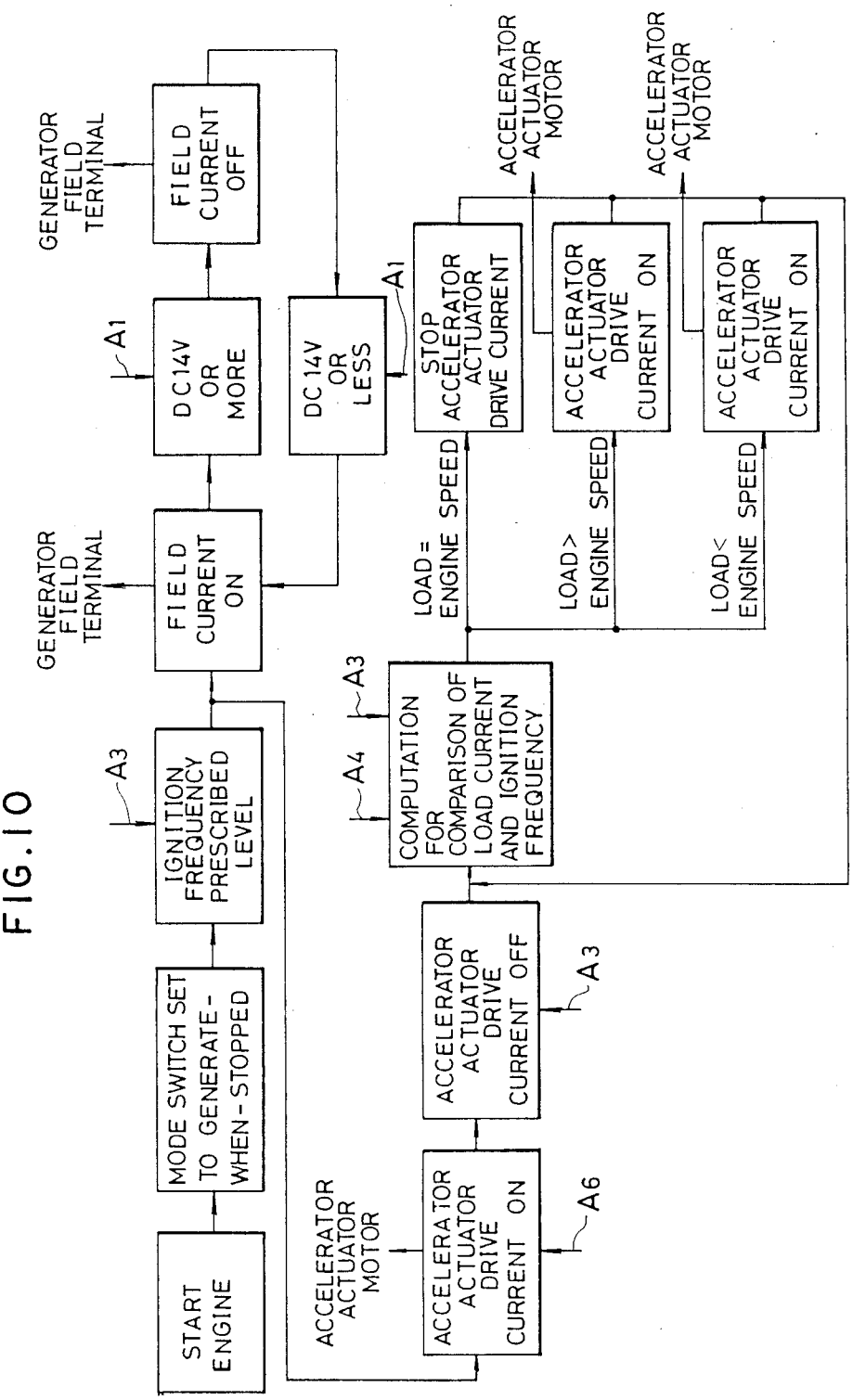
FIG. 10 is a flow chart showing the operation of the automobile generator apparatus in Drive-When-Stopped mode operation.
Figure 11:
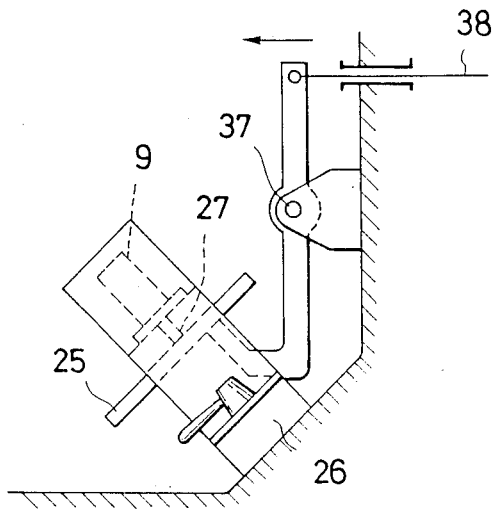
FIG. 11 is a side view of an accelerator pedal adjustor with an attached accelerator actuator.

The operation in Drive-When-Stopped mode will be better understood from FIG. 10. When the engine 2 is started and the mode switch of the controller unit 7 is set to Drive-When-Stopped, field current is supplied to the generator 3 in the same way as described in respect of operation in the Drive mode and Drive-and-Generate mode. However, when the frequency determined from the detected engine speed signal A3 is equal to or greater than a prescribed frequency serving as a reference for judging whether or not the engine 2 is operating, the controller unit 7 outputs to the accelerator actuator 9 a drive signal A5 for causing the accelerator actuator 9 to increase the amount of depression of the accelerator pedal so as to cause the engine speed to increase. In the course of this operation, the controller unit 7 continuously detects the ignition frequency or the frequency from the generator 3 and when the engine speed reaches a level at which it is possible to supply a usable 115 V ac line power output (i.e. an engine speed of 900–1,000 rpm), the supply of the drive signal A5 to the accelerator actuator 9 is discontinued. When a home electrical appliance is actually plugged into the outlet 19 and turned on, the accelerator actuator 9 carries out pulling operation (for increasing engine speed) and return operation ( for reducing engine speed) with respect to the accelerator actuator 9, in accordance with the size of the load. Thus the engine speed and the power output capacity are adjusted to the optimum level.

More precisely, the controller unit 7 constantly conducts comparison computation with respect to the ignition frequency (representing the speed of the engine 2) and detected load current signal A4 received from the current sensor 6 and when the load and the engine speed are found to be perfectly matched, it discontinues the output of the drive signal A5 to the accelerator actuator 9. In the case where the load is large in comparison with the engine speed, however, the controller unit 7 supplies a drive signal to the accelerator actuator 9 for causing the accelerator actuator 9 to increase the amount of pedal depression and thus cause the speed of the engine to increase. On the other hand, when the load is small in comparison with the engine speed, the controller unit 7 supplies the accelerator actuator 9 with a drive signal A5 causing it to allow the accelerator wire to return and thus lower the engine speed.

During operation in the Generate-When-Stopped mode, if the ignition key should be turned off by mistake or the engine should die, the accelerator actuator 9 will continue to hold the accelerator wire in the pulled state even after the engine stops Thus, when the engine is restarted, it its speed will rise rapidly to a high level, which is dangerous. The countermeasures to prevent this from happening are, for example, to discontinue the supply of the field control signal A2 to the generator 3 and to cause the accelerator actuator 9 to return to the low engine speed condition. These operations can be appropriately implemented as explained earlier and/or as shown in the figures.

According to the automobile generator of the construction described above, irrespective of the operating condition of the automobile, it is possible to obtain two high quality power outputs having stable frequency, namely a dc output of, for example, 14 V and an ac output of, for example, 115 V, which can be effectively utilized. Moreover, the generator, invertor unit, controller unit and the like can all be realized as light, compact units suitable for installation in any type of automobile. The ac115 V line power output produced by the automobile generator apparatus according to this invention thus has a high degree of practical utility in a wide range of situations, for example, as a source of emergency power during earthquakes, fires, storms, floods and other disasters or as a source of power for various outdoor jobs and leisure activities.

The structure of the accelerator actuator 9 will now be described in detail with reference to the figures.

Figure 12:
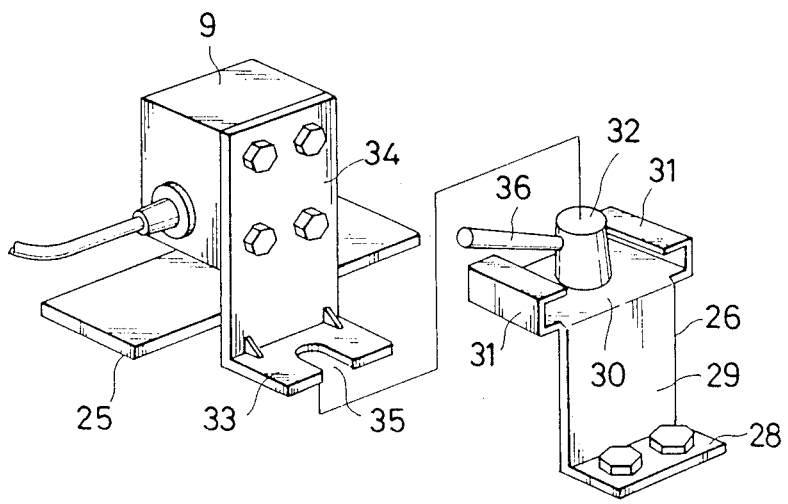
FIG. 12 is a perspective view of the accelerator pedal adjustor of FIG. 11 shown with the accelerator actuator removed from a mount therefor.
Figure 13:
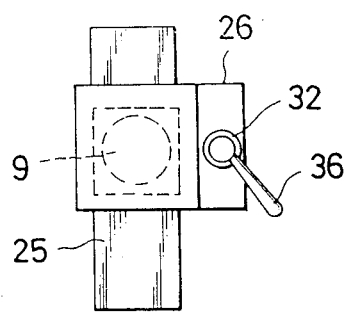
FIG. 13 is plan view of the accelerator pedal adjustor with the accelerator actuator attached.
Figure 14:
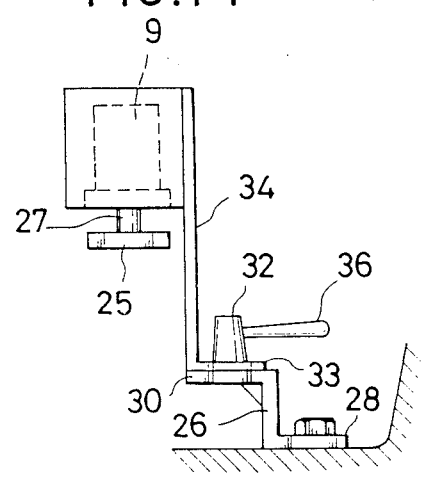
FIG. 14 is a front view of the accelerator pedal adjustor with the accelerator actuator attached.

The accelerator actuator 9 is the main element of the accelerator pedal adjustor and by adjusting the amount of depression of the accelerator pedal adjusts the speed of the engine 2. Referring to FIGS. 11 to 14, the accelerator adjuster comprises a mount 26 provided on the floor immediately to the right of the accelerator pedal 25, i.e. on the opposite side of the accelerator pedal 25 from the brake pedal The accelerator actuator 9, which has an operator 27, is detachably mounted on this mount 26. As shown in FIG. 12, the mount 26 consists of a base 28 which is attached to the floor of the automobile by bolts or the like, a leg 29 which rises vertically from one edge of the base 28, a seat 30 provided at the upper end of the leg 29 to extend substantially parallel to the base 28, U-shaped guides 31, 31 provided along opposing edges of the seat 30, and a clamping screw 32 provided approximately at the center of the seat 30. The mount 26 is attached to the floor such that its upper end is positioned sufficiently lower than the upper surface of the accelerator pedal 25. As a result, it will not interfere with the driver's operation of the accelerator pedal 25 or the brake pedal with his right foot. The operator 27 of the accelerator actuator 9 is driven by a drive power source such as a step motor or a dc motor and has attached to the drive power source portion thereof a bracket 34 with an attachment member 33 extending horizontally from its lower end. The accelerator actuator 9 can thus be detachably mounted to the mount 26 by the bracket 34. While in the embodiment of the accelerator actuator 9 illustrated in FIGS. 11 to 14 the operator 27 is formed as a rod whose length of downward projection can be varied by the drive power source, it is not limited to this configuration and may be of any other type insofar as it is capable of pressing down on the accelerator pedal for adjusting the amount of depression thereof. Specifically, it can alternatively be formed as a lever or cam driven by the drive power source.

When the generator 3 is to be used for generating electricity with the automobile stopped, the accelerator actuator 9 of the aforesaid description has to be mounted on the mount 26. For this, the clamping screw 32 of the mount 26 is loosened beforehand and then the attachment member 33 of the bracket 34 is brought into engagement with the U-shaped guides 31, 31 from the opening on one side thereof, whereafter the bracket 34 is slid until the clamping screw 32 fits into a notch 35 in the attachment member 33. Next a lever 36 of the clamping screw 32 is turned to clamp the bracket 34 on the seat 30. When the accelerator actuator 9 has been mounted on the mount 26 in this way, the operator 27 is situated opposite the accelerator pedal 25. In this condition, when the step motor, dc motor or the like constituting the drive power source is caused to rotate in the forward direction by a signal from the controller unit 7, the operator 27 moves downward to depress the accelerator pedal 25, with the amount of this depression being increased in accordance with a command signal from the controller unit 7. As the amount of depression of the accelerator pedal 25 increases, the accelerator pedal 25 rotates about a pivot shaft 37, whereby an accelerator wire 38 attached to the upper end of the accelerator pedal 25 increases the degree of opening of the throttle lever. Therefore, the engine speed is increased in accordance with the command signal from the controller unit 7 so that the amount of electric power generated by the generator 3 also increases. In contrast, when the step motor or the like constituting the drive power source is rotated in the reverse direction, the operator 27 rises and the amount of depression of the accelerator pedal 25 is reduced in accordance with the command signal from the controller unit 7. When the amount of depression of the accelerator pedal 25 is reduced, the accelerator pedal 25 rotates in the return direction under the force of a return spring or the like, whereby the accelerator wire 38 reduces the degree of opening of the throttle lever. Therefore, the engine speed is reduced in accordance with the command signal from the controller unit 7 so that the amount of electric power generated by the generator 3 is also reduced.

The accelerator actuator 9 can be easily detached from the mount 26 by loosening the clamping screw 32 and sliding the bracket 34 in the opposite direction from that at the time of attachment. When the automobile generator apparatus 1 is stopped, the accelerator actuator 9 returns to its initial state and the operator 27 allows the accelerator pedal 25 to resume its idling state. Moreover, even if the accelerator actuator 9 should fail to return to its initial state because of a malfunction, the problem can be overcome by detaching the accelerator actuator 9 from the mount 26, whereby the accelerator pedal 25 will be returned to the idling position by the force of the return spring. Thus the engine will be returned to the idling state.

Figure 15:
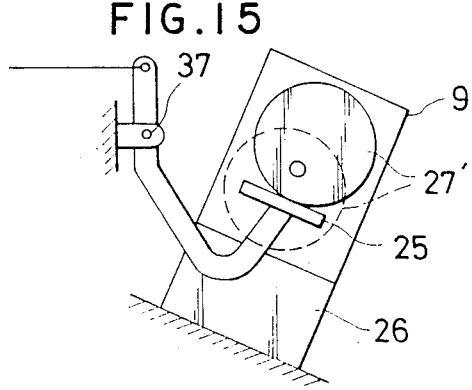
FIG. 15 is a side view of an accelerator actuator using an eccentric cam.

In the embodiment of the accelerator actuator 9 described in the foregoing, the amount of depression of the accelerator pedal 25 is adjusted by adjusting the projecting length of the rod-shaped operator 27 using a step motor or the like. The accelerator actuator 9 may, however, be of any other arrangement insofar as it has an operator capable of pressing down on the accelerator pedal 25 and is capable of causing the operator to increase/decrease the amount of depression of the accelerator pedal 25 in accordance with the signal received from the controller unit 7. For example, there can be used an accelerator actuator 9 which, as illustrated in FIG. 15, has an eccentric cam 27' which serves as the operator. This eccentric cam 27' is fixed on the output shaft of a step motor or of a dc motor with a speed reducer, and when the accelerator actuator 9 is mounted on the mount 26, the outer periphery of the eccentric cam 27' abuts on the upper surface of the accelerator pedal 25. With this accelerator actuator 9, when the motor is operated to rotate the eccentric cam 27', the distance between the output shaft and the portion of the outer periphery of the eccentric cam 27' in contact with the accelerator pedal 25 is varied, whereby the amount of depression of the accelerator pedal 25 is adjusted.

The accelerator actuator described in the foregoing can be easily detached and thus, if it should malfunction, it need only be removed to restore the automobile to a normally operable state. As a result, the driver can feel safe in operating the automobile generator apparatus 1 according to this invention even at a remote location.

Moreover, in accordance with this invention, the accelerator pedal 25 cannot be operated by foot when the automobile generator apparatus is being used with the accelerator actuator 9 mounted on the mount 26. Thus there is no danger of the driver trying to drive the automobile when the automobile generator apparatus is in operation for generating electricity.

Another embodiment of the accelerator actuator 9 will now be explained with reference to FIGS. 16 to 19.

Figure 16:
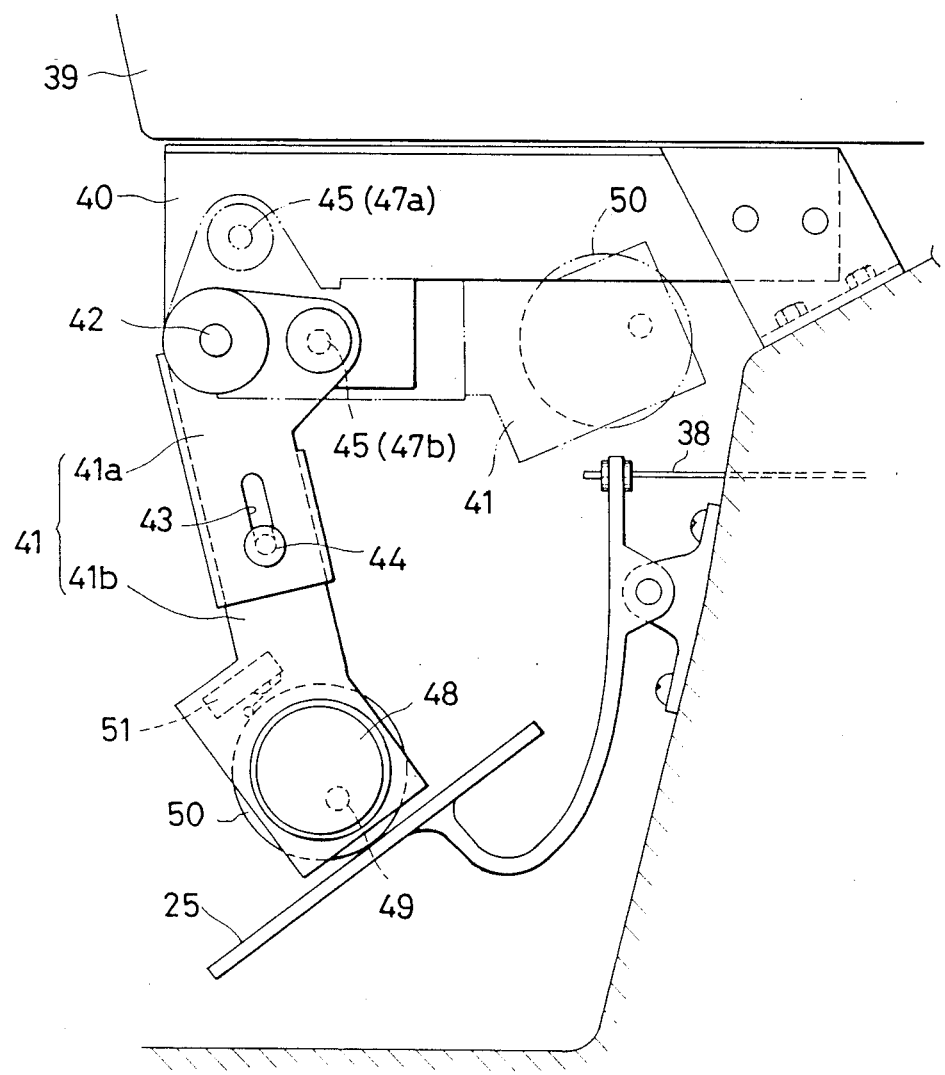
FIG. 16 is a right side view of another embodiment of an accelerator actuator.
Figure 17:
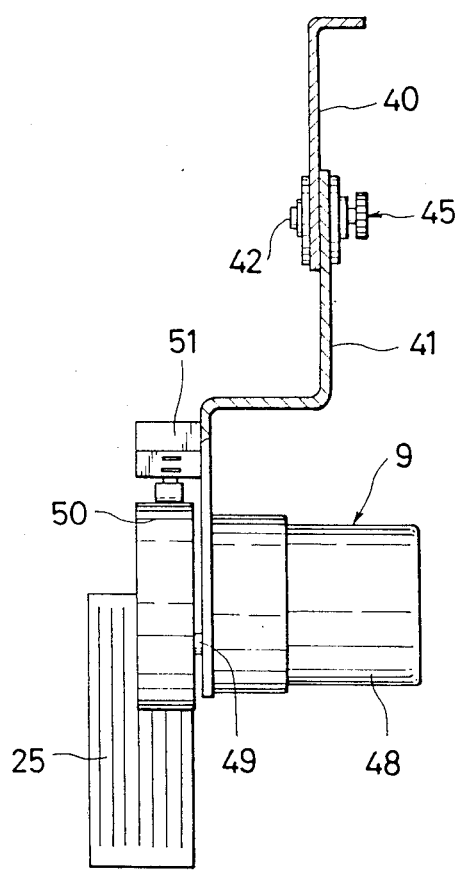
FIG. 17 is a front view of the accelerator actuator of FIG. 16.
Figure 18:
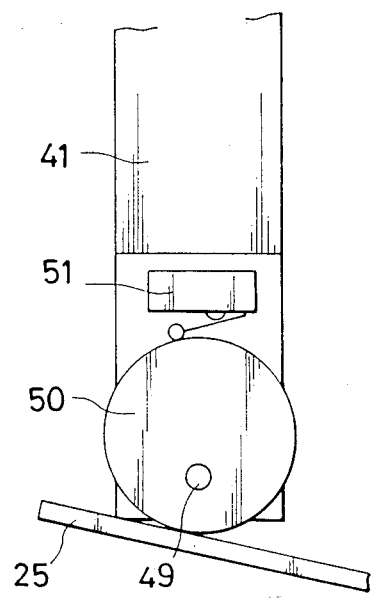
FIG. 18 is a right side view of the accelerator actuator of FIG. 16
Figure 19:
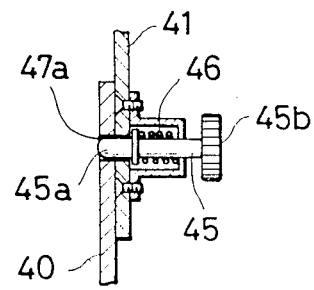
FIG. 19 is a sectional view of a lock mechanism.

The accelerator actuator 9 according to this embodiment is arranged to be operated by a drive signal from the controller unit 7 so as to increase/decrease the engine speed. As shown in FIG. 16, this accelerator actuator 9 comprises a base member 40 fixed by means of bolts or the like at a position above the accelerator pedal 25. The base member 40 may, for example, be fixed on the bottom surface of the dash board 39. An arm 41 is rotatably fixed on a shaft 42 at one side of the base member 40 and the free end of the arm 41 is provided with an accelerator actuator 9. The arm 41 consists of an upper member 41a and a lower member 41b which partially overlap each other, and the overall length of the arm 41 can be appropriately adjusted by means of an adjustment screw 44 within a long hole 43 in the upper member 41a. Moreover, a lock mechanism is provided in the vicinity of the rotatably fixed end of the arm 41, whereby the arm 41 can be locked either in a first state with its free end in a raised, lateral position as shown by the dotted lines in FIG. 16 or in a second state with its free end extending vertically downward onto the upper surface of the accelerator pedal 25 as shown by the solid lines in the same figure. The lock mechanism can be of any type insofar as it manifests the functions described above. The particular arrangement illustrated in the drawings consists of a lock pin 45 and a spring 46 for energizing the lock pin 45. When, as shown in FIG. 19, the force of the spring 46 causes the tip 45a of the lock pin 45 to engage with a hole 47a in the upper part of the base member 40, then, as shown in FIG. 16, the arm 41 can be held in its first, lateral state. Then, in this state, when the head 45b of the lock pin 45 is pulled by the fingers, the head 45b of the lock pin 45 disengages from the hole 47a, freeing the arm 41 to rotate. After the free end of the arm 41 has reached its most downwardly extended position, the force of the spring 46 causes the lock pin 45 to enter a hole 47b near the lower edge of the base member 40, whereby the arm 41 is retained in its second state.

The accelerator actuator 9 provided at the free end of the arm 41 of the aforesaid structure has a motor with speed reducer 48 which has an eccentric cam 50 provided on its output shaft 49, and an initial position detector 51 is disposed opposite the upper end of the eccentric cam 50. The eccentric cam 50 is a substantially circular member with an off-center hole for receiving the output shaft 49. Being off center, this hole is thus separated by different distances (radii) from different points on the periphery of the eccentric cam 50. When the eccentric cam 50 is first set opposite the accelerator pedal 25 (the initial state), the shortest radius portion is always positioned at the bottom. In this initial state the eccentric cam 50 does not alter the position of the accelerator pedal 25 and the engine 2 continues to idle. On the other hand, however, the initial position detector 51 is at this time in pressure contact with the longest radius portion of the eccentric cam 50, which causes the initial position detector 51 to send a signal to the controller unit 7. Then when the controller unit 7 sends a signal to the accelerator actuator 9 for causing the motor 48 to rotate the eccentric cam 50, longer diameter portions of the eccentric cam 50 progressively assume the bottommost position, whereby the accelerator pedal 25 is pressed down and the engine speed increased. The greatest degree of depression of the accelerator pedal 25 occurs when the longest diameter portion of the eccentric cam 50 reaches the bottom. Thus through rotation of the eccentric cam 50 in this way, the accelerator actuator 9 adjusts the amount of depression of the accelerator pedal 25 and, accordingly, the speed of the engine 2.

When the accelerator actuator 9 is not being used, it can be stored out of the way simply by putting the arm 41 in its first, lateral state as indicted by the dotted lines in FIG. 16. When stored in this raised position, the accelerator actuator 9 and the arm 41 will not interfere with foot-operation of the accelerator pedal 25 during ordinary driving of the automobile. Moreover, even if there should be some malfunction which prevents the eccentric cam 50 from returning to its initial state, there will be no problem as regards the safety of operating the automobile since the arm 41 can be locked in its first state where the accelerator actuator 9 cannot affect the operation of the accelerator pedal 25. Whenever it is desired to use the accelerator actuator 9 again, all that need be done is to rotate the arm 41 to its downwardly extended position.

With the aforesaid arrangement of the accelerator actuator 9, even if the accelerator actuator 9 should malfunction, this will have no effect on driving of the automobile since the accelerator actuator 9 can be removed from the vicinity of the accelerator pedal 25 by rotating the arm 41. As a result, the automobile generator apparatus 1 can be safely used even at a remote location.

Also in accordance with the present invention, while the accelerator actuator 9 is in the lowered state for operation of the automobile generator apparatus 1, the accelerator pedal 25 cannot be operated by the foot, which ensures that the automobile will not be driven by mistake while generation of electricity is in progress. As the accelerator actuator 9 can be stored out of the way when it is not in use simply by rotating the arm 41 to its raised, lateral position and can be put back in the condition for use simply by rotating the arm 41 in the opposite direction again, the accelerator actuator 9 is not only very easy to operate but also safe from interfering with the normal driving of the automobile.

Next there will be explained the structure and operation of the array of switching elements 18 of the invertor unit 4 shown in FIGS. 4 and 6. These switching elements 18 constitute a single-phase invertor.

To begin with, the general concept of a single-phase invertor will be considered.

As shown in FIG. 20(A), ac line power (e.g. 60 Hz, ac115 V line power) is defined as a 60 Hz sine wave current having a voltage maximum equal to $\sqrt{2}$ times the effective or rated voltage of 115 V, i.e. to about 160 V.

On the other hand, many of the electronic and electrical devices used in homes and offices use the ac line power after rectifying it into dc power. In this case, the maximum voltage of the rectified current wave under no-load condition is in principle equal to the voltage maximum (160 V) of the input ac line power.

Therefore, for satisfying these characteristics of ac line power, it is not absolutely necessary to use sine wave current but suffices instead to use an alternating square wave current as shown in FIG. 21(A) which consists of square wave pulses separated from each other by rest periods $P_0$ of an appropriate time width.

In this case, however, it is necessary to set the maximum amplitude of the positive and negative square wave pulses during the respective first and second conduction periods $P_+$ and $P_-$ to have absolute values which are equal to the voltage maximum of ac line power and further necessary to appropriately set the time width of the no-conduction period (rest period) $P_0$ or the pulse duty ratio for the respective square waves, this duty ratio being defined as $P_+(\text{or } P_-)/\{(P_+(\text{or } P_-)+P_0\}$, so that the voltage relationship obtained is substantially identical to that explained above with respect to the rectification of ac line power.

It is understood, of course, that a unit cycle constituted by the first conduction period $P_+$, a rest period $P_0$, the second conduction period $P_-$ and a rest period $P_0$ is repeated at the prescribed frequency of 60 Hz.

When these conditions are met, it becomes possible to obtain ac line power exhibiting substantially the same characteristics as that supplied commercially, from alternating square wave current rather than from sine wave current. In fact this is the principle on which conventional single-phase invertors operate.

Figure 22A:
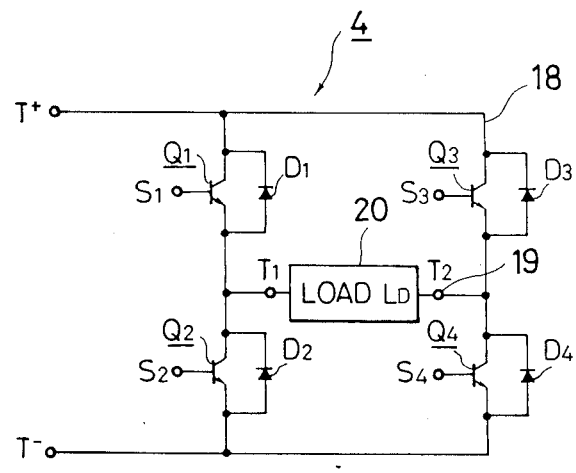
FIG. 22(A) is a circuit diagram of the output stage of the invertor.
Figure 22B:
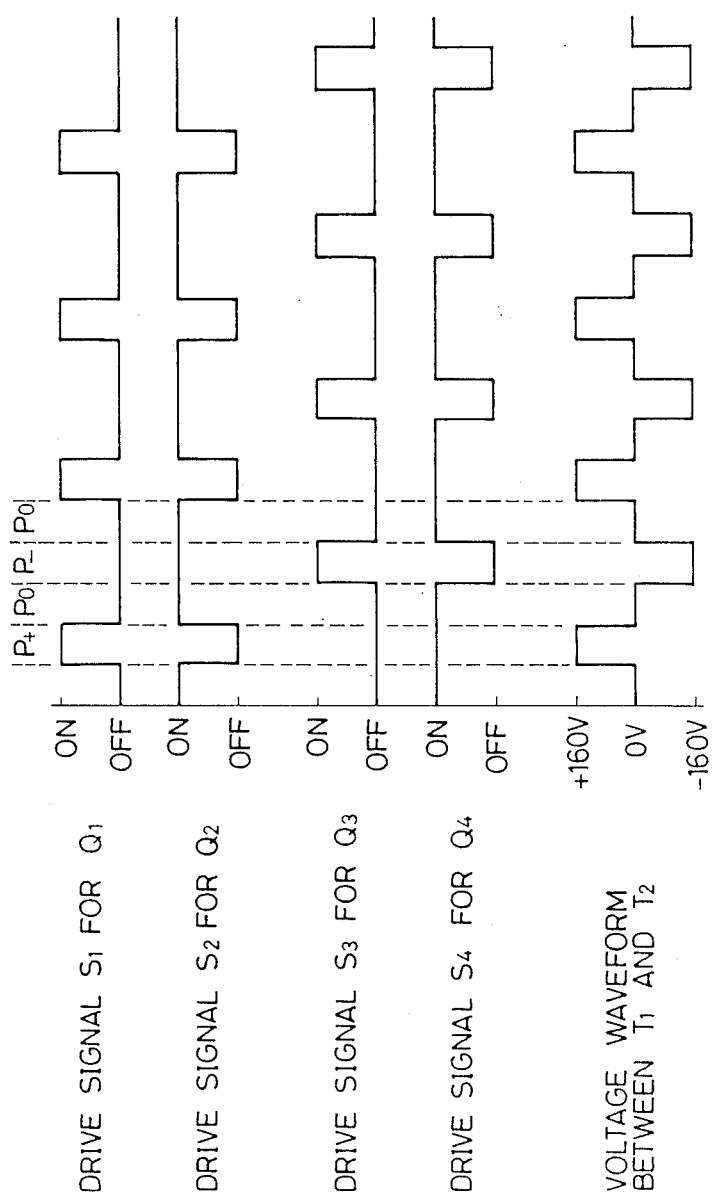
FIG. 22(B) shows waveform diagrams for explaining the operation of the output stage of the invertor.

FIG. 22(A) shows the structure of a single-phase invertor which can be applied in the driving method of this invention and FIG. 22(B) illustrates a preferred example of the drive method of the invention. The waveform required to be supplied via the output terminals of the single-phase invertor in this invention is of course that already explained with reference to FIG. 21(A).

The single-phase invertor illustrated in FIG. 22(A) uses bipolar transistors for the switching elements $Q_1$ to $Q_4$.

The conventional single-phase invertor requires a bleeder resistor which has the disadvantages of constantly consuming power, increasing the number of invertor components and increasing the size of the unit. The aforesaid invertor usable in this invention neither has nor requires such a bleeder resistor or any similar component.

The single-phase invertor of FIG. 22(A) will first be explained in terms of its structure in the static state. The output of the generator 3 is rectified by the diode 17 within the invertor unit 4 and then supplied across the positive and negative terminals $T^+$ and $T^-$ shown in FIG. 22(A). A series circuited constituted of the first and second bipolar transistor $Q_1$ and $Q_2$ and a series circuit constituted of the third and fourth bipolar transistor $Q_3$ and $Q_4$ are connected in parallel and this parallel circuit is connected between the terminals $T^+$ and $T^-$. The connection point $T_1$ between the first and second bipolar transistors $Q_1$ and $Q_2$ and the connection point $T_2$ between the third and fourth bipolar transistor $Q_3$ and $Q_4$ are defined as the single-phase invertor output terminals $T_1$ and $T_2$ between which the load $L_D$ is connected. The terminals $T_1$ and $T_2$ correspond to the outlet 19 shown in FIG. 6.

In the main current path between the emitter and collector of each of the bipolar transistors $Q_1$ to $Q_2$ is parallel-connected with one of four a protection diodes $D_1$ to $D_4$ for limiting voltage applied in the reverse direction and protecting the transistor.

In the present invention, the bases of the transistors $Q_1$ to $Q_4$ in the aforesaid static configuration are applied with respective drive pulses $S_1$ to $S_4$ in the sequence pattern shown in FIG. 22(B).

During the first conduction period $P_+$ for forming the positive square wave pulse $P_+$, the drive signals $S_1$ and $S_4$ are respectively supplied to the bases of the first transistor $Q_1$ and the fourth transistor $Q_4$ as significant positive values, whereby these transistors are turned on, and during the second conduction period $P_-$ for forming the negative square wave pulse $P_-$, the drive signals $S_3$ and $S_2$ are respectively supplied to the bases of the third transistor $Q_3$ and the second transistor $Q_2$, whereby these transistors are turned on.

More specifically, during the first conduction period $P_+$ the current from the positive dc power source terminal $T^+$ flows through the first transistor $Q_1$, the terminal $T_1$, the load $L_D$, the terminal $T_2$ and the fourth transistor $Q_4$ and then to the negative dc power source terminal $T^-$. As a result, there is formed a positive square wave pulse as shown at the bottom of FIG. 22(B). Where the output voltage of the dc power source connected to the single-phase invertor is, for example, equal to the voltage maximum of an ac line power source, the voltage of this square wave pulse will be equal to such voltage maximum (about 160 V).

On the other hand, during the second conduction period $P_-$, the current flows from the positive dc power source terminal $T^+$, through the third transistor $Q_3$, the terminal $T_2$, the load $L_D$, the terminal $T_1$, the second transistor $Q_2$ and back to the negative dc power source terminal $T^-$. As a result, while the absolute value of the voltage maximum of the so-formed square wave pulse is the prescribed value (e.g. 160 V), the direction of its flow in the load $L_D$ is the reverse from the earlier case.

For the reason that was explained earlier, a no-conduction period or rest period $P_0$ is established between neighboring periods $P_+$ and $P_-$ for formation of the positive and negative square pulses. One feature of this invention is that this rest period $P_0$ is not defined by turning off all of the transistors as has been the conventional practice, but is formed even when the first and third transistors $Q_1$ and $Q_3$ are off by the second and fourth transistors $Q_2$ and $Q_4$ being turned on.

The operation by the drive method of this invention will now be explained over the course of time with reference to the case where the load $L_D$ is a resistive load, which is the case involving the fewest problems. As was explained earlier, during the first conduction period $P_+$ the first and fourth transistors $Q_1$ and $Q_4$ are on and the second and third transistors $Q_2$ and $Q_3$ are off so that current is supplied to the load $L_D$ in the positive direction. Following this, after the period of time prescribed for the first conduction period $P_+$, the first transistor $Q_1$ is turned off, and since the third transistor $Q_3$ has been off from before that time, the terminal $T_1$ at one end of the load $L_D$ and the positive dc power source terminal $T^+$ are in a state equivalent to being disconnected. (It should be noted that the direction of the protection diodes $D_1$ and $D_3$ is backward.) As a result, the supply of dc current to the load $L_D$ is cut off at this time, producing the prescribed no-conduction flow state.

Further, since at this time the fourth transistor $Q_4$ which has been on remains so and, moreover, the second transistor $Q_2$ is put in the on state, the opposite ends of the load $L_D$, namely the terminals $T_1$ and $T_2$, are in connection with the collectors of the second transistors $Q_2$ and $Q_4$, respectively. However, where the load $L_d$ is resistive as presumed in this explanation, there is clearly no problem whatsoever. This is because both ends of the load are nearly at ground potential.

After the lapse of the aforesaid fixed period from the start of the first rest period $P_0$, the second transistor $Q_2$ which has been in the on state remains on, while in the course of the rest period $P_0$, the fourth transistor $Q_4$ which has been on is turned off, and, instead, the third transistor $Q_3$ is turned on, marking the start of the second conduction period $P_-$. As a result, power source current from the positive dc power source terminal $T^+$ flows through the third transistor $Q_3$, the terminal $T_2$, the load $L_D$, the terminal $T_1$, the second transistor $Q_2$ and back to the negative power source terminal $T^-$.

After this state has been maintained for the second conduction period $P_-$, the second transistor $Q_2$ is maintained as it is in the on state, while the third transistor $Q_3$, which has also been on, is turned off. At this time a drive signal $S_4$ of a significant positive value is again applied to the base of the fourth transistor $Q_4$. When the fourth transistor $Q_4$ turns on, a second rest period $P_0$ is produced in the same was as the rest period $P_0$ following the first conduction period $P_+$ was formed.

If this unit cycle ($P_+ \rightarrow P_0 \rightarrow P_- \rightarrow P_0$) is thereafter repeated at the frequency of, for example 60 Hz, there will be obtained between the output terminals $T_1$ and $T_2$ of the single-phase invertor an alternating square wave as indicated at the bottom of FIG. 22(B), which is precisely the prescribed wave shown in FIG. 21(A).

When the aforesaid drive signal sequence pattern in accordance with this invention is used, it is possible, not only where a resistive load $L_D$ is selected as in the foregoing description but also where the load $L_D$ is removed or replaced with an inductive load $L_L$, to eliminate the problems associated with stored residual charge or stored electromagnetic energy, without need for a bleeder resistor etc. of the type conventionally used.

This will now be explained. FIGS. 23(A) to 23(D) show the operation of the single-phase invertor of FIG.

22(A) in accordance with the drive method of the present invention in the case where no load is present between the output terminals $T_1$ and $T_2$. It should be noted, however, that the protection diodes $D_1$ to $D_2$ connected between the emitters and collectors of the transistors $Q_1$ to $Q_4$ have been omitted from the circuits shown in FIG. 23 since they have no bearing on the matter under discussion. The arrows in the figure indicate the direction in which current is permitted to flow when the respective transistors $Q_1$ to $Q_4$ are on, and the off state of the transistors is indicated by an open line.

During first conduction period $P_+$, as was explained earlier and as shown in FIG. 23(A), the first transistor $Q_1$ and the fourth transistor $Q_4$ are on. Thus, if no load is present between the terminals $T_1$ and $T_2$ and it can be presumed (as is normally the case) that equivalent capacitors $C_2$ and $C_3$ are present between the emitters and collectors of the transistors $Q_2$ and $Q_3$, then charging current will flow into the capacitors $C_2$ and $C_3$, as indicated by the phantom line in the drawing.

Figure 23A:
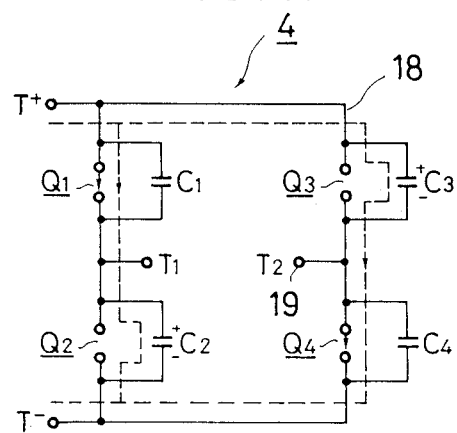
FIG. 23(A) to FIG. 23(D) are equivalent circuit diagrams for explaining the operation of the output stage of the invertor under no-load condition.
Figure 23B:
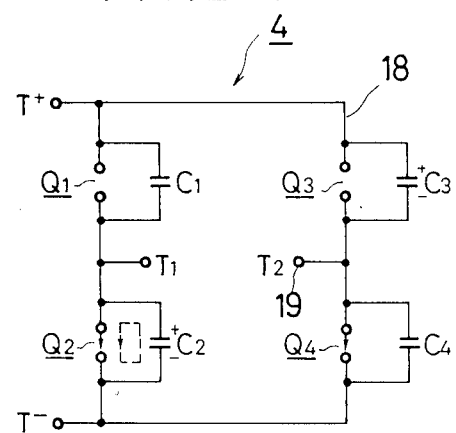
Figure 23C:
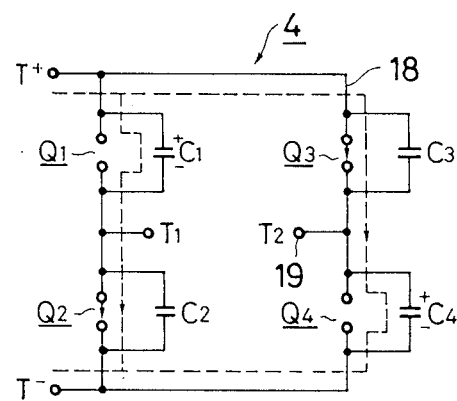

However, after the lapse of the time fixed for the first conduction period $P_+$ when the first rest period $P_0$ has begun, the drive method of this invention causes the transistors $Q_2$ and $Q_4$ to turn on, as shown in FIG. 23(B). As a result, the charge stored in the equivalent capacitor $C_2$ connected in parallel between the emitter and collector of the second transistor $Q_2$ is rapidly discharged through the main current path (the emitter-collector path) of the second transistor $Q_2$.

As a result, even if a residual charge is stored in the third capacitor $C_3$ at this time, since the terminals $T_1$ and $T_2$ are in effect grounded through the current paths of $Q_2$ and $Q_4$, respectively, the abnormally high-voltage wave which would in a conventional invertor arise between the terminals $T_1$ and $T_2$ can be suppressed Any charge still remaining in the third capacitor $C_3$ will be rapidly discharged through the emitter-collector path of the third transistor $Q_3$ when it is turned on at the start of the ensuing second conduction period $P_-$.

Figure 23D:
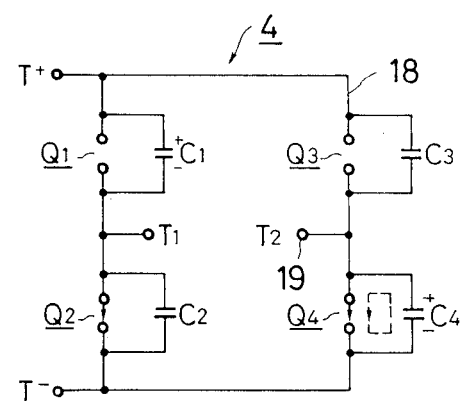

When there is no load present between the terminals $T_1$ and $T_2$ and the second conduction period $P_-$ begins, then similarly to what was described above and as shown in FIG. 23(C), charging current will flow into the equivalent capacitors $C_1$ and $C_4$ connected in parallel across the emitters and collectors of the first and fourth transistor $Q_1$ and $Q_4$ which are off at this time. However, as shown in FIG. 23(D), since the fourth transistor $Q_4$ is turned on during the ensuing second rest period $P_0$, the charge of the fourth capacitor $C_4$ will be rapidly discharged so that no abnormally high-voltage wave will occur between the terminals $T_1$ and $T_2$. At this time even if some charge remains in the capacitor $C_1$, this will be rapidly discharged through the emitter-collector path of the first transistor $Q_1$ established during the formation of the first conduction period $P_+$ at the beginning of the next cycle.

In this way, the present invention is able to prevent charges stored in equivalent capacitors within the invertor circuit from generating an abnormally high-voltage wave across the terminals $T_1$ and $T_2$, and thus effectively overcomes this problem of the prior art.

With reference to FIGS. 24(A) to 24(D), there will now be considered the case where the load $L_D$ is an inductive load $L_L$.

As was explained earlier, when power source current flows into an inductive load $L_L$, the load stores electromagnetic energy which may produce a back electromotive force.

Figure 24A:
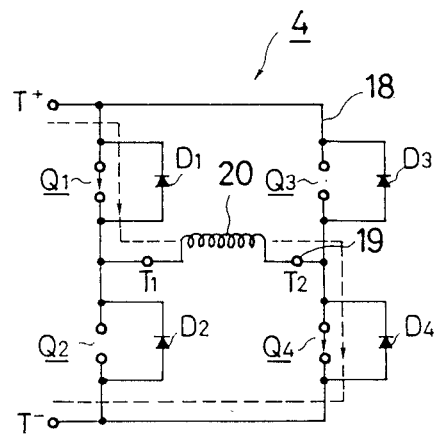
FIG. 24(A) to FIG. 24(D) are equivalent circuit diagrams for explaining the operation of the output stage of the inverter when an inductive load is connected thereto.

Therefore, if power source current flows into the load $L_L$ from the terminal $T_1$ during the first conduction period $P_+$ in the manner shown in FIG. 24(A), electromagnetic energy will be stored in the load $L_L$. If the power supply to the opposite terminals $T_1$ and $T_2$ should then suddenly be removed, this stored energy would give rise to an induced voltage of considerable magnitude in the opposite direction.

Figure 24B:
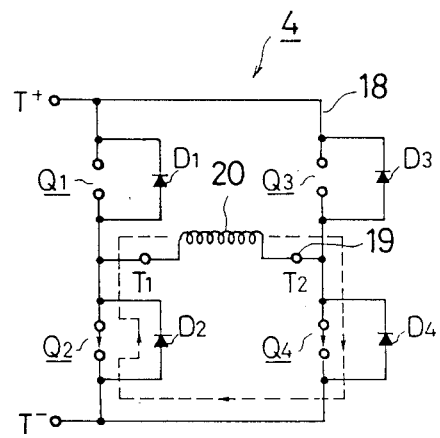

In the drive method of the present invention, however, when state changes from that shown in FIG. 24(A) to the first rest period $P_0$ shown in FIG. 24(B), the second and fourth transistors $Q_2$ and $Q_4$ are turned on, whereby the electromagnetic energy stored in the inductive load $L_L$ flows through a closed loop including the fourth transistor $Q_4$ and the protection diode $D_2$ normally provided across the second transistor $Q_2$ and is rapidly converted to heat in the low resistive path between the emitter and collector of the fourth transistor $Q_4$. Therefore, no troublesome spike voltage of the type observed with conventional invertors occurs between the output terminals $T_1$ and $T_2$ of the single-phase invertor according to this invention.

Figure 24C:
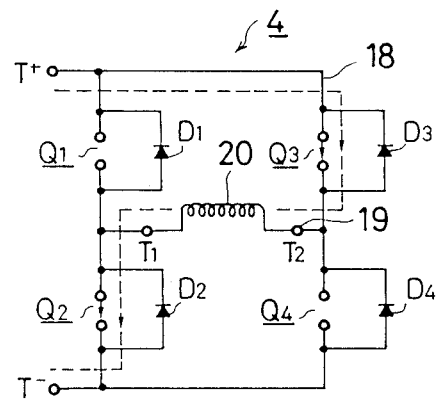
Figure 24D:
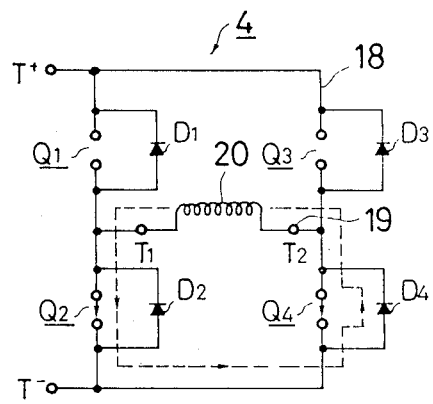

This same mechanism comes into play similarly during the transition period between the second conduction period $P_-$ indicated in FIG. 24(C) and the second rest period $P_0$ indicated in FIG. 24(D), whereby the electromagnetic energy stored in the inductive load $L_L$ is rapidly shunted through the emitter-collector path of the second transistor $Q_2$ to be converted into joule heat and quickly dissipated.

In the foregoing, the present invention and its effectiveness have been explained with reference to preferred embodiments. However, particular note should be made of the fact that, as clearly shown in FIG. 22(B), the drive method used in the present method employs pairs of drive signals $S_1$ & $S_2$, $S_3$ & $S_4$ for the pairs of transistors $Q_1$ & $Q_2$, $Q_3$ & $Q_4$ (i.e. the switching elements 18) which when written in logical notation are seen to be in a complementary relationship. More precisely, whenever the first transistor $Q_1$ is on, the second transistor $Q_2$ is off and vice versa; and whenever the third transistor $Q_3$ is on, the fourth transistor $Q_4$ is off and vice versa.

This proves to be quite convenient because the drive signals $S_1$ to $S_4$ for driving the respective transistors can be obtained using a block generator or a timing generator heretofore commercially available as an integrated circuit module and these already available generators are conventionally equipped with complementary output terminals.

Moreover, the complementary drive signals $S_3$ to $S_4$ for the third and fourth transistors $Q_3$ and $Q_4$ are the same as the complementary drive signals $S_1$ to $S_2$ for the first and second transistors $Q_1$ and $Q_2$ except for being generated at a time later by $(P_+ + P_0)$ than the former signals, which makes the use of a conventional timing generator even simpler.

As mentioned earlier, the switching elements used in this invention need not necessarily be the bipolar transistors employed in the embodiments explained above, but may be any other means capable of on/off control in response to a control input and may be freely selected from among appropriate semiconductor switching elements and the like. Further, while the dc power source illustrated in the drawings was described as producing an ac voltage maximum of, for example, 160 V from the start, the invention is not limited to this arrangement and there can alternatively be used the low-voltage dc power from the battery 12. This is feasible since the output from the single-phase invertor can be raised to a higher voltage as required by use of a step-up transformer.

As explained in the foregoing, the drive method used in the present invention is not fundamentally different from that conventionally used in either its static or dynamic aspects. Nonetheless, it is distinguished from prior art methods in that it eliminates the need for a bleeder resistor or other such circuit which constantly consumes electric power and has been heretofore been considered indispensable.

This is because in the present invention there is no period during which all of the switching elements are off, so that currents arising from capacitively stored electric charges or from inductively stored electromagnetic energy, which have been a problem in conventional single-phase invertors, can be discharged through discharge paths established at the beginning of each rest period.

Consider for example the situation at the time the first and fourth switching elements are on during the first conduction period and current is being supplied to the load in the positive direction. Even if a charge should be stored in the capacitors presumed to exist between the terminals of the second and third switching elements which are off at this time, the charge stored in the capacitor presumed to exist between the terminals of the second switching element will be rapidly discharged through the main current path of the second switching element during the succeeding rest period when the first switching element turns off, the fourth switching element remains on and the second switching element turns on. Furthermore, this switching pattern also means that any charge stored in the capacitor between the terminals of the third switching element will not act to cause any significant difference in potential between the single-phase invertor terminals $T_1$ and $T_2$ because, independently of the foregoing, both of these terminals are substantially at ground potential at this time (strictly speaking, are at the voltage during the on state of the emitters and collectors of the transistors).

Similarly during the rest period following the second conduction period, since the second and fourth switching elements are both on, the charge stored in the capacitor between the terminals of the fourth switching element during the preceding second conduction period is discharged through the fourth switching element which is now on so that no significant and undesirable positive voltage arises between the output terminals of single-phase invertors.

The arrangement of this invention is also advantageous in the case of an inductive load since the electromagnetic energy stored in the inductive load can be safely converted to heat and dissipated. Namely, since the fourth switching element remains on in the rest period after the first and fourth switching have been on, and the second switching elements remains on after the second and third switching elements have been on, the current produced by the electromagnetic energy stored in the inductive load can flow through a closed low resistive loop including the protection diode which is normally provided on the other switching element in the on state. It is thus promptly converted to heat and dissipated by, for example, the forward direction resistance of the switching element that is on, whereby the problem encountered in the prior art of a spike voltage being produced across the terminals $T_1$ and $T_2$ of the single-phase inverter can be eliminated.

Therefore, in accordance with this invention, the bleeder resistor circuit or like circuit required in prior art inverters can be omitted, whereby the number of components of the single-phase invertor can be reduced, the conversion efficiency can be enhanced and the overall size of the unit can be made more compact.

In actual practice, the fact that the conversion efficiency of the single-phase inverter increased is advantageous not only from the point of the invertor itself but also from the point of helping to reduce the load on such input side devices as the battery or dc generator serving as the dc power source for the single-phase inverter as well as in some cases the load on peripheral devices such as a transformer for stepping up the output of the single-phase inverter. Thus, this invention can be effectively utilized.

Moreover, in this invention, if for example the on state of a switching element is defined as one logical value and the off state the other logical value, then the first and second switching elements and the third and fourth switching elements constituting series circuits connected in parallel with the dc power source can be viewed as being driven in accordance with mutually opposite logic.

More specifically, it suffices for the relationship between the drive signals for the first and second switching elements and that between the drive signals for the third and fourth switching elements to be complementary. Namely, it suffices if the relationship between the two sets of signals is such that during the first and second conduction periods one of the second and fourth switching elements be off whenever one of the first and third switching elements connected in series therewith is on, and that the first and third switching elements be off whenever the second and fourth switching elements are on.

Expression of the switching sequence as a logical relationship in this way is convenient as regards the design of a timing generator and a driver circuit for driving the switching elements in accordance with a prescribed sequence.

Next a detailed description will be given of a control method and apparatus for stabilizing the high-voltage side output of the single-phase inverter constituting the aforesaid inverter unit 4 by variably controlling the duty ratio of the drive signals $S_1$ to $S_4$ applied to the switching elements 18 in response to the range of the output voltage.

To begin with, it will be explained with reference to FIG. 25 and 26 why the output voltage $V_2$ on the high-voltage side varies with change in the output current $I_1$ on the low-voltage side.

Figure 25:
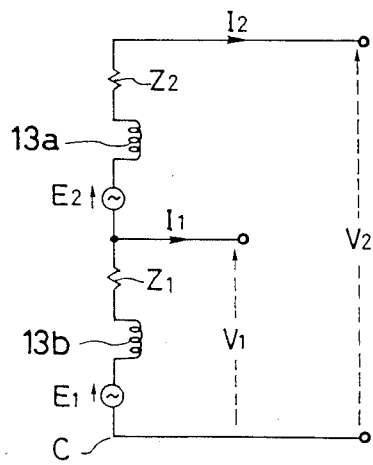
FIG. 25 is an equivalent circuit of a main part of a generator showing the low-voltage and high-voltage coils.

It should be noted that for the sake of simplicity, FIG. 25 shows only the components for one phase of the three-phase star connection of the dual-voltage, high-frequency generator 3b. Moreover, while the output voltages $V_1$ and $V_2$ are in fact obtained after having passed through respective rectifier circuits 52 and 17, these circuits have also been omitted from the drawing for easier understanding.

The meanings of the symbols shown in FIG. 25 are as follows $V_1$: Output voltage on the low-voltage side (detected voltage signal on low-voltage side)

$V_2$: Output voltage on the high-voltage side $E_1$: Electromotive force developed across the terminals of the low-voltage (second coil) 13b $E_2$: Electromotive force developed across the terminals of the coil (first coil) 13a $Z_1$: Impedance of low-voltage side $Z_2$: Impedance of coil 13a side $I_1$: Low-voltage output current $I_2$: High-voltage output current Here, if the number of windings of the low-voltage coil 13b is defined as $N_1$ and the number of windings of the coil 13a is defined as $N_2$, then the relationships expressed by the following equations (1) and (2) hold, and where the load on the high-voltage side is fixed, the relationship of equation (3) also holds.

$$V_1 = E_1 - (I_1 + I_2) \times Z_1 \quad 1)$$

$$E_2 = E_1(1 + N_2/N_1) \quad 2)$$

$$V_2 = V_1 + E_2 - I_2 \times Z_2 \quad 3)$$

As can be seen from equation 1), even if the load $L_D$ on the high-voltage side remains fixed, an increase in the load current $I_1$ will cause the value of the second term on the right side of this equation to increase, with the result that the low-voltage side output voltage $V_1$ will decline.

As was mentioned earlier, in this type of generator first priority is given to stabilization of the output voltage $V_1$ on the low-voltage side. Thus when the low-voltage side output voltage declines in the foregoing manner, the magnetic field is controlled by a regulator in the previously mentioned generator voltage control unit 22 in order to increase the electromotive $E_1$ on the low-voltage side.

Figure 26:
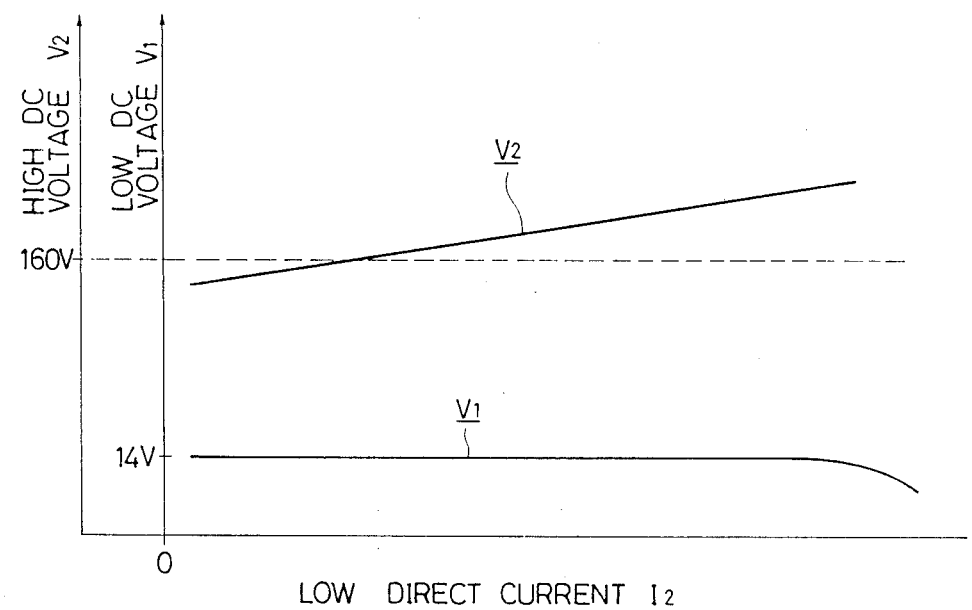
FIG. 26 is a characteristic graph relating to the conventional multi-voltage generator apparatus and showing how the voltages on the high- and low-voltage sides vary with change in the low-voltage side output current.

However, when this is done, since as can be seen from the aforesaid equation (2) the electromotive force $E_2$ of the coil 13a for obtaining the high-voltage output is proportional to the electromotive force $E_1$ across the low-voltage coil 13b, the output voltage $V_2$ on the high-voltage side will increase as shown in FIG. 26 due to the relationship shown in equation (3), even if the current $I_2$ through the high-voltage side load remains constant.

The present invention provides a solution to this problem and, even where, as in the case of a multi-voltage generator apparatus for installation in an automobile, it is inherently necessary from the purpose of use to give priority to stabilization of the output voltage of the low voltage side, it is possible in accordance with this invention to prevent the high-voltage side output voltage from being caused to go beyond the permissible range by variations in the output current of the low voltage-side.

Figure 27:
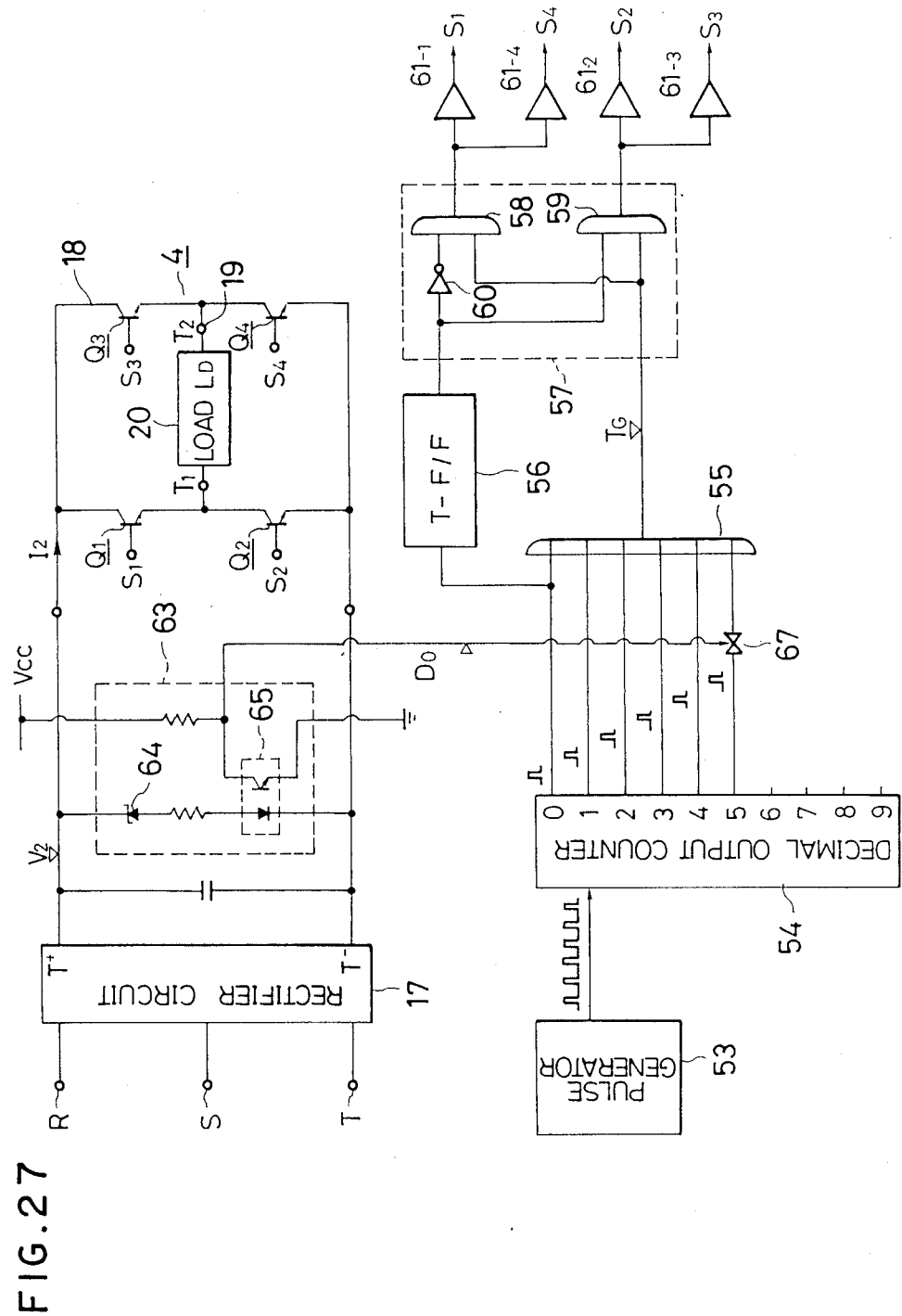
FIG. 27 is a circuit diagram of a control apparatus for a multi-voltage generator apparatus.

FIG. 27 shows an example of a circuit capable of conducting the control required for achieving the aforesaid solution.

The single-phase invertor unit 4 shown in the drawing has its T, S and R input terminals connected respectively to the T, S and R output terminals of the dual-voltage, high-frequency generator 3b shown in FIG. 5.

Denoted by reference numeral 53 in FIG. 27 is a clock pulse generator 53 which produces an output of a frequency that is 20 times that of the frequency of the ac line power to be produced. Namely, were the ac line power is to have a frequency of 50 Hz, the frequency of the output of the clock pulse generator 53 is 1,000 Hz, and where it is 60 Hz, the output frequency is 1,200 Hz.

The pulses output by the clock pulse generator 53 are sent to a decimal output counter 54.

In one sense, the decimal output counter 54 carries out operations similar to a serial input-parallel output 10 bit shift register (and in fact it is alternatively possible to use such a register). As the decimal output counter 54 receives pulses from the clock pulse generator 53, the output terminals of the decimal output counter 54, which for convenience are designated 0 to 9, are successively switched beginning from the lowest order terminal so as to output logical "H" whereafter they stay in the logical "H" state until the next pulse is input, even if a pulse should be output from the generator 53 side.

Of course, however, as is usual in this type of circuit, a pulse received when the 9th terminal is in the logical "H" state causes the 0th terminal to become logical "H".

In this embodiment, the 0th to 4th terminals of the decimal output counter 54 are connected directly to an OR gate 55, while the 5th terminal is connected to the first input of the six-input OR gate 55 through an analogue switch 67 and the remaining 6th to 9th terminals are simply left open.

In this connection, the 6th to 9th terminals are left open since the invention has no need for the "H" signals appearing at these terminals and in actual practice it may be found that the circuit operation is more stable when these terminals are grounded through appropriate resistors.

The analogue switch 67 interposed between the 5th terminal and the OR gate 55 conducts when the value of a detected voltage range signal $D_0$ output by a voltage range detecting circuit 63 is logical "H" and is cut off when it is logical "L".

The voltage range detecting circuit 63 is for monitoring the rectified high dc voltage $V_2$ produced by the rectifier circuit (diode) 17 of the inverter unit 4, and in the embodiment under discussion, a Zener diode 64, a resistor and the light-emitting diode within a photocoupler 65 are connected in series between the output terminals T. and T_ of the rectifier circuit 17.

A pull-up resistor is provided between the detection side element of the photocoupler (in the illustrated arrangement between the collector terminal of a phototransistor) and, for example, the potential $V_{cc}$ which is the power source potential of this circuit and, in fact, is the potential of the battery installed in the automobile.

As a result, when the output potential $V_2$ of the rectifier circuit 17 rises above a given voltage determined by the characteristics of the Zener diode 64 and the photocoupler 65 used, the light-emitting diode within the photocoupler lights and the phototransistor turns on, causing the collector potential to fall to a low value representing logical "L".

In the embodiment under discussion, the threshold voltage $V_{th}$ at the time of this boundary operation is, as relates to the output voltage $V_2$ of the rectifier circuit, 160 V, for example. Therefore, the output of the photocoupler (specifically the collector potential of the phototransistor in the photocoupler), which constitutes the detected voltage range signal $D_0$, is raised to logical "H" when the output voltage $V_2$ of the rectifier circuit is less than the value of $V_{th}$, namely 160 V, and is lowered to logical "L" when $V_2$ becomes equal to or exceeds the threshold $V_{th}$.

When the output voltage $V_2$ of the rectifier circuit 17 is lower than the threshold $V_{th}$, the detected voltage range signal $D_0$ supplied to the analogue switch 67 causes the analogue switch 67 to conduct, so that six terminals of the decimal output counter 54, namely the 0th to 5th terminals, are connected with the OR gate 55.

Figure 28:
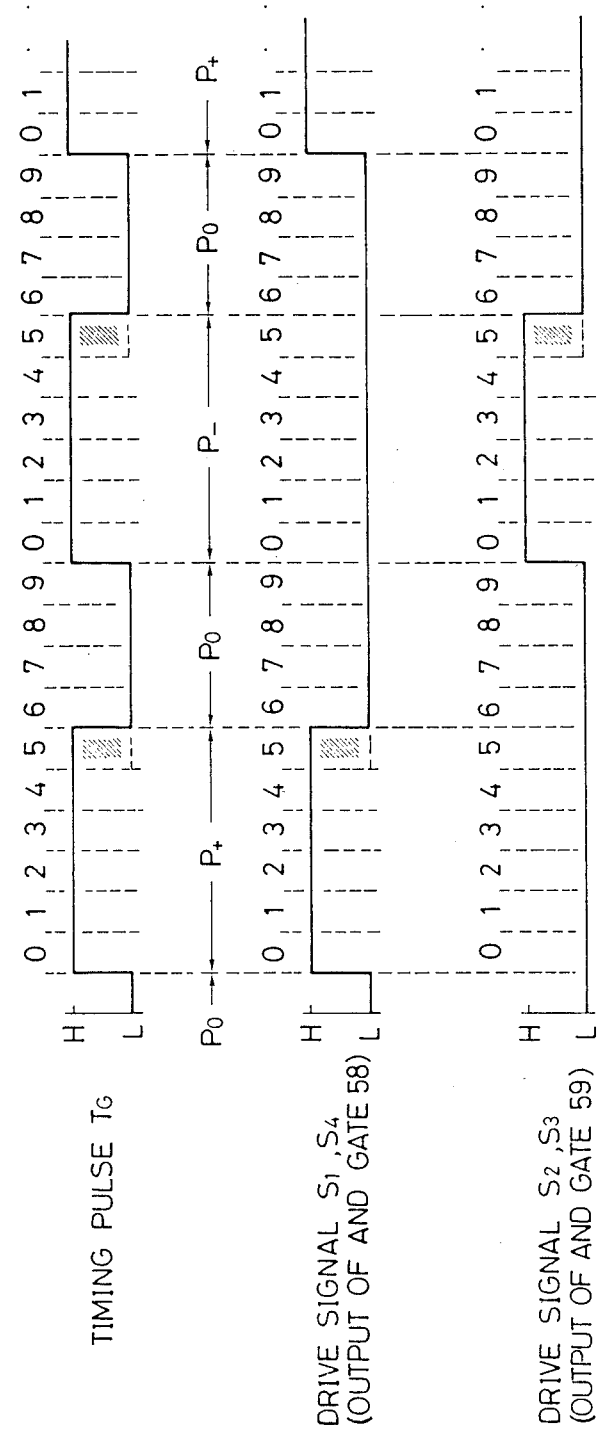
FIG. 28 shows waveform diagrams for explaining the operation of the control device of FIG. 27.

As a result, the OR gate 55 outputs the timing pulse train $T_G$ shown at the top of FIG. 28, which has a duty ratio of 60% and a frequency of either 100 Hz or 120 Hz, depending on whether the frequency of the clock pulses is 1,000 Hz or 1,200 Hz.

More specifically, the 0th to 5th terminals of the decimal output counter 54 are sequentially raised to the logical "H" level by consecutive pulses received from the clock pulse generator 53, during which time the output of the OR gate 55 is maintained at logical "H". Upon receipt of the pulses following the one that causes the 5th terminal of the decimal output counter 54 to assume the logical "H" state, however, the 6th to 9th terminals are sequentially raised to the logical "H" level and during this period and up to the time that the output at the 0th terminal again becomes logical "H", the OR gate 55 maintains an output of logical "L" since it receives no logical "H" input from the 6th to 9th terminals which are not connected thereto.

The frequency of the timing pulse train $T_G$ is double that of the desired frequency of the high-voltage ac wave to be supplied to the load $L_D$ via the high-voltage terminals $T_1$ and $T_2$. The timing pulse train $T_G$ is therefore sent to a signal frequency divider 57.

In the present embodiment, the signal frequency divider 57 is constituted of two AND gates 58 and 59 and an invertor 60 connected with one input of the AND gate 58. The timing pulse train $T_G$ output by the OR gate 55 is applied to one input of each of the AND gates 58 and 59, and the output of a T-flipflop 56 having its input connected with the 0th terminal of the decimal output counter 54 is connected with both the input of the invertor 60 and with the other input of the AND gate 59.

As will be understood from the arrangement described above, the output of the T-flipflop 56 reverses from logical "H" to logical "L" and vice versa each time a logical "H" output appears at the 0th terminal of the decimal output counter 54, so that every other pulse of the timing pulse train $T_G$ assumes the same logical value.

Since the AND gate 59 receives the output of the T-flipflop 56 as it is and the AND gate 58 receives the same after it has been reversed by the invertor 60, the AND gates 58 and 59 are alternately enabled with successive cycles of logical "H" output at the output terminals of the decimal output counter 54. As a result, every other pulse of the timing pulse train $T_G$ passes through a different one of the AND gates 58 and 59.

The output of the AND gates 58 and 59 is thus as shown in FIG. 28. Namely, the frequency of the train of significant logical "H" pulses output by each gate is one half that of the timing pulse train $T_G$, whereby a frequency of 50 Hz is obtained in the case where the frequency of the clock pulse train is 1,000 Hz and a frequency of 60 Hz is obtained where the frequency of the clock pulse train is 1,200 Hz. Moreover, the pulse trains from the two AND gates 58 and 59 are 180 degrees out of phase.

The output of the AND gate 58 is appropriately amplified by, for example, buffer amplifiers $61_{-1}$ and $61_{-4}$, while the output of the AND gate 59 is amplified by buffer amplifier $61_{-2}$ and $61_{-3}$, whereby there are obtained the drive signal $S_1$, $S_4$, $S_2$ and $S_3$ for selectively driving the switching elements 18 of the switching circuits of the invertor unit 4 shown in FIG. 27. In this case, there can be obtained a waveform with a duty ratio of 60% between the terminals $T_1$ and $T_2$.

An explanation will now be given regarding the on-state duty ratio of the transistors $Q_1$ to $Q_4$.

In the aforesaid invertor unit 4, the length of the unit cycle $(P_+ + P_0 + P_- + P_0)$ is, for example, set at 20 mS in the case where it is desired to obtain an output frequency of 50 Hz and at 16.7 mS where an output frequency of 60 Hz is desired. Where the on-state duty ratio $P_+/(P_+ + P_0)$ of the respective transistors $Q_1$ to $Q_4$ is 0.5 (i.e. 50%), the voltage required to be input to the switching circuit (corresponding to the switching elements 18) for obtaining the desired effective 115 V output between the terminals $T_1$ and $T_2$, i.e. the required output voltage of the rectifier circuit 17, is about 160 V, and where the duty ratio is 60%, is 150 V.

Thus when the output voltage $V_2$ of the rectifier circuit 17 in the invertor unit 4 rises and exceeds the set threshold voltage $V_{th}$ of 160 V, this is detected by the photocoupler 65 of in the voltage range detecting circuit 63 and the detected voltage range signal $D_0$ assumes the value of logical "L".

As a result, the analogue switch 67 is cut off (blocked), whereby the situation becomes equivalent to that in which the only the 0th to 4th terminals among the ten output terminals of the decimal output counter 54 are connected with the OR gate 55.

As will be clear from the aforesaid mechanism, when this state occurs, the period of time over which the OR gate 55 maintains a logical "H" output becomes half of the time required for the decimal output counter 54 to count ten clock pulses from the clock pulse generator 53. Therefore, the timing pulse train $T_G$ and accordingly each of the two phase-shifted pulse trains $S_1$ & $S_2$ and $S_3$ & $S_4$ obtained by frequency dividing the timing pulse train $T_G$ will be missing the hatched block portions in FIG. 28, whereby the duty ratio will fall to 50%.

As a result, even though the output appearing across the terminals $T_1$ and $T_2$ will continue to have the same square Waveform, the fact that the duty ratio has been dropped to 50% from 60% will make it possible to prevent the effective value of the ac voltage appearing across the terminals $T_1$ and $T_2$ to which the load $L_D$ is connected from rising above the permissible range of 115 V ± 10 V when the output of the rectifier circuit 17 rises above 160 V, as might happen if the duty ratio were maintained at the preceding level of 60%. It thus becomes possible to maintain the effective value of the ac output voltage within the permissible range.

Figure 29:
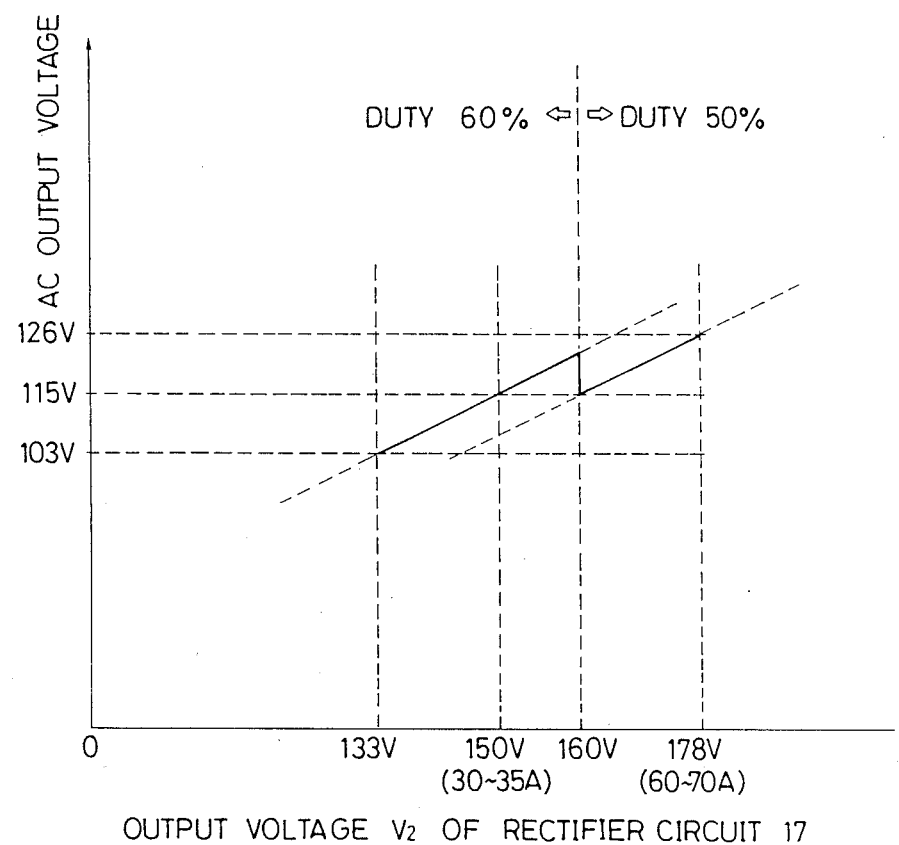
FIG. 29 is a characteristic graph for explaining the high-voltage side output stabilization characteristics obtained by use of the control apparatus of FIG. 27.

This is verified by the results shown in FIG. 29 for an actual automobile generator apparatus according to this invention. These results are typical for the improved automobile generator apparatus according to this invention having the drive signal generation system shown in FIG. 27. As will be noted, the design was such that the output voltage $V_2$ of the rectifier 17 of the inverter unit 4 was 123 V when the low-voltage side output current $I_1$ was zero (no load state), was 150 V when $I_1$ was 30-35 A, and was 178 V when $I_1$ was 65-70 A.

The magnetic field of the generator was of course controlled such that the output voltage V on the low-voltage side was sufficiently stabilized against increase in the output current $I_1$ on the low-voltage side.

It is thus clear that the ac output appearing between the terminals $T_1$ and $T_2$ was held within the range of 115 V ± 10 V within the permissible output voltage range of 133–178 V of the rectifier circuit. This is attributable to the fact that the present invention enables the duty ratio on the high-voltage side to be switched from 60% to 50% in response to the output voltage $V_2$ rising above the threshold value of 160 V.

This effect of the invention will be better understood by an examination of the phantom line portions shown in FIG. 29. These indicate how the ac output voltage changes in a conventional system having a fixed duty ratio. As will be noted, so long as the duty ratio is fixed, be it at 50% or 60%, the range over which the ac output voltage is maintained within the desired limits of 115 V±10 V is fairly narrow.

Thus, as is clear from the foregoing, by dint of the principle on which it operates, this embodiment of the invention is able to provide excellent stability not only of the low-voltage output but also of the high-voltage output. At the same time, however, its method of control based on a threshold value is apt to give rise to hunting in which the control input (i.e. the output voltage $V_2$ of the rectifier circuit 17) rises and falls in the vicinity of the threshold value $V_{th}$ within a short period of time, and this problem deserves further attention from the practical standpoint.

In a system of the type that the present invention pertains to, such hunting will become a cause of flickering in the case where the load $L_D$ is, for example, an electric lamp or the like and may even become a cause for breakdown in the case of a motor load or the like. Furthermore, when the control causes frequent change in the duty ratio in the vicinity of the threshold value, the attendant switching noise may reach on-board audio equipment and cause audible noise.

As a countermeasure against these problems it is effective to establish not a single threshold value for use in changing the duty ratio but a pair of threshold values, one constituting an upper trip point (UTP) and the other constituting a lower trip point (LTP), and to establish hysteresis characteristics between these two points.

Figure 30:
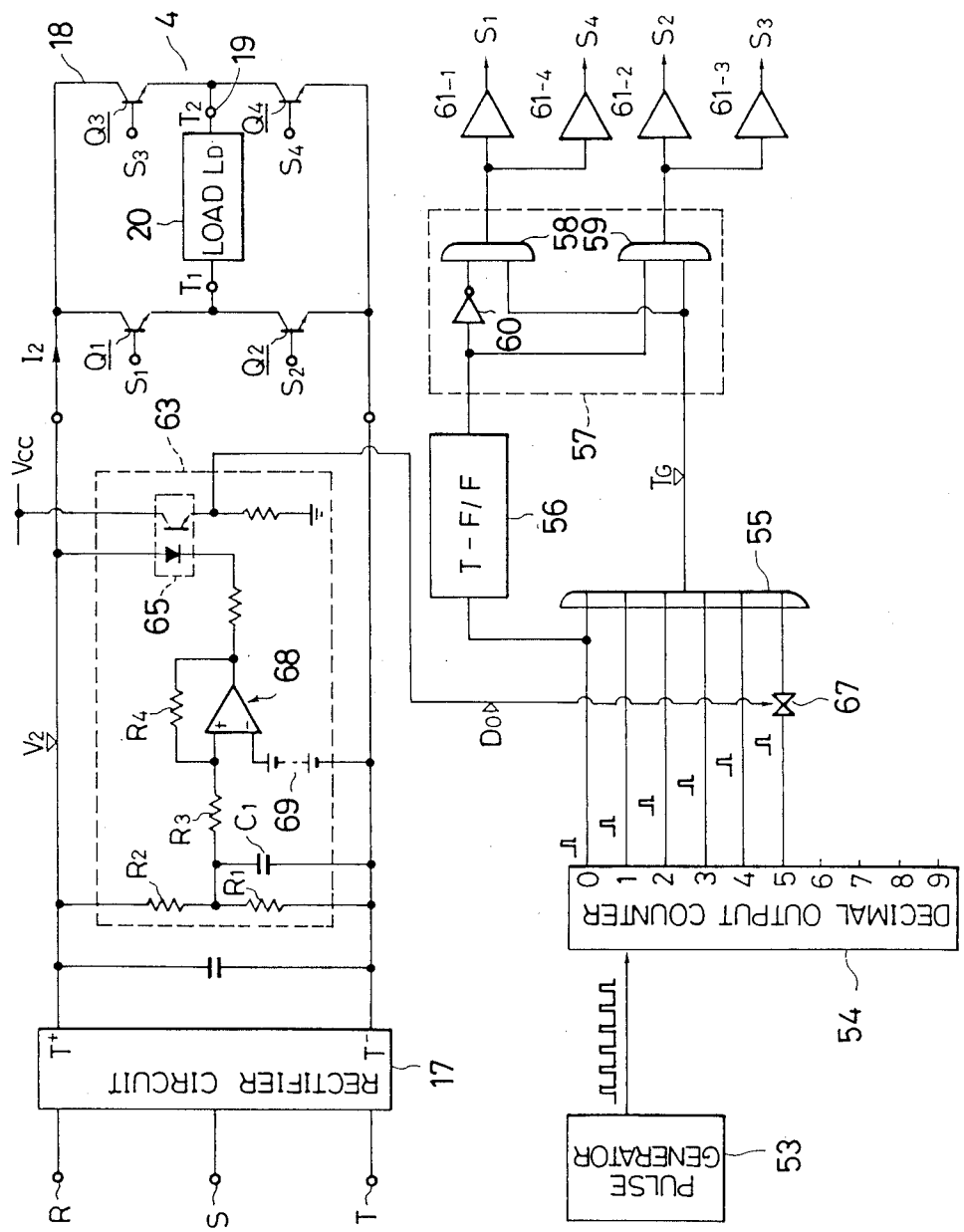
FIG. 30 is a circuit diagram of another embodiment of a control apparatus for a multi-voltage generator apparatus.
Figure 31:
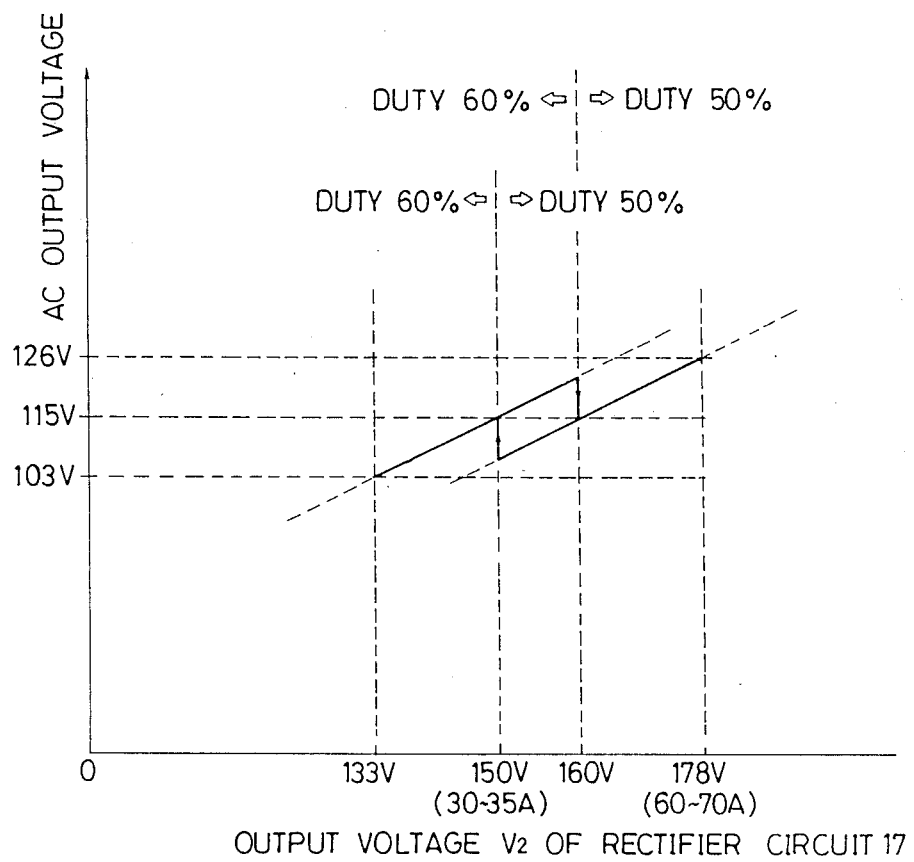
FIG. 31 is a characteristic graph for explaining the high-voltage side output stabilization characteristics obtained by use of the control apparatus of FIG. 30.

An embodiment of the invention based on this concept is illustrated in FIGS. 30 and 31. It should be noted, however, that this embodiment is essentially one relating to an improvement in the voltage range detecting circuit 63 of the embodiment illustrated in FIG. 27. Thus in FIG. 30, those members which are the same as those in the embodiment of FIG. 27 are assigned like reference numerals and will not be explained again here.

It may be helpful to begin the explanation with reference to the aforesaid results. As shown in FIG. 31, in the control apparatus according to this embodiment, when the output voltage $V_2$ of the rectifier circuit 17 of the invertor unit 4 is rising because of an increase in the low-voltage output current $I_1$, the duty ratio of the timing pulse train $T_G$ is modified from 60% to 50% at the time that voltage $V_2$ moves above a first threshold value $V_{th1}$ of 140 V, and, on the contrary, when the output voltage $V_2$ of the rectifier circuit 17 is falling, the duty ratio is restored to its original 60% at the time the voltage $V_2$ moves below a second threshold value $V_{th2}$ of 150 V.

As a result, once the UTP defined by the first threshold value $V_{th1}$ has been exceeded and the duty ratio has been set at 50%, this setting of the duty ratio will not thereafter be changed simply by the output voltage $V_2$ of the rectifier circuit 17 falling below $V_{th1}$ of 160 V and will be changed back to 60% only when $V_2$ falls below the second threshold value $V_{th2}$ of 150 V.

The reverse is also true. When the duty ratio has once been set at 60% because the output voltage $V_2$ of the rectifier circuit 17 went below the second threshold value $V_{th2}$ of 150 V, it will not be restored to 50% simply as a result of $V_2$ thereafter rising above the second threshold value but will be lowered to 50% only when $V_2$ exceeds the first threshold value $V_{th1}$ of 160 V. The foregoing is illustrated in the characteristic graph of FIG. 31 with the one-way hysteresis characteristic indicated by arrows.

When the change of duty ratio is controlled in this way rather than with respect to a single boundary value, it obviously becomes possible to avoid the hunting problem that would otherwise arise in conjunction with variation in the output voltage $V_2$ in the vicinity of the threshold value, and thus to eliminate the various problems associated with such hunting.

It is, however, possible to realize the aforesaid hysteresis characteristics by a circuit appropriately designed using conventional electronic circuitry techniques. Thus the circuit shown in FIG. 30 is merely an example of one that can be used in the present embodiment and should not be considered as being limitative in any way. This being said, an explanation will now be given with respect to the voltage range detecting circuit 63 used in the circuit shown in FIG. 30. The voltage $V_2$ output by the rectifier circuit 17 in the invertor unit 4 and constituting the control input is dropped to an appropriate level by a voltage divider circuit constituted of resistors $R_1$ and $R_2$ and the resulting voltage is applied to the positive phase input of a comparator 68 (which can be constituted as an operational amplifier). THe capacitor $C_1$ parallel with lower resistor $R_1$ of the divider circuit is for eliminating ripples.

To the other input (the reverse phase input) of the comparator 68 is applied a reference voltage 69, which for ease of explanation is illustrated as being supplied by a battery The output of the comparator 68 is connected to the cathode of the light-emitting diode of the photocoupler 65 through a series-connected protective resistor.

The anode of the light-emitting diode within the photocoupler 65 is connected to the positive terminal of the rectifier circuit 17. Therefore, if the voltage at the positive phase side input becomes lower than the reference voltage applied to the reverse phase input side of the comparator 68, the output at the output terminal of the comparator 68 will become low (substantially ground level) and the light-emitting diode will light On the other hand, if the voltage on the positive phase side of the comparator 68 becomes higher than the reference voltage, the output of the comparator 68 will become high level and the light-emitting diode will go off.

Reversely from the preceding embodiment, in this embodiment, for convenience of circuit design, lighting of the light-emitting diode indicates the need to select a relatively high duty ratio of 60% and extinguishment thereof indicates the need to select a relatively low duty ratio of 50%. Therefore, the detected voltage range signal $D_0$ output by the voltage range detecting circuit 63 is taken from the connection point between the emitter of the phototransistor in the photocoupler and a resistor connecting this emitter to ground, so that there will be obtained a logical "H" when the phototransistor is on and a logical "L" when it is off.

The operating mechanism when the detected voltage range signal $D_0$ is logical "H" and logical "L" is, however, identical to that explained earlier with reference to FIG. 27. Namely, when it is logical "H", the analogue switch 67 is made conductive so that the 0th to 4th terminals of the decimal output counter 54 receive inputs and the timing pulse train $T_G$ appearing at the output of the six-input OR gate 55 is set to a duty ratio of 60%, and when it is logical "L", the analogue switch 67 is cut off so that only the 0th to 5th terminals of the decimal output counter 54 receive inputs and the timing pulse train $T_G$ is set to a duty ratio of 50%.

Thus, so as to establish the prescribed hysteresis characteristics shown in FIG. 31 as regards the voltage relationship on the input side of the comparator causing a change in duty ratio, a feedback resistor $R_4$ is provided between the output and the positive phase input of the comparator 68, as is commonly done in circuits of this type. It will be understood that in the design of the circuitry, the value of the feedback resistor $R_4$, the value of the reference voltage 69, and the voltage-dividing ratio of the voltage dividing circuit are set so as to obtain the desired circuit characteristics, e.g. to obtain a threshold $V_{th1}$ of 160 V and a threshold $V_{th2}$ of 150 V as shown in FIG. 31.

The invention is of course not limited to the circuit arrangement just described. The hysteresis circuit can alternatively be designed to enable substantial variation of the reference voltage. Regarding the reference voltage, moreover, the potential $V_{cc}$ of the battery installed in the automobile may alternatively be used as a bias potential or there can be used the output of a separately provided stabilized power source of appropriate precision. As a practical matter, a degree of stabilization of the reference voltage sufficient for a multi-voltage automobile generator apparatus employing the circuit of FIG. 30 can generally be obtained using only a Zener diode as the means for stabilization.

While two embodiments of this aspect of the invention have been described in detail, various other arrangements are also possible within the concept of the invention.

For example, in the circuits shown in FIGS. 27 and 30, as regards the buffer amplifiers $61_{-1}$ and $61_{-4}$ which individually receive the output of the AND gate 58 and produce the drive signals $S_1$ and $S_4$, respectively, it is possible to insert an invertor ahead of the buffer amplifier $61_{-4}$. In this case, the output of the buffer amplifier $61_{-1}$ having no invertor ahead of it can continue to be used as the drive signal $S_1$ for driving the first switching element (transistor) $Q_1$ as in the foregoing embodiments while the output of the buffer amplifier $61_{-4}$ having the invertor on its input side can be used as the drive signal $S_2$. In this case, of the buffer amplifiers $61_{-2}$ and $61_{-3}$ which individually receive the output of the AND gate 59 and produce the drive signals $S_2$ and $S_3$, one, namely the buffer amplifier $61_{-2}$, is similarly provided on its input side with an invertor, whereby the output of the buffer amplifier $61_{-3}$ having no buffer ahead of it can continue to be used as the drive signal $S_3$ for driving the third switching element $Q_3$ as in the foregoing embodiments while the output of the buffer amplifier $61_{-2}$ having the invertor on its input side can be used as the drive signal $S_4$.

Further, the stage for varying the duty ratio is of course not limited to the two-step arrangement exemplified in the foregoing embodiments. Namely, the number of steps can be increased, which will ensure better precision but also results in higher cost.

As is clear from the foregoing description, the control method and apparatus according to the aspect of the invention under discussion are characterized in that they enable the duty ratio of the drive signals for the switching elements in the invertor unit to be varied in accordance with the output voltage range, which is a feature not attainable with the conventional invertor unit having a fixed duty ratio.

In the present invention, when the output voltage of the invertor unit threatens to become too high, the duty ratio is lowered so as to shorten the on-time of the switching elements in the invertor unit and, reversely, when said output voltage threatens to fall to low, the duty ratio is increased.

By way of a specific example, the switching elements are controlled to be driven at a duty ratio of 60% when the output voltage of the rectifier circuit becomes 160 V or less and to be driven at a duty ratio of 50% when this output voltage exceeds 160 V.

Moreover, the invention also encompasses the concept of establishing hysteresis characteristics with respect to the output voltage level of the rectifier circuit at which the switchover back and forth between, for example, 60% and 50% is to be conducted. For this there are established first and second thresholds of different values, by which it is possible to eliminate the problem of hunting that is apt to occur where control is conducted on the basis of only a single threshold value and also to obviate the various secondary problems that such hunting gives rise to.

The invention also conceptually encompasses multi-step variation of the duty ratio in which control is carried out on the basis of a plurality of threshold values or a plurality of pairs of threshold values, as well as continuous, analogue control of the duty ratio.

In the case of multi-step control, the control characteristics naturally improve in proportion as the number of steps (duty ratio switchover points) increases. However, the cost of the system is also increased by the provision of more steps and, therefore, in the development of a marketable product, it is necessary to determine the number of steps on the basis of a tradeoff between quality and cost.

In this connection, the actual state of affairs is that, as will become clearer from the other embodiments of the invention to be described later, it is generally adequate to provide one or one pair of duty ratio switchover points.

At any rate, the arrangement according to the present invention is advantageous over the drive control carried out on the basis of a fixed duty ratio as in prior art apparatuses in that it is able to hold within narrow limits the range of fluctuation in the output of the invertor unit caused by fluctuations in the high output voltage produced by the generator 3b (in the high-voltage dc output of the rectifier 17), and that it is able to realize this effect without increasing the size of the generator.

A still further advantage of the invention is that it is able to ensure safe operation of the high-voltage side load while at the same time giving the required priority to stabilization of the output voltage on the low-voltage side.

Next there will be explained a method of controlling the invertor output in the case where a transient over-current state arises.

Figure 32:
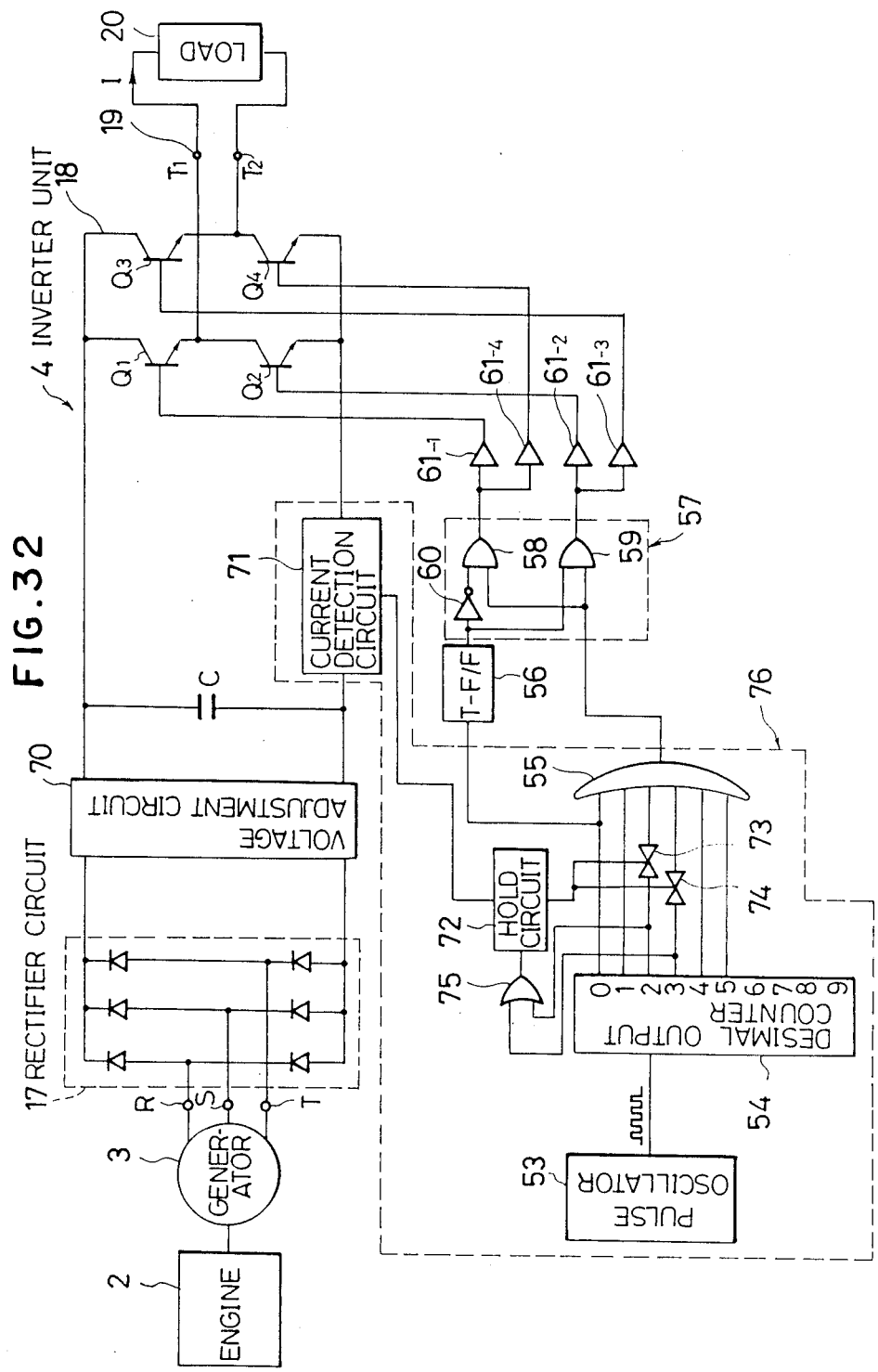
FIG. 32 is a circuit diagram of a current limiting apparatus for limiting the output current of the invertor unit.

FIG. 32 shows an example of a circuit for limiting output current, within an overall view including the generator 3 and the engine 2. Components of the circuit which are the same as those of the embodiment described earlier with reference to FIG. 27 have been assigned the same reference numerals as the corresponding components of FIG. 27. Although there will inevitably be some repetition of description, the entire structure of the circuit shown in FIG. 32 will, for the sake of clarity, be explained in detail.

In accordance with this aspect of the invention, when a transient overcurrent state arises in the invertor output, the output current is temporarily limited by removing the center portion from each squarewave of the inverter output.

When the center portions of the squarewaves are removed in this way, a large current limiting effect is obtained with only a slight reduction in the output voltage.

Moreover, the removal of the center portions of the squarewaves does not cause any change in the frequency of the ac line power output by the invertor.

In the circuit of FIG. 32, the output of the generator 3 is first converted to direct, current by the rectifier circuit 17 in the inverter unit 4 and the voltage of the resulting direct current is stabilized in a voltage regulator 70. A current detector circuit 71 is provided in one of the lines connecting the voltage regulator 70 with an output stage constituted of the transistors $Q_1$ to $Q_4$. Any transient overcurrent flowing through a load (piece of equipment) 20 connected between the output terminals $T_1$ and $T_2$ of the inverter unit 4 is detected by the current detector circuit 71. The result of the detection is amplified and output as a detected current signal to a hold circuit 72 to be describe later.

The output of the clock pulse generator 53, which is set to produce 20 pulses within the time period of a single cycle of ac line current, is supplied to the decimal output counter 54. With each succeeding pulse received, the decimal output counter 54 outputs a pulse from the next highest numbered output terminal, beginning from the 0th output terminal. The 0th to 5th output terminals of the decimal output counter 54 are connected with respected input terminals of the six-input OR gate 55. Among these terminals, the 2nd and 3rd ones are connected to the OR gate 55 through respective inverting analogue switches 73 and 74.

Further, the 2nd and 3rd output terminals of the aforesaid counter 54 are connected to the hold circuit 72 via an OR gate 75 and the output terminal of the hold circuit 72 is connected to the control input terminals of the inverting analogue switches 73 and 74.

Figure 33:
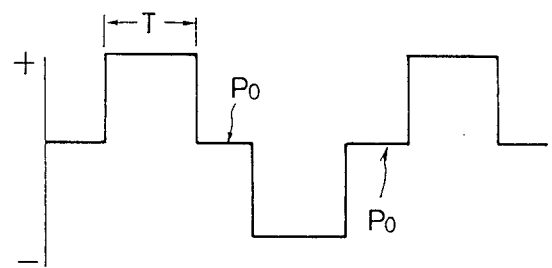
FIG. 33 is a diagram showing the voltage waveform output by the invertor during normal operation.

The 6th to 9th terminals of the decimal output counter 54 are left open and across the output terminals $T_1$ and $T_2$ of the inverter unit 4, there is obtained a squarewave which, as shown in FIG. 33, includes rest periods $P_0$.

The 0th terminal of the decimal output counter 54 is also connected with input terminal of the T-flipflop 56, the output terminal of which is connected with one input terminal of the AND gate 59 and also through the invertor to one input terminal of the AND gate 58.

The output terminal of the six-input OR gate 55 is connected with the respective other terminals of the AND gates 58 and 59. The output terminal of the AND gate 58 is connected with the base of the transistor $Q_1$ through the buffer amplifier $61_{-1}$ and with the base of the transistor $Q_2$ through an inverting buffer amplifier $61_{-4}$, while the output terminal of the AND gate 59 is connected with the base of the transistor $Q_3$ through the buffer amplifier $61_{-2}$ and with the base of the transistor $Q_4$ through an inverting buffer amplifier $61_{-3}$.

The clock pulse generator 53, decimal output counter 54, OR gates 55 and 75, the inverting analogue switches 73 and 74, the hold circuit 72 and the current detector circuit 71 together constitute a waveform signal generator 76, and inverter 60 and the AND gates 58 and constitute a signal frequency divider 57.

The operation of the so-constituted current limiting circuit will now be explained.

At the time an overcurrent state is not detected in the current detector circuit 71, since no control signal is output by the hold circuit 72 to the inverting analogue switches 73 and 74, the inverting analogue switches 73 and 74 are in conductive state.

Thus, similarly to what was explained in conjunction with the earlier embodiments, with each succeeding pulse input to the decimal output counter 54 from the clock pulse generator 53, the output terminals of the decimal output counter 54 become active (high level) in succession beginning from the 0th terminal and these output pulses are successively input to the six-input OR gate 55.

When the 0th to 5th terminals of the decimal output counter 54 become successively active, the OR gate 55, which operates on the basis of the logical sum of the counter output, outputs high level (H level) timing pulses to the signal frequency divider 57. The width of these timing pulses corresponds to the pulse width T of the square wave output from the output terminals $T_1$ and $T_2$ of the invertor unit 4.

The T-flipflop 56, which reverses its output each time it receives a pulse at its input terminal, supplies an H-level pulse (for example) to the signal frequency divider 57 when the 0th terminal of the decimal output counter 54 becomes active. This H-level output is maintained until the output of the decimal output counter 54 makes a full cycle and the 0th terminal again become active.

Therefore, the output of the AND gate 58 of the signal frequency divider 57 at this time become low level (L level), putting the transistor $Q_1$ in off state and the transistor $Q_2$ in on state. On the other hand, the output of the AND gate 59 stays at H level during the period that the timing pulse is output by the OR gate 55, whereby the transistor $Q_3$ is put in the on state and the transistor $Q_4$ is put in the off state.

Once the output of the decimal output counter 54 has completed a full cycle and the 0th terminal becomes active again, the output of the T-flipflop 56 reverses to the L level so that the transistor $Q_1$ is turned on, transistor $Q_2$ is turned off, transistor $Q_3$ is turned off and transistor $Q_4$ is turned on. During the period when no signal is being output by the OR gate 55 (rest period), the outputs of both the AND gates 58 and 59 assume L level so that the transistors $Q_1$ and $Q_3$ are off and transistors $Q_2$ and $Q_4$ are on, allowing the back electromotive force or the like from the load to be absorbed.

The aforesaid operation is then repeated to produce a square voltage wave output as shown in FIG. 33 at the terminals $T_1$ and $T_2$ of the invertor unit 4. The frequency of this output is set to be the same as that of ac line power.

In contrast, when the current detector circuit 71 detects that a transient overcurrent state has arisen such as at the time of start-up of a motor or other load 20, it sends a signal representing this state to the hold circuit 72. On receiving the signal, the hold circuit 72 outputs a control signal to the control input terminals of the inverting analogue switches 73 and 74 only during the period that it is detected from the output of the OR gate 75 that one or the other of the 2nd and 3rd output terminals of the decimal output counter 54 is active.

As a result the inverting analogue switches 73 and 74 are turned off and no pulses are supplied from the 2nd and 3rd output terminals of the decimal output counter 54 to the OR gate 55, whereby the center portions in the width of the timing pulses output from the OR gate 55 are removed, i.e. reduced to zero level.

Figure 34A:
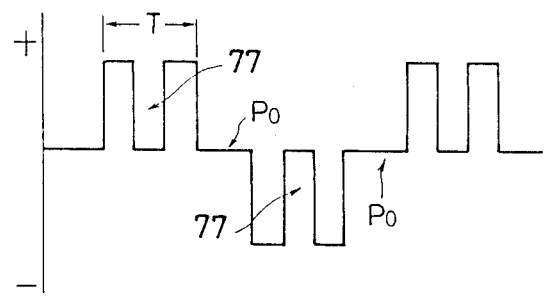
FIG. 34(A) is a diagram showing the voltage waveform output by the invertor during limited current operation.
Figure 34B:
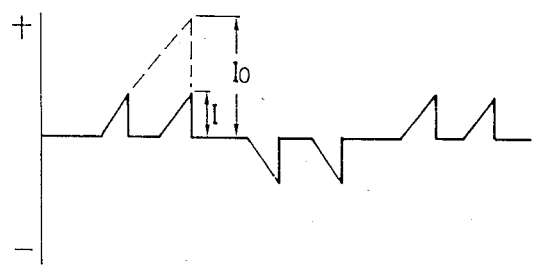
FIG. 34(B) is a diagram showing a rectified waveform corresponding to FIG. 34(A).

Therefore, as shown in FIG. 34(A), the squarewaves of the voltage output from the terminals $T_1$ and $T_2$ of the invertor unit 4 are missing their center portions. In FIG. 34(A), the reference numeral 77 designates the missing portion When the center portions of the voltage waves are missing in this way, the current I through the load 20 is held to a low level as shown in FIG. 34(B) and the output current is temporarily limited In FIG. 4(B), the dotted line current wave indicates the current $I_0$ that would flow if the central portions of the voltage waves were not removed If an excessively large current $I_0$ of this type should arise, it would ordinarily become necessary to temporarily discontinue power output (trip state) in order to protect the transistors $Q_1$ to $Q_4$.

Removal of the center portions of the output voltage waves in the foregoing manner produces only a slight reduction in the output voltage but has a large effect toward limiting the current. Moreover, even when the center portions of the waves are removed, the frequency of the output still remains the same as that of ac line power so that there is no adverse effect on the load no matter what type it is.

In the embodiment described above, the hold circuit 72 serves to hold inverting analogue switches 73 and 74 in the off state for a fixed period of time irrespective of whether the output should momentarily assume a non-overcurrent state. Alternatively, however, it is possible to omit the hold circuit 72 and switch the inverting analogue switches 73 and 74 off only when an overcurrent state is occurs in the load 20.

According to the output current limiting method of this invention described above, by removing the central portions of the squarewaves in the output voltage waveform, it becomes possible to temporarily limit the current at the time an overcurrent state arises in such a manner that the output voltage is reduced only slightly while obtaining a large current limiting effect.

The conventional method of dealing with an overcurrent state has been to operate a protection circuit for stopping the inverter output, which causes various inconveniences. This problem is overcome by this invention.

Moreover, since the removal of the central portions of the output squarewaves does not change the frequency of the inverter this method of control is ideal for use in supplying ac line power to a plurality of loads that may be of various different types.

Where a motor or the like which presents a large load at start-up is to be operated, the method according to the present invention will tend to cause some increase in the start-up time but this disadvantage is more than overcome by the fact that the transition to a stable state can be realized while appropriately controlling the start-up current.

Further, where a load having a large capacitance is plugged in at the time a plurality of other loads are being operated by the automobile generator apparatus, the present invention enables control of the surge current tending to occur at the time the load with large capacitance is turned on.

Next with reference to FIG. 35 there will be explained a method for controlling the low-voltage side output current of the dual-voltage, high-frequency generator 3b so as to prevent an unnecessarily large current from flowing through the low-voltage side load.

Figure 35:
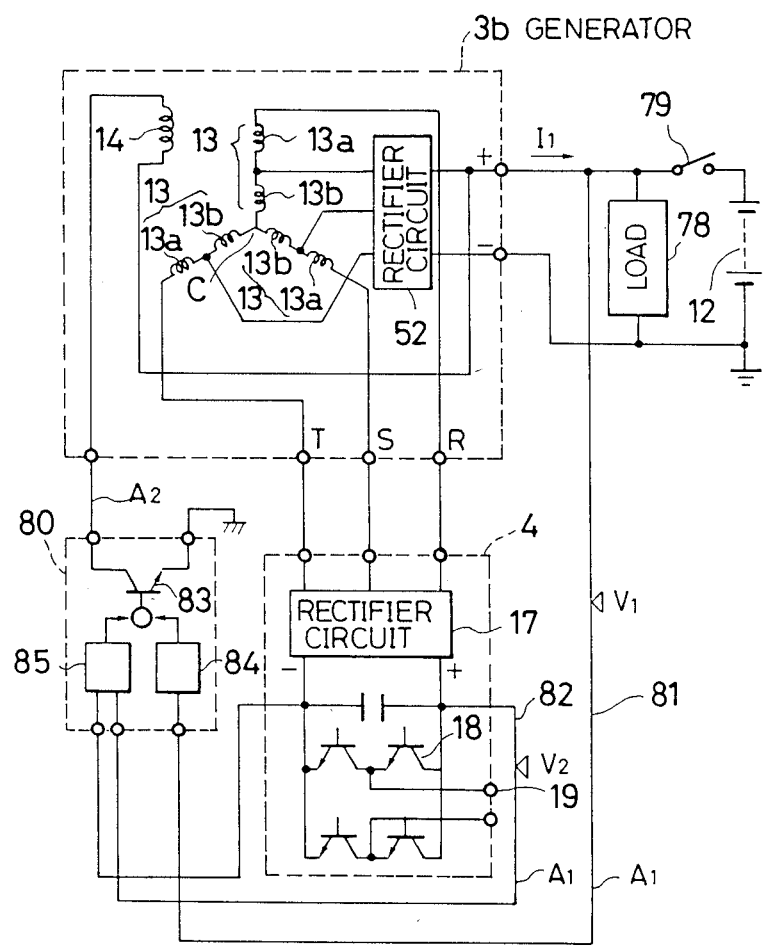
FIG. 35 is schematic view of an automobile generator apparatus provided with a control apparatus for limiting the low-voltage, side output current.

In the circuit shown in FIG. 35, the voltage appearing between the positive and negative terminals of a low-voltage side rectifier circuit 52 is supplied both to a low-voltage load 78 and to the terminals of the battery 12. As the generator 3b in this embodiment is of the type having a field coil which produces a magnetic field flux upon being supplied with a direct current, the positive terminal of the battery 12 is arranged to be connected with the field coil 14 of the rotor of the generator 3b through an ignition switch 79 and a regulator 80. As was explained earlier, the regulator 80 is provided in the voltage control unit 22 within the invertor unit 4.

As will be explained later, the line 81 connecting the positive terminal of the battery 12 with the regulator 80 also serves as a detection line for the voltage $V_1$ actually being produced on the low-voltage side.

This embodiment of the invention is also provided with a detection line 82 for the voltage $V_2$ actually being produced on the high-voltage side, through which a detected high-voltage signal is sent to the regulator 80.

As will be explained in more detail later with respect to the operation of the regulator 80, the regulator 80 has a control circuit 84 for controlling a current control section constituted as a switching transistor 83 or the like on the basis of the detected low-voltage side voltage $V_1$ received via the low-voltage side detection line 81 and a control circuit 85 for controlling the switching transistor 83 on the basis of the detected high-voltage side voltage $V_2$ received via the high-voltage side detection line 82. In actual operation, the control circuit 84 functions to stabilize the low-voltage side output voltage within a relatively low current range not higher than an arbitrarily settable maximum permissible current value $I_{1MAX}$ of the low-voltage side output current $I_1$, while the control circuit 85 functions to limit the low-voltage side output current $I_1$ to not higher than the maximum permissible current value $I_{1MAX}$ by stabilizing the high-voltage output in a relatively high current range at which the low-voltage side output current $I_1$ threatens to exceed the maximum permissible current value $I_{1MAX}$.

The rotor of the generator 3b is driven to rotate by the output shaft of the engine 2. A single field coil 14 wound on the rotor serves all stator side first and second coils 13a, 13b. Stated differently, the magnetic field formed by passing exciting current through the field coil 14 acts on the three star connected sets of coils 13a, 13b as well as on the equivalent coils 13 constituted by series-connected coils 13a, 13b.

With the so-arranged generator 3b used in this embodiment the field coil 14 is thus constituted as a single circuit (where two or more field coils are used, they are connected in parallel), current is passed through the field coil 14, and two orders of voltage (high and low) can be simultaneously generated by the generator and also be simultaneously controlled.

In accordance with the present aspect of the invention, depending on the magnitude of the value of the output current $I_1$ on the low-voltage side, either the voltage $V_1$ actually being produced on the low-voltage side or the voltage $V_2$ actually being produced on the high-voltage side is detected and the magnetic field is controlled accordingly, whereby the output voltage can be stabilized not only on the low-voltage side but also on the high-voltage side, while at the same time the wasteful and possibly dangerous passage of an unnecessarily large current through the low-voltage load 78 can be avoided. In the present embodiment, the current limiting operation of the regulator 80 which makes this possible is as explained in the following.

Figure 36:
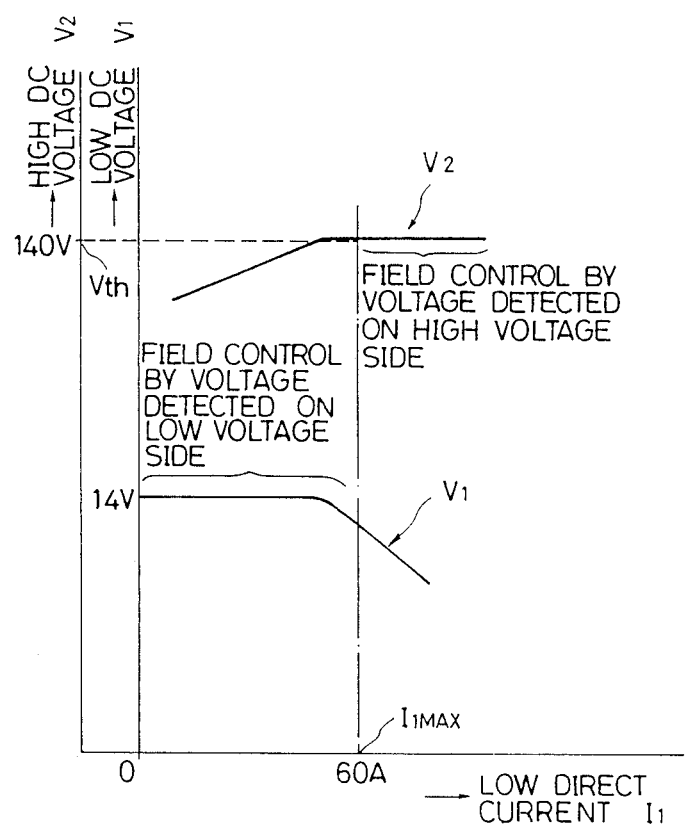
FIG. 36 is a graph showing the operational characteristics of the control apparatus of FIG. 35.

As shown in FIG. 36, insofar as the voltage $V_2$ appearing on the high-voltage side detection line 82 as the output voltage of the high-voltage side rectifier circuit 17 does not exceed a prescribed threshold value $V_{th}$ (which can be set at 160 V, for example, with respect to the dc output voltage of the rectifier circuit 17), the low-current range control circuit 84 of the regulator 80 remains substantially in effect, the low-voltage side voltage $V_1$ actually appearing at the output of the low-voltage side rectifier circuit 52 is detected via the voltage detection line 81, this is compared with, for example, a predetermined reference voltage (not shown), and, depending on whether the output voltage $V_1$ is larger or smaller than the reference voltage, the switching element 83, which may be a switching transistor or the like, is on-off controlled to start and stop the passage of current through the field coil 14 over the course of time.

In other words, when the output voltage $V_1$ on the low-voltage side exceeds the reference voltage, the switching element 83 is turned off to cut off the passage of current through the field coil 14, and when as a result the output voltage $V_1$ has fallen below the reference voltage, the switching element 83 is again turned on to pass exciting current through the field coil 14 once again.

As is shown in FIG. 36, the result of this is that within the range that the low-voltage side current $I_1$ actually supplied to the battery 12 and other low-voltage side loads does not exceed the maximum permissible current value $I_{1MAX}$ set for the low-voltage side, i.e. within the range that the high-voltage side voltage $V_2$ which rises and falls in proportion to changes in the low-voltage side current $I_1$ does not exceed the prescribed threshold value $V_{th}$, the low-voltage side output voltage $V_1$ can be stabilized at the desired value, for example, at dc 14 V.

However, in the case where the low-voltage side current $I_1$ threatens to exceed the maximum permissible current value $I_{1MAX}$ and accordingly the indirectly detected high-voltage side output voltage $V_2$ exceeds the threshold value $V_{th}$ set at, for example, 160 V, then in accordance with the principle of the present aspect of the invention, the regulator 80 temporarily nullifies or interrupts the operation of the low-voltage side range control circuit 84 of the regulator 80 and instead implements the operation of the high-voltage current range control circuit 85, whereafter the switching transistor 83 of the aforesaid type is controlled on the basis of actual high-voltage side voltage appearing on the high-voltage side voltage detection line 82 in order to stabilize the high-voltage side output voltage $V_2$ at a fixed value.

The fact that the high-voltage side output voltage $V_2$ is stabilized in this way means that the low-voltage side output current $I_1$ has been controlled so as not to exceed the maximum permissible current value $I_{1MAX}$.

Figure 37:
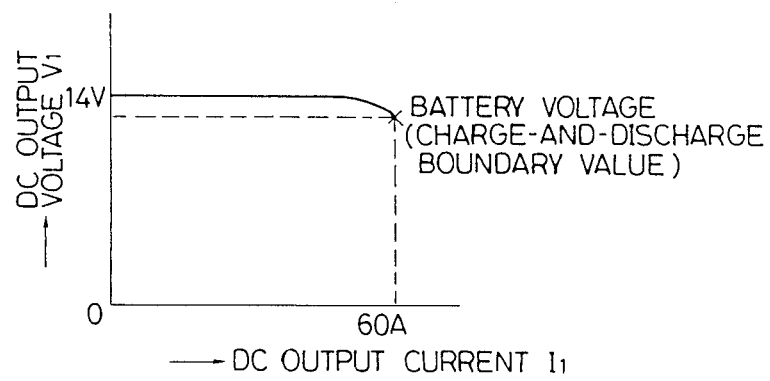
FIG. 37 is a graph showing the low-voltage side output current limiting characteristics obtained with the control apparatus of FIG. 35.

In other words, as is clear from the equivalent circuit shown in FIG. 25 and from the equations (4)–(6) which will be discussed below, if the high-voltage side output voltage $V_2$ (electromotive force $E_2$) is constant, the electromotive force $E_2$ of the low-voltage coils 13b will also be constant and, therefore in view of the relationship of equation (4), since any rise in the low-voltage side output current $I_1$ will cause the impedance voltage drop $I_1 \times Z_1$ to increase, the low-voltage side output voltage $V_1$ will tend to become smaller. Thus, in the vicinity of the maximum permissible current value, the low-voltage side output voltage becomes equal to the charge-discharge boundary value of the battery 12 and since when the load current rises above this level the low voltage side voltage $V_1$ falls below the battery voltage, the increased load current is supplied by the battery. Therefore, the low-voltage side output current $I_1$ from the generator 3b is suppressed. When a prototype multi-voltage generator apparatus in accordance with the structure described above was fabricated and operated, the output voltage vs output current characteristics on the low voltage side were as shown in FIG. 37, which is precisely what was predicted and desired.

The equations (4) to (6) will now be explained with reference to FIG. 25. If the number of windings of the low-voltage coil 13b is defined as N and the number of windings of the coil 13a is defined as $N_2$, then the relationships expressed by the following equations (4) and (5) hold, and where there is no load on the high-voltage side, the relationship of equation (6) also holds.

$$V_1 = E_1 - I_1 \times Z_1 \qquad 4)$$

$$E_2 = E_1(1 + N_2/N_1) \qquad 5)$$

$$V_2 = E_2 \qquad 6)$$

In view of the relationships expressed by these equations, if the low-voltage side output voltage $V_1$ is to be made constant by use of a regulator, it is necessary, as will be understood from equation (4), to carry out control such that the electromotive force $E_1$ increases when the load current $I_1$ increases.

On the other hand, however, as will be noted from equation (5), since the electromotive force $E_2$ across the terminals of the coil 13a required for obtaining the high-voltage output is proportional to the electromotive force $E_1$ across the terminals of the low-voltage coil 13b, the high-voltage side output voltage $V_2$ tends to rise, more or less, with increase in the low-voltage side load current $I_1$. This is typified by the equation (6) for the case of no load on the high-voltage side.

In accordance with the present invention, however, it becomes possible when necessary to suppress the maximum low-voltage side current to a sufficiently low value.

Even where the generator 3b is capable of outputting up to 200 A via the low-voltage terminals, by applying the present invention and setting the maximum permissible current value $I_{1MAX}$ at, for example, 60 A, it becomes possible to hold the current output through the low-voltage output terminals to such value.

Moreover, the magnitudes of the threshold values $V_{th}$ and $I_{1MAX}$ can be varied as desired. In the illustrated embodiment, the threshold voltage $V_{th}$ on the high-voltage side is selected as 160 V, which is the voltage maximum required in the case where the current and voltage output on the high-voltage side is to be converted by the invertor unit 4 into an alternating waveform resembling ac line power, and the maximum permissible current value $I_{1MAX}$ on the low-voltage side is set at 60 A. These values can be changed by changes in circuit design.

In the embodiment described in the foregoing, the low-voltage side output current $I_1$ is detected indirectly through the detection of the high-voltage side voltage $V_2$. However, it is alternatively possible to employ an arrangement for direct or relatively direct detection of the low-voltage side output current $I_1$. For example, a milliohm order resistor (or at any rate of a value that does not create a problem as regards power loss) can be inserted in series in the low-voltage side output line and the value of the low-voltage side output current $I_1$ determined from the voltage drop across this resistor can be used as the basis for controlling the field current supplied to the field coil 14.

Moreover, while the control circuits 84 and 85 in the foregoing embodiment are described as employing a very generally known and employed mode of control in which switching transistors 83 are on-of controlled over the course of time, it is alternatively possible to control the supply of current in an analogue and continuous fashion.

As explained above, according to the aforesaid method of controlling the low-voltage side current output according to the present invention, the maximum value of the low-voltage side output current $I_1$ can be suppressed to the necessary and sufficient level without relying on the self-drooping characteristics of the generator 3b. As a result, the conventional need to use extremely thick wire for the low-voltage coil 13b is eliminated and, moreover, such components as the rectifier diodes, heat dissipation fins, and dissipation fan can all be of small size.

A particularly large advantage is realized from the fact that the invention does not rely on the drooping characteristics of the generator, which are determined solely and absolutely by the generator specifications. This is because by not relying on these characteristics it becomes possible, with one and the same generator, to set the maximum permissible current value $I_{1MAX}$ for the low-voltage output side to whatever value is considered necessary. Thus it becomes possible to use generators of the same design in different automobiles having different requirements regarding the maximum permissible current value $I_{1MAX}$ on the low-voltage side.

In the past, this convenience could be enjoyed only in the case of employing a fuse to protect against overcurrents. However, the very nature of a multi-voltage generator of the type employed in this invention precludes the use of such a fuse, and even if one should be usable, it would have to be replaced every time it blew. The present invention involves no such inconvenience and overcomes the shortcoming of a fused system.

There will now be explained a constant voltage stabilization circuit for stabilizing the output voltage of the invertor unit 4.

This aspect of the invention relates to an improvement in a switching regulator and takes advantage of the fact that automobile generators have a high output impedance.

Figure 38:
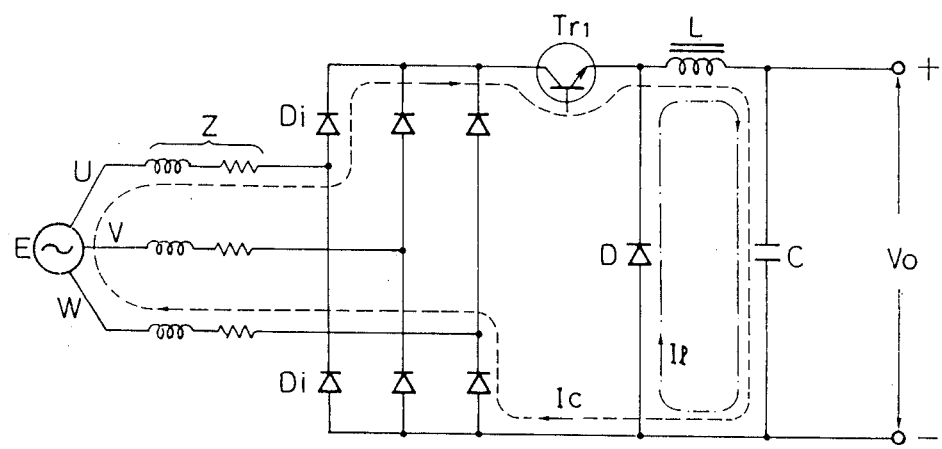
FIG. 38 is a circuit diagram for explaining the operation of a commonplace switching regulator.

FIG. 38 is a circuit diagram of a generally known switching regulator showing only the main, high current portion of the same. In this circuit, when the dc output voltage $V_0$ falls below a prescribed value, a voltage detection circuit (not shown) operates to turn on a transistor Tr1 so as to charge a capacitor C and raise the dc output voltage $V_0$. In this case, the current $I_c$ flowing into the capacitor C passes through the coil of a power source E (three-phase commercial power source), a rectifier diode $D_i$, the transistor Tr1, a choke coil L and back to the power source. In FIG. 38, the broken line indicates the current flow when coils W and U are momentarily conductive.

A commercial power source has a large output capacity but a low output impedance. Therefore, if the circuit should include no choke coil and have no inductive reactance, the transient phenomenon occurring when the transistor Tr1 turns on would put the capacitor C in a short circuit state, leading to a large current flow in the circuit which might destroy the transistor $T_{r1}$. More specifically, the illustrated circuit utilizes the infinite impedance exhibited by the choke coil L at the instant the transistor $T_{r1}$ turns on to control the surge current into the capacitor C. On the other hand, the transistor $T_{r1}$ is turned off when the terminal voltage of the capacitor C has reached a prescribed level, whereby the electromagnetic energy stored in the choke coil L is discharged through a diode D via a path from the choke coil L, through the capacitor C, the diode D and back to the choke coil L (this path being indicated by a single-dot chain line in FIG. 8).

Figure 39:
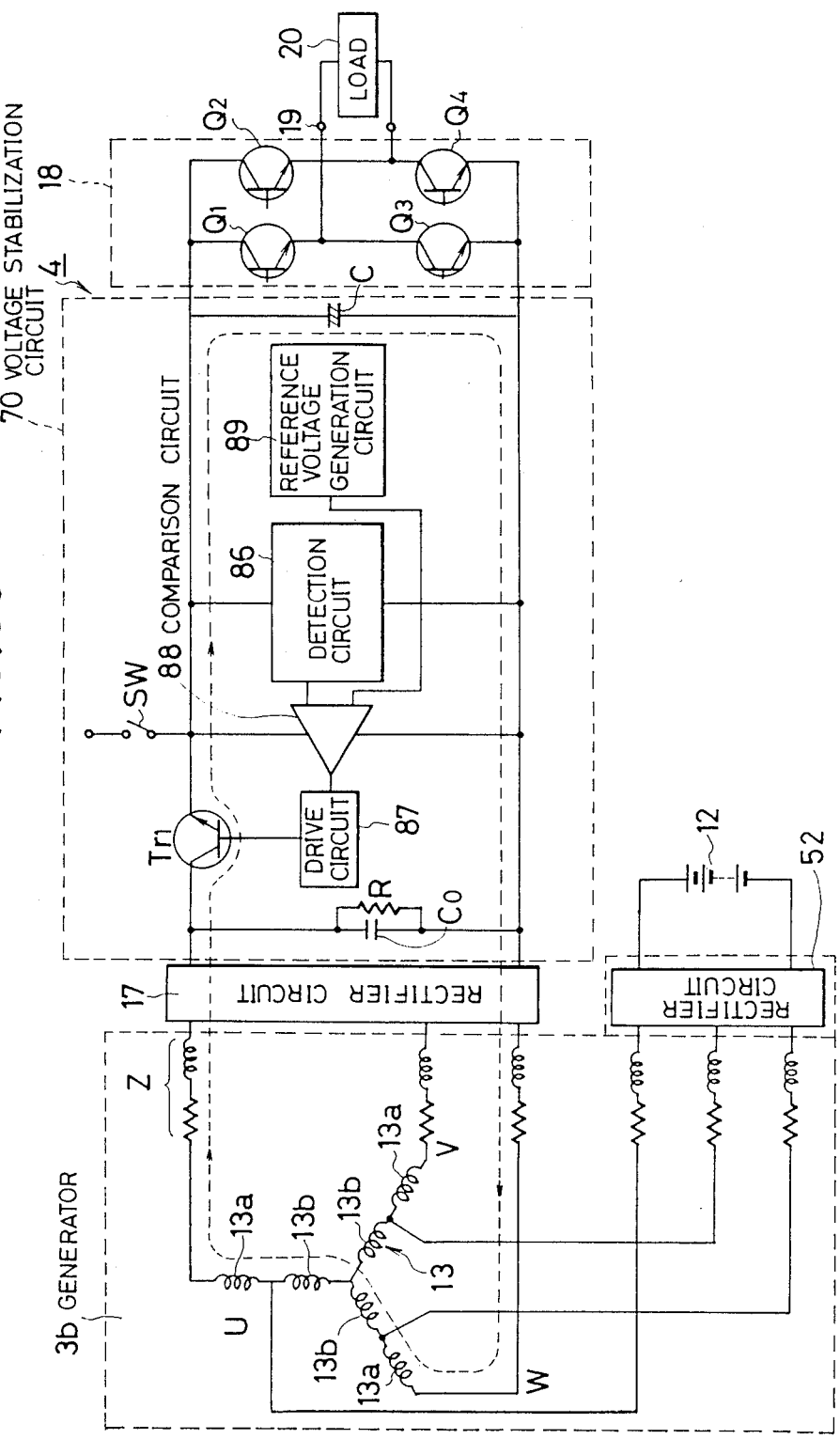
FIG. 39 is a circuit diagram of a constant voltage stabilization circuit constituting a part of the invertor unit.

FIG. 39 shows a constant voltage stabilization circuit for an automobile generator apparatus in accordance with the present invention. As its input power source, the automobile generator apparatus employs a three-phase synchronous generator 3b, which has a smaller power capacity and a much greater output impedance Z than the aforesaid power source E.

As a result of these characteristics of the generator 3b, even though current flows into the capacitor C when it assumes a short circuit state at the moment the transistor $T_{r1}$ turns on, a sudden surge of current will be prevented by the high output impedance Z of the generator 3b attributable to the presence of the generator coils 13 (U, V, W) of the generator 3b. Further, since a current limiting operation of the generator 3b will go into effect, no large short circuit current will arise.

Such a large surge current is apt to arise, for example, when, at the time the automobile is being driven, the mode of operation of the automobile generator apparatus is switched from the Drive mode to the Drive-and-Generate mode in order to obtain both the low-voltage output required for automobile operation and a high-voltage output for operation of a piece of electrical equipment. More specifically, when the operational mode of the automobile generator apparatus is switched over, current flows into the high-voltage side rectifier circuit 17 and charges the capacitor C. At this time the transistor $T_{r1}$ is turned on and the current flow in the main circuit becomes maximum. After this, the transistor $T_{r1}$ is on-off controlled in response to changes in the voltage across the terminals of the capacitor C. As a result, the surge current at the time the capacitor C carries a charge is smaller than that at the time when the mode is switched over.

Therefore in the present invention it suffices to use a transistor $T_{r1}$ having a higher current rating than the short circuit current, and there is no need for the choke coil and diode generally required in stabilization circuits for use with commercial power sources. As a result, the automobile generator apparatus can be greatly reduced in size. Furthermore, the vibration that is apt to occur when a choke coil is used can be eliminated.

The circuit illustrated in FIG. 39 will now be explained. A constant voltage stabilization circuit 70 is connected to the high-voltage side three-phase rectifier circuit 17. The constant voltage stabilization circuit 70 corresponds to the voltage regulator in FIG. 32. More specifically, the collector of the transistor $T_{r1}$ is connected to one terminal of the three-phase rectifier circuit 17 and a parallel circuit consisting of a capacitor $C_0$ and a resistor R is connected between said collector and the other terminal of the three-phase rectifier circuit 17. Further, a comparison voltage detection circuit 86 and a capacitor C are connected in parallel to the emitter of the transistor $T_{r1}$. To the base of the transistor $T_{r1}$ is connected a drive circuit 87 to which the output terminal of a comparator 88 is connected. The comparator 88 has the output terminal of the comparison voltage detection circuit 86 connected to one of its input terminals and the output terminal of a reference voltage generator 89 connected to the other. The comparator 88 is further connected to a control power source through a switch SW.

The terminals of the capacitor C are connected with an circuit 18 constituted as a bridge consisting of four output transistors $Q_1$ to $Q_4$ so as to obtain an ac output with an effective value of 115 V. (The invertor circuit 18 corresponds to the switching elements 18 explained earlier.)

With the constant voltage stabilization circuit 70 of the aforesaid structure, when the comparison voltage (the dc voltage at the emitter of the transistor $T_{r1}$) falls lower than a preset reference voltage (i.e. comparison voltage < reference voltage), the transistor $T_{r1}$ is driven to establish conductivity between the collector and emitter thereof and when the comparison voltage becomes higher than the reference voltage (comparison > voltage reference voltage) driving of the transistor $T_{r1}$ is discontinued to establish an open state between its collector and emitter, whereby a constant dc voltage is maintained.

More specifically, the dc voltage detected by the comparison voltage detection circuit 86 at the emitter is compared with the preset output voltage of the reference voltage generator 89 in the comparator 88. When the comparison voltage is found to be lower than the reference voltage, the comparator 88 sends a drive signal to the drive circuit 87. On receiving the drive signal, the drive circuit 87 supplies to the transistor $T_{r1}$ a base current of a magnitude sufficient to turn on the transistor $T_{r1}$, whereby the transistor $T_{r1}$ is put in the driven state. When the transistor $T_{r1}$ is driven, conductivity is established between its collector and emitter and as a result current flows through the circuit. This current flows through the loop indicated by the broken line in FIG. 39, namely, from the U-phase low-voltage side coil 13b through the high-voltage side coil 13a, the output impedance Z of the generator 3b, the three-phase rectifier circuit 17, the transistor $T_{r1}$, the capacitor C, the three-phase rectifier circuit 17, the impedance Z of the generator 3b, the W-phase high-voltage side coil 13a and the low-voltage side coil 13b. Thus since the generator 3b is included within the aforesaid loop, the large surge current tending to flow because the capacitor C assumes a substantially shortcircuited state at the time the transistor $T_{r1}$ turns on can be controlled (suppressed) by the resistance offered by the impedance Z of the generator 3b.

When the conductive state of the circuit is maintained, the flow of current into the capacitor C falls off rapidly with increased charging of the capacitor C, whereby the comparison voltage approaches the reference voltage. When with further charging of the capacitor the comparison voltage comes to exceed the reference voltage, the comparator 88 discontinues output of the drive signal so that the drive circuit 87 stops supplying base current to the transistor $T_{r1}$. With discontinuance of the supply of base current, the transistor $T_{r1}$ turns off and stays in this state until the output voltage has been brought down to ac115 V by the load 20 and the comparison voltage approaches the reference voltage.

By repeated operation of the comparator 88, the transistor $T_{r1}$ and the like in this way, the dc voltage at the emitter of the transistor $T_{r1}$ is regulated to the prescribed value so that the ac115 V output produced by the following stage, i.e. the invertor 18, is stabilized.

In the illustrated embodiment, the control current side of the comparator 88 is connected with the switch SW. In an operational mode that does not require the supply of ac115 V power (as for example in the Drive mode when only a low-voltage output for automobile operation is supplied), this switch SW is used for shutting off the supply of drive current to the constant voltage stabilization circuit 70 so as to disable it. By disabling the constant voltage stabilization circuit 70, it is possible to prevent loss by heat generation and the like caused by unnecessary supply of drive current to the transistor $T_{r1}$ and also to avoid the constant application of voltage to the capacitor C and thus extend the service life of this capacitor.

The capacitor $C_0$ connected to the collector side of the transistor $T_{r1}$ is for rapidly absorbing the surge voltage produced by the generator 3b at the time the transistor $T_{r1}$ turns off, while the resistor R connected in parallel with the capacitor $C_0$ is a discharge resistor for converting the surge energy once absorbed by the capacitor $C_0$ into heat.

Thus in accordance with this aspect of the invention, the constant voltage stabilization circuit 70 is constituted with only the single switching transistor $T_{r1}$ series connected in the main current path. However, since the high impedance Z of the generator prevents the flow of short-circuit current into the capacitor C, the choke L and diode D required by the conventional voltage stabilization circuit can be omitted and this makes it possible to realize a more compact automobile generator apparatus. Moreover, lack of the choke L and diode D results in increased efficiency by eliminating the energy dissipated by these circuit elements Furthermore, there is no possibility of noise being generated by a vibrating choke coil. The voltage control capability provided by this aspect of the invention thus enables provision of an automobile generator apparatus of higher practical value.

Next with reference to FIG. 40 there will be explained an overvoltage prevention circuit for preventing the occurrence of an excessively high voltage which might arise should a control transistor 83 in the regulator 80 malfunction.

Figure 40:
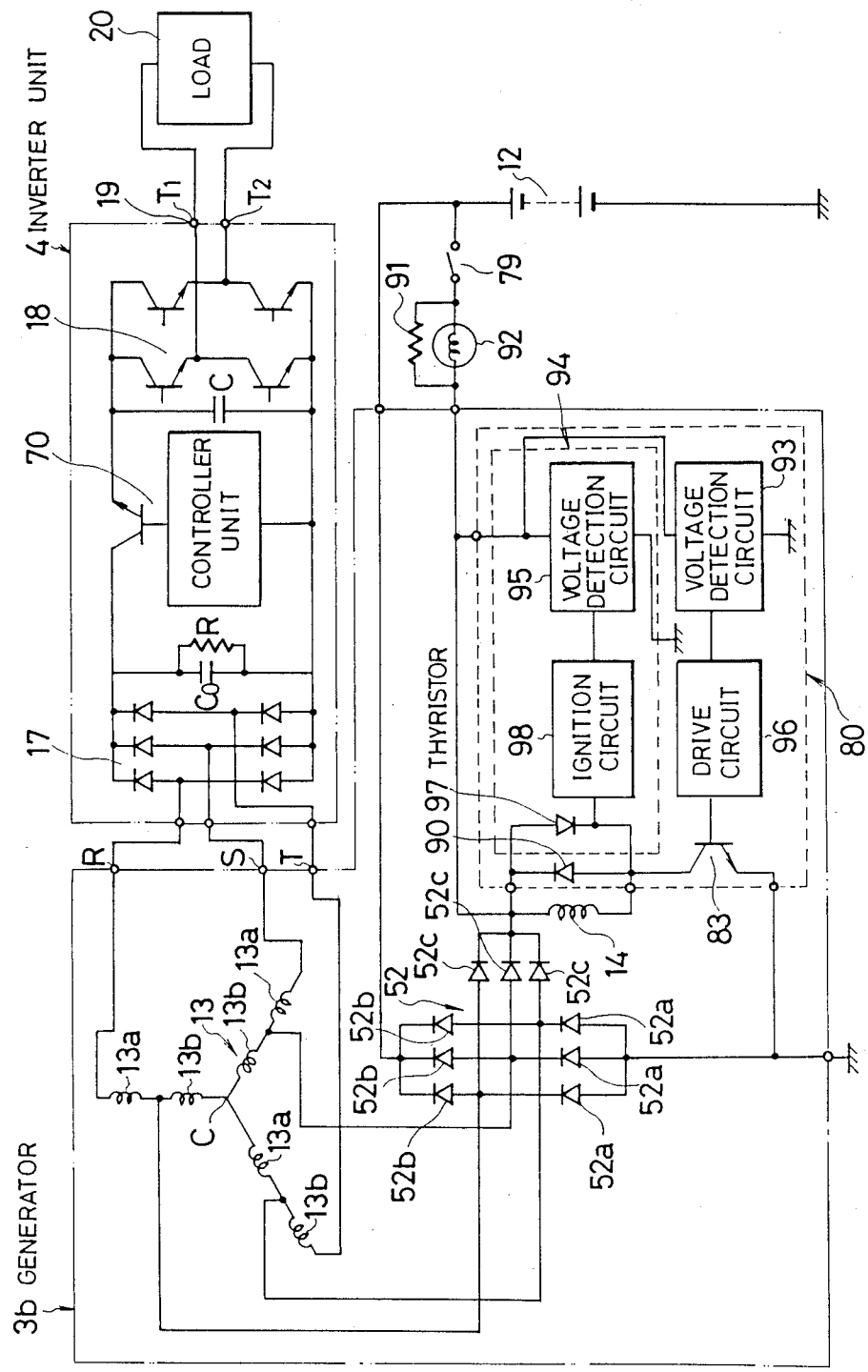
FIG. 40 is a circuit diagram of an overvoltage prevention circuit.

Referring to FIG. 40, as was explained earlier, the ac output produced by the low-voltage stator coil 13b is first rectified by the low-voltage side rectifier circuit 52 within the generator 3b and then is supplied both to the battery 12 and as excitation current to the field coil 14 of the generator 3b.

The low-voltage side rectifier circuit 52 is constituted of diodes 52a, 52a, 52a whose anodes are mutually grounded and whose cathodes are connected to the respective anodes of diodes 52b, 52b, 52b and to the respective anodes of diodes 52c, 52c, 52c. The stator coils 13b are connected to respective ones of the connection points among these diodes.

The cathodes of the diodes 52b, 52b, 52b are connected together and to the positive terminal of the battery 12 installed in the automobile, while the cathodes of the diodes 52c, 52c, 52c are connected together and to one end of the field coil 14. The other end of the field coil 14 is connected to the collector of a control transistor 83 of the regulator 80. The emitter of the control transistor 83 is grounded. A diode 90 for bypassing back electromagnetic force is connected in parallel with the field coil 14.

The positive terminal of the battery 12 is connected through an ignition switch 79 and a charge lamp 92 having a resistor 91 connected in parallel therewith to a voltage detection circuit 93 of the regulator 80 and also to a voltage detection circuit 95 of an overvoltage prevention circuit 94. The terminal voltage of the battery 12 is thus supplied to the voltage detection circuits 93 and 95 as a detected generation signal. The commonly connected cathodes of the diodes 52c, 52c, 52c are also connected to the voltage detection circuits 93 and 95.

The detection output of the voltage detection circuit 93 is supplied to a drive circuit 96 and the output of the drive circuit 96 is supplied to the base of the control transistor 83.

As was explained earlier, when the speed of the engine 2 rises or the load 20 is reduced, the voltage generated by the generator 3b increases so that the terminal voltage of the battery 12 comes to exceed 14 V. In accordance with the present aspect of the invention, this rise in voltage is detected by the voltage detection circuit 93 and the field current flowing through the field coil 14 is limited by the operation of the control transistor 83. As a result, the state of generation of the generator 3b is limited and the generated voltage is regulated to the prescribed value. On the other hand, if the terminal voltage of the battery 12 should fall below 14 V because of a decline in the generated voltage caused by an increase in the load 20 or the like, the control transistor 83 causes field current to flow, whereby the generated voltage is restored to the prescribed value.

The overvoltage prevention circuit 94 is connected to the field coil 14. The overvoltage prevention circuit 94 comprises the aforesaid voltage detection circuit 95, a thyristor 97 and an trigger circuit 98. The thyristor 97 is connected in parallel with the field coil 14 and the voltage detection circuit 95, which receives the detected overcurrent signal from the voltage detection circuit 95 as input, has its output terminal connected to the gate of the thyristor 97. The thyristor 97 functions to short circuit the opposite ends of the field coil 14 at the time an overvoltage arises. The thyristor 97 and the trigger circuit 98 constitute a short circuit.

The operation of the overvoltage prevention circuit 94 will now be explained.

Presume that for some reason trouble arises in the control transistor 83, causing its collector and emitter to fuse together in a constantly electrically conductive state. When this happens, field current will flow constantly through the field coil 14, with the result that an overvoltage output will appear on both the low-voltage and high-voltage sides of the generator 3b.

As a result, the terminal voltage of the battery 12 will rise notably and it will be detected by the voltage detection circuit 95 that the battery voltage has risen to a dangerously high level. When the detection output from the voltage detection circuit 95 is supplied to the trigger circuit 98, the trigger circuit 98 triggers the thyristor 97, causing it to conduct.

The field coil 14 is thus forcibly short circuited and the supply of field current to the field coil 14 is cut off. At the same time the large short-circuit passing through the control transistor 83 generates a great amount of heat at the fused portion between the collector and emitter, and the control transistor 83 is totally destroyed.

When the control transistor 83 is deliberately destroyed in this manner, the collector and emitter are electrically separated so that continuous flow of short circuit current is prevented and at the same time the other end of the field coil 14 is electrically isolated. As a result, there is no possibility of field current passing through the field coil 14 and the overvoltage that was being produced by the generator 3b is eliminated.

The danger of an overvoltage damaging a piece of ac equipment connected as a load across the output terminals $T_1$ and $T_2$ of the invertor unit 4, burning out a piece of automobile consumer equipment on the low-voltage side, or starting a fire in the automobile is thus eliminated in advance.

The reason for using the thyristor 97 for short circuiting the field coil 14 at the time of an overvoltage is that the instantaneous current resistance of a thyristor is much higher than that of a transistor so that if the control transistor 83 and the thyristor 97 have about the same current rating, the control transistor 83 will, without fail, destruct first. This means that it is alternatively possible to use a transistor or other element with a large current capacity in place of the thyristor 97, or to use a relay.

In the embodiment described in the foregoing, the overvoltage prevention circuit 94 is provided inside the generator 3b. Instead, however, it can be provided in the case containing the inverter unit 4 and be connected with the generator by lead wires. This arrangement is advantageous in that it enables use of the conventional regulator as it is.

While the generator 3b used in this embodiment is of the single-shaft, dual-voltage type, this aspect of the invention is also applicable to an automobile generator apparatus using a single-voltage type generator that has only a high-voltage side.

With the conventional arrangement, when trouble arose in the control transistor for controlling the field current and the collector and emitter of the transistor became fused together, the current passed mainly through the field coil and the amount flowing through the control transistor was not enough to destroy it. This meant that the current path was not interrupted so that the generator continued to generate electricity in spite of the malfunction. Thus an overvoltage was output when the engine speed rose beyond a certain level.

In the overvoltage prevention circuit 94 according to this invention, however, a short circuit is established across the field coil 14 as soon as an overvoltage is detected so that the control transistor 83 is destroyed by the resulting large short-circuit current. The circuit is thus interrupted.

As a result, since no field current flows through the field coil 14 whatsoever, occurrence of an overvoltage is avoided.

By use of the overvoltage prevention circuit 94 according to the invention in an automobile generator apparatus, the danger encountered in the past of an overvoltage damaging of ac equipment connected to the output of the inverter unit 4, burning out a piece of low-voltage automobile consumer equipment, or starting a fire in the automobile is thus eliminated in advance.

Next there will be explained a control device for obtaining a large amount of ac line power by synchronized operation of two or more automobile generator apparatuses according to this invention.

Figure 41:
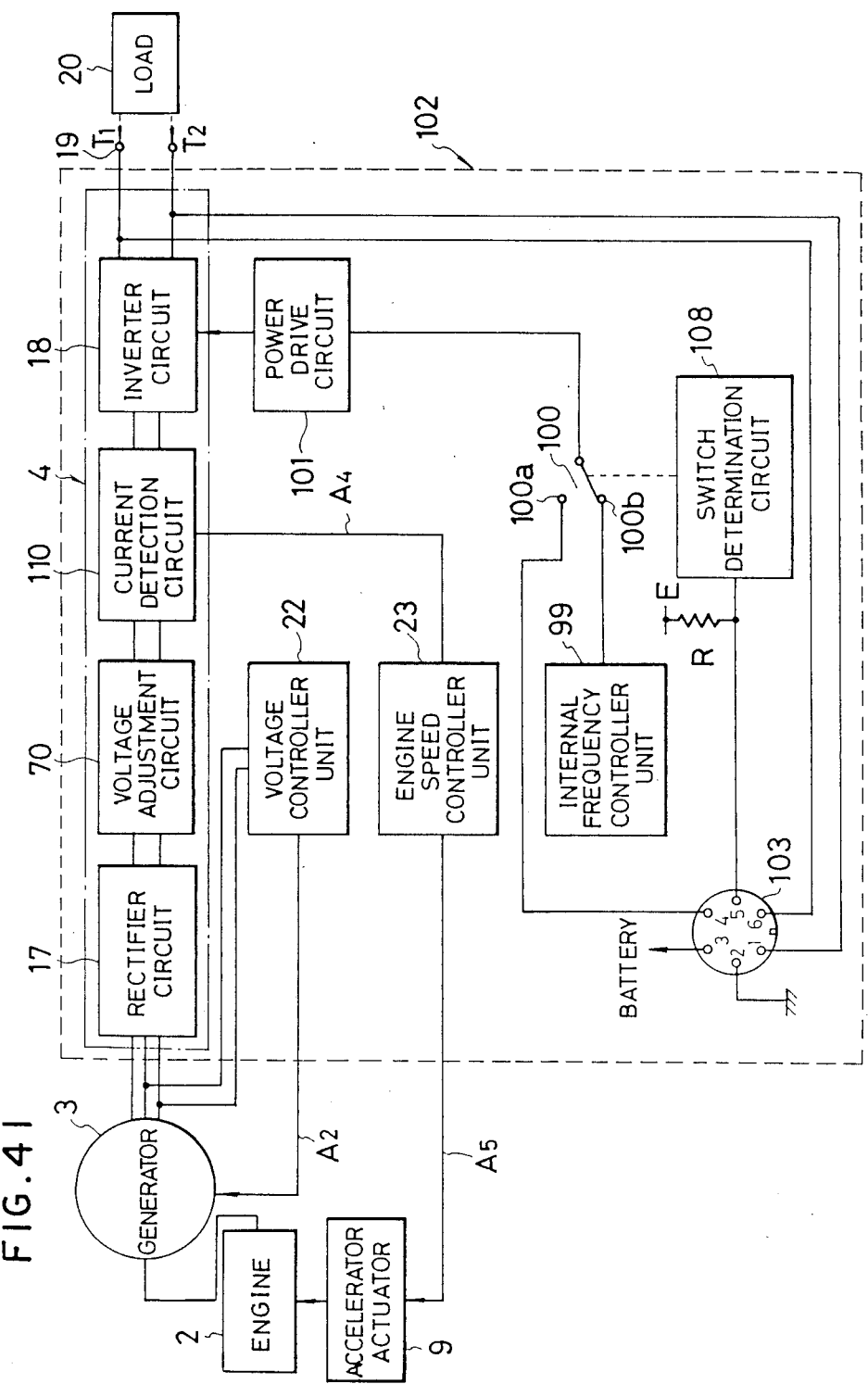
FIG. 41 is block diagram of a synchronized operation control device.

Referring to a regulation and output unit 102 shown in FIG. 41, the output of an internal frequency control unit 99 for carrying out frequency control at a present frequency of 60 Hz (the frequency of ac line power) is supplied to an invertor unit 18 through the pole 100b of a switch 100 (to be explained later) and a power drive circuit 101. As a result, dc power supplied to the invertor 18 from a voltage regulation circuit 70 is converted back into ac power by the power transistors or other type power switching elements constituting the invertor 18, whereby 60 Hz ac line power is made available at the outlet 19. Thus, when a load 20 is plugged into the outlet 19 and the load 20 will be supplied with ac line power.

Figure 43:
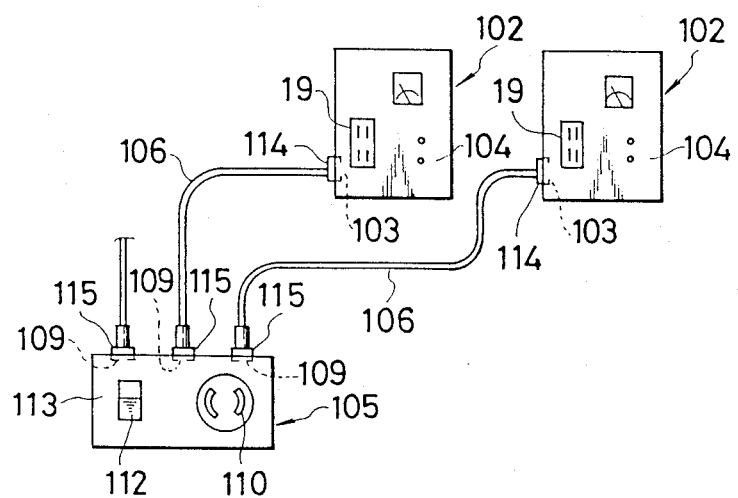
FIG. 43 is a plan view showing how the outputs of a plurality of automobile generator apparatuses are connected to a synchronized operation adapter.

The regulation and output unit 102 is provided with a multi-terminal connector 103 for enabling the ac output of the automobile generator apparatuses of two or more automobiles to be combined for obtaining a single large output. The regulation and output unit 102 of each automobile is housed in a case 104 as illustrated in FIG. 43.

The first and sixth terminals of the multi-terminal connector 103 are connected with the output terminals of the invertor 18, the second terminal is grounded, and the third terminal is connected with the battery installed in the automobile. Further, the fourth terminal is connected with the pole 100a of the switch 100. When, as shown in FIG. 43, a cable 106 is connected between the multi-terminal connector 103 of the regulation and output unit 102 and a synchronized operation adapter 105, which will be explained later, a control signal from an external frequency control unit 107 is sent to the regulation and output unit 102 through this terminal 4. The switch 100 is for switching between normal operation and synchronized operation and is controlled by the output from a switchover discrimination circuit 108.

The switchover discrimination circuit 108 is connected with the fifth terminal of the multi-terminal connector 103 and this fifth terminal is pulled up by a battery voltage E (of, for example, 12 V). When the discrimination signal produced by the switchover discrimination circuit 108 becomes high level (H level), the switch 100 is switched over to the pole 100b, so that the output of the internal frequency control unit 99 is supplied to the inverter 18 through the power drive circuit 101. This is the mode of operation in the case where the automobile generator apparatus is to be used independently. On the other hand, where the automobile generator apparatuses of two or more automobiles are to be synchronously operated, the synchronized operation adapter 105 is connected to the regulation and output unit 102 by the cable 106. This results in the fifth terminal of the multi-terminal connector 103 being grounded in addition to the second terminal thereof, whereby the discrimination signal assumes low level (L level). As a result, the switchover discrimination circuit 108 switches the switch 100 over to the pole 100a so that the control signal from the external frequency control unit 107 in the synchronized operation adapter 105 is supplied to the invertor 18.

Next an explanation will be given with reference to FIG. 42 of the synchronized operation adapter 105 used at the time of operating two or more automobile generator apparatuses according to the invention in unison so as to obtain a single, large ac output.

Figure 42:
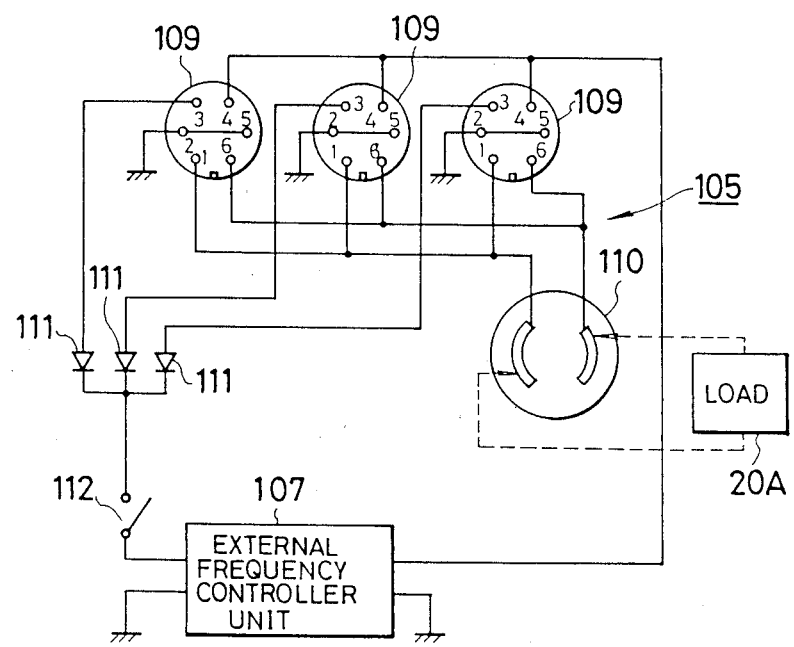
FIG. 42 is circuit diagram of a synchronized operation adapter.

Referring to FIG. 42, the synchronized operation adapter 105 has a number (three in the illustrated embodiment) of multi-terminal connectors 109, 09, 109 for connection via cables 106 to the multi-terminal connectors 103 of the regulated output units 102 of automobile generator apparatuses installed in different automobiles. Like numbered terminals of the multi-terminal connectors 109, 109, 109 are connected together.

The first and sixth terminals of the respective multi-terminal connectors 109 are connected with a large capacity power output outlet 110. When the regulated output units 102 of the respective automobiles are connected with the synchronized operation adapter 105, the outlet terminals of the respective inverters 18 of the regulated output units 102 are connected internally of the synchronized operation adapter 105 with the large capacity power output outlet 110.

The second and fifth terminals of the multi-terminal connectors 109 are connected together and to ground. When paired multi-terminal connectors 103 and 109 are interconnected by cables 106, the second and fifth terminals of the multi-terminal connectors 103 on the side of the regulated output units 102 become conductive so that the switchover discrimination circuit 108 receives an L-level discrimination signal.

The third terminals of the multi-terminal connectors 109 are connected with a power switch 112 through diodes 111, 111, 111 for preventing reverse current flow, and the other side of the power switch 112 is connected with the power terminal of the external frequency control unit 107. This arrangement enables the external frequency control unit 107 to receive electric power from the batteries of the respective automobiles during synchronized operation. In this case, even if the batteries should vary in voltage, reverse current flow to a battery with lower voltage will be prevented by the diodes 111.

The fourth terminals of the multi-terminal connectors 109 are connected with the output terminal of the external frequency control unit 107. During synchronized operation, the external frequency control units 107 supplies a control signal based on the preset frequency of 60 Hz to the inverter 18 of the respective regulated output units 102. As shown in FIG. 43, the synchronized operation adapter 105 is housed in a case 113.

Next the operation of the aforesaid control apparatus for synchronized operation of two or more automobile generator apparatuses will be explained.

First, as illustrated in FIG. 43, the connectors 114 of the appropriate number of cables 106 are plugged in the multi-terminal connectors 103 of the regulated output units 102 installed in the respective vehicles and the other ends of the cables 106 are plugged into the multi-terminal connectors 109 of the synchronized operation adapter 105, whereafter the power switch 112 is turned on.

When this is done, L-level discrimination signals will be input to the switchover discrimination circuits 108 of the respective regulated output units 102 so that the switches 100 will be switched over to their poles 100a. As a result of this switchover of the switches 100, the control signal produced by the external frequency control unit 107 of the synchronized operation adapter 105 is supplied to the inverters 18 of the respective regulated output units 102. Thus the inverter 18 are all controlled by the 60 Hz frequency set in the external frequency control unit 107. In this case, even if the internal frequency control units 99 of the respective regulated output units 102 should not all be set at the same frequency of 60 Hz, this will cause no problem since the internal frequency control units 99 are automatically turned off by the switch 100.

Since all of the inverters 18 are together controlled by the external frequency control unit 107, the ac outputs at the output terminals of the respective inverters 18 will all coincide in frequency and phase. Moreover, since the voltage control units 22 of the respective regulated output units 102 operate to maintain the voltages output by the respective generators 3 uniform and the voltage regulation circuits 70 are also in operation, the voltage maximums of the respective inverters 18 are regulated to substantially the same level.

A large ac line power output obtained by combining the outputs of the inverters 18 of the two or more regulated output units 102 can thus be reliably made available at the large capacity power output outlet 110 of the synchronized operation adapter 105.

Furthermore, since the accelerator actuators 9 of the respective automobile generator apparatuses operate in response to increases and decreases in the magnitude of the load 20A plugged into the large capacity power output outlet 110, it is possible to secure an ac power output from the large capacity power output outlet 110 that is matched to the requirements of the load 20A. Here it should be noted that the load current is detected by a current detection circuit 116.

Where the outputs from two or more regulated output units 102 are obtained from outlets 19 having no polarity and then combined, there may occur cases in which ac outputs that are 180 degrees out of phase are combined. However, this problem is overcome when, as in the foregoing embodiment, there are used multi-terminal connectors 103 and 109 of predetermined polarity and these are interconnected by cables 106.

While the foregoing embodiment was explained with respect to an synchronized operation adapter 105 designed for simultaneous synchronized operation of up to three automobile generator apparatuses, the adapter can easily be designed to enable synchronized operation of a larger number of automobile generator apparatuses without departing from the concept of this invention. Moreover, the switchover discrimination circuit 108 may alternatively be constituted using a relay and the switch 100 can be constituted as the contacts of the relay.

As has been explained above, in accordance with the synchronized operation control device of this invention, an external frequency control umit 107 is. provided and unified control of a plurality of inverter units 4 is realized by a control signal from the external frequency control unit 107. As a result, the ac outputs obtained at the outlets 19 of the inverter unit 4 are perfectly matched in frequency and phase so that by combining the outputs of the respective inverter units 4 there can easily be obtained a large ac power output.

Moreover, the synchronized operation control device of this invention is of a simple arrangement consisting of only the external frequency control unit 107 and a switching means for supplying the control signal produced by the external frequency control unit 107 to the two or more invertor units 4. As a result, the invention has no need for a complex apparatus such as one for synchronizing the speed of rotation of a plurality generators, and thus makes it possible to provide a synchronized operation control device at a low cost.

As the present aspect of the invention makes it possible to easily make available a large power output by combining the ac outputs of a plurality of automobile generator apparatuses, it has wide utility as a power source for use at work sites where a commercial power source is not readily available, for emergency use during fires, storms floods and the like, and for leisure activities.

The structure of the dual-voltage, high-frequency generator 3b will now be described in detail.

Figure 44:
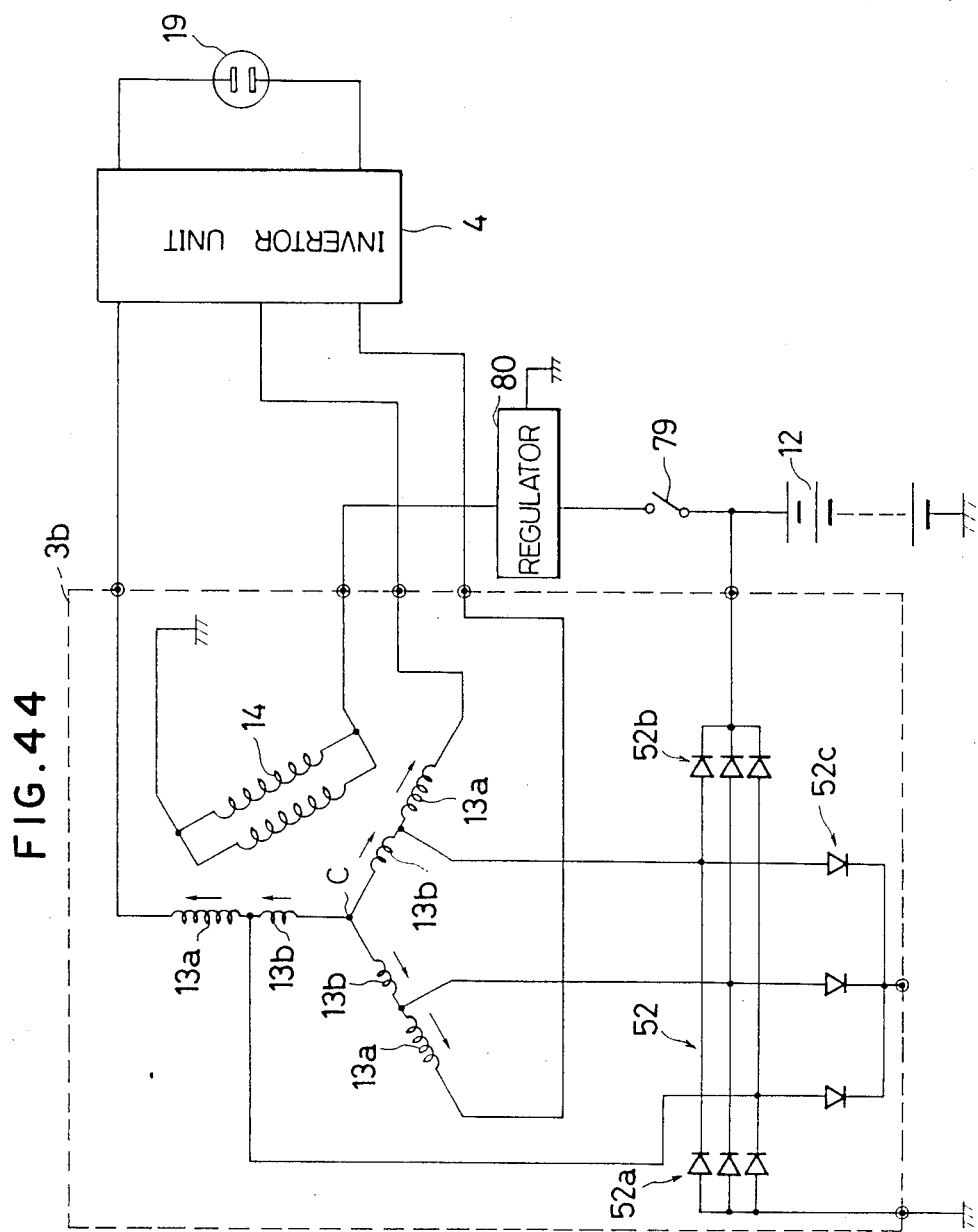
FIG. 44 is a circuit diagram of a generator.
Figure 45:
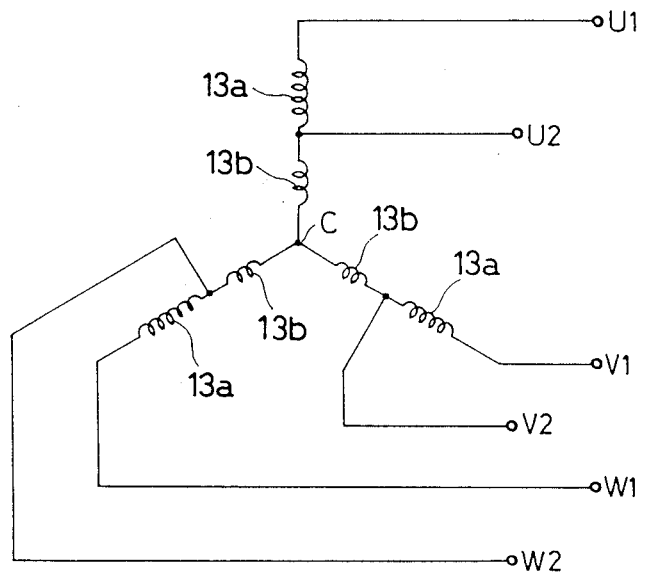
FIG. 45 is a circuit diagram showing the interconnection of the stator coils of the generator of FIG. 44.
Figure 46:
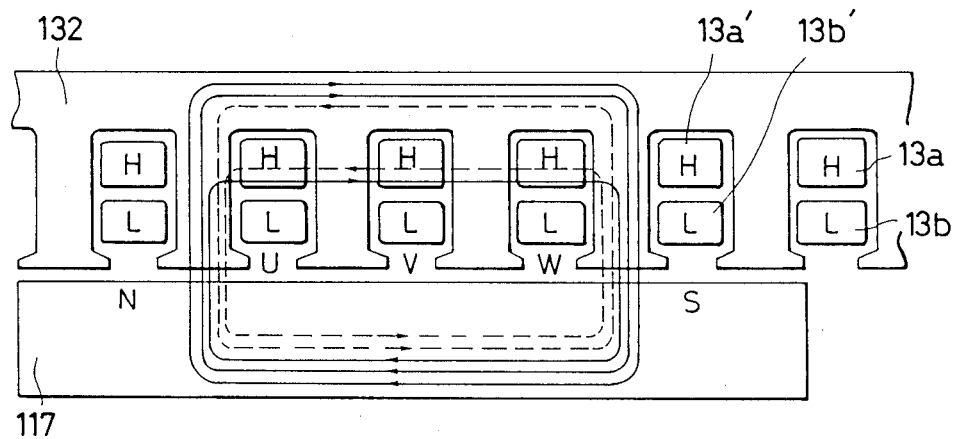
FIG. 46 is a schematic sectional view showing the manner in which the stator coil windings are disposed in slots and also showing the magnetic flux distribution at a given instant.
Figure 47:
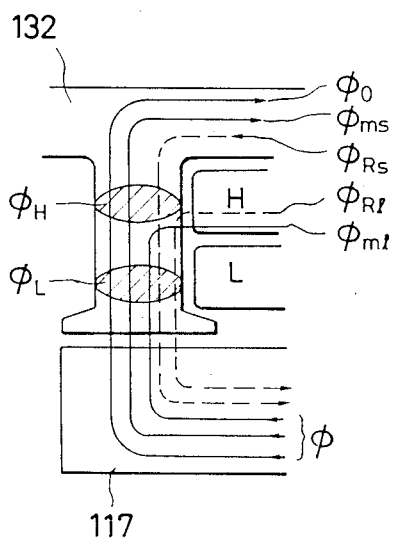
FIG. 47 is a magnified schematic view of a stator tooth portion in the vicinity of the N pole of the rotor, showing the magnetic flux distribution when load current flows through the low-voltage side coils and the high-voltage side is load free.

FIG. 44 is a circuit diagram of an automobile generator 3b according to the present invention, together with the automobile battery and the like; FIG. 45 is a diagram separately showing the interconnection of the stator coils of the generator; FIG. 46 is a schematic view of the stator and rotor showing the instantaneous magnetic flux distribution; and FIG. 47 is an enlarged view of the stator teeth at the north pole portion.

Referring to FIG. 44 and 45, since the generator 3b in the present embodiment is of the dual output type, it has three first high-voltage side (H) coils 13a and three second low-voltage side (L) coils 13b. Each coil 13a is paired with a coil 13b and the two coils are wound one on top of the other in the same slots of the stator core.

FIG. 46 is a partial schematic sectional view showing how the coils are inserted in the slots. As shown, the coil segments 13a', 13b' of the coils 13a and 13b are inserted into the same slots. Moreover, in this invention the first coil 13a on the high voltage side is disposed at the bottom of the slot and the first coil on the low voltage side is disposed near the entrance of the slot.

The first coils 13a on the high voltage side and the second coils 13b on the low voltage side, which are disposed in the same slots in this way, are interconnected as described in the following.

As shown in FIGS. 44 and 45, one end of each of the second coils 13b is connected with the neutral point C of a star connection, and the other end thereof is connected with one end of one of the first coils 13a. Thus the voltage developed across each pair of coils is the sum of the voltages developed across the individual coils. In FIG. 45 the low-voltage output terminals are indicated as U2, V2, W2 and the high-voltage output terminals as U1, V1, W1.

Thus in the generator 3b according to this invention, the coil pairs are wound one on top of the other in the same slots, with one end of each low-voltage side coil L (second coil 13b) connected with the neutral point C, the other end connected to one end of one of the high-voltage side coils H (first coils 13a) so as to form a series connection resulting in a developed voltage across each pair of coils equal to the sum of the voltage developed across the members of each pair, the connection point between each pair of coils being connected to a low-voltage terminal, and the other end of each high-voltage side coil H being connected to a high-voltage terminal.

Further in this invention the first coil 13a is disposed on the floor of the slot while the second coil 13b is disposed near the entrance of the slot. The reason for using this arrangement is as follows.

When the generator is rotated with excitation current being supplied from the outside so as to produce an electromotive force in the rotor, induced electromotive forces are produced in the H and L coils. In this case, the terminal voltage of the L coils has to be maintained at a constant value (e.g. dc 14 V) so that the low-voltage side output can be used as a supply of power for operation of the automobile. Therefore, the electromotive force produced by the L coils is regulated by a regulator 80. As the H-coil terminal voltage is equal to the sum of the voltages developed across the L and H coils, the regulation of the electromotive force across the L coils affects the terminal voltage of the H coils.

FIG. 47 shows the magnetic flux distribution in the vicinity of the stator teeth in the case where the high-voltage side is left load free and a fixed load is applied to the low-voltage side.

Here it should be noted that when load current flows in the respective coils, this flow of current will produce a magnetic field around the coil. This is generally referred to as the armature reaction since the direction of the so-produced magnetic flux is reverse from that supplied by the rotor. This armature reaction will therefore treated as a reverse magnetic flux in this embodiment.

The voltage E produced across each coil in the state where load voltage flows through the L coils and the H coils remain load free is $$E = K\phi N$$

where E is the electromotive force, K is the generator constant, $\phi$ is the flux linkage number, and N is the rotation speed).

For ensuring that the electromotive force $E_L$ developed across the L coils remains constant (at, for example, dc 14 V) notwithstanding any variation in the rotation speed N, the excitation current supplied to the rotor is regulated by the regulator 80 such that a magnetic flux $\phi_L$ corresponding to the rotation speed N intersects with the L coils.

FIG. 47 shows the flow of magnetic flux in the case where the H coils are load free and load current flows through the L coils. Defining the magnetic flux supplied by the rotor as $\phi$, the reverse flux $\phi_R$ in the L coils is substantially cancelled out at the region of intersection with the L coils by the cancelling portion $\phi_M$ of the flux $\phi$ supplied by the rotor ($\phi_r - \phi_M = 0$).

That is to say, $\phi_R = \phi_{RL} + \phi_{RS}$ where $\phi_{RL}$ is the magnetic flux leaking from the stator teeth 0 and passing through the rotor and $\phi_{RS}$ is the magnetic flux passing through the stator and the rotor).

$$\phi_M = \phi_{ML} + \phi_{MS}$$

where $\phi_{ML}$ is the magnetic flux supplied by the rotor and leaking form the stator teeth and $\phi_{MS}$ the magnetic flux supplied by the rotor and passing through the stator).

$$\phi = \phi_0 + \phi_M$$

where $\phi_0$ is the magnetic flux from the rotor passing through the stator.

Since the magnetic flux $\phi - \phi_R$ remaining after the magnetic flux $\phi$ supplied by the rotor is reduced by the amount of the aforesaid reverse magnetic flux $\phi_R$ intersects the H coils, an electromotive force $E_H$ proportional to the winding ratio of the L and H coils is developed in the H coils.

In actuality, since there is some leakage of magnetic flux between the rotor and the stator, the magnetic flux $\phi_0$ passing through the stator from the rotor is approximately equal to the magnetic flux $\phi_L$ intersecting the L coils.

Figure 48:
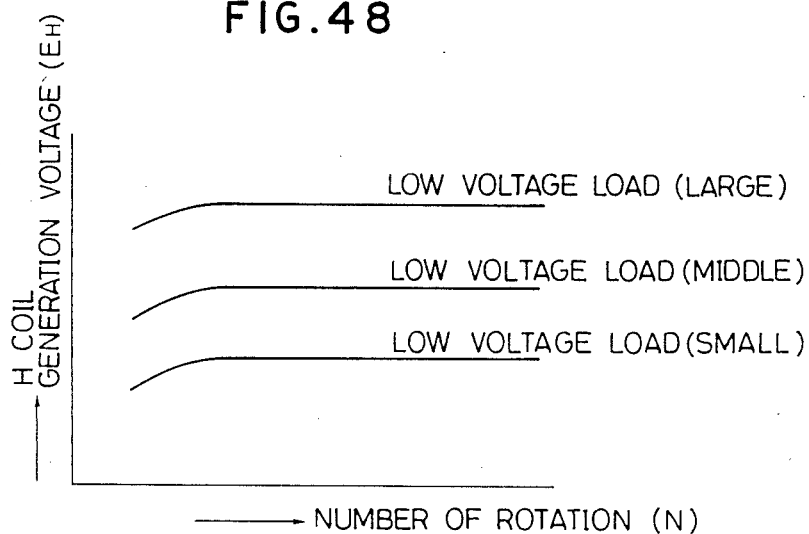
FIG. 48 is a graph showing the characteristics of the relationship between the speed of rotor rotation and the voltage generated by the high-voltage side coils.

When the load on the low-voltage side increases, the electromotive force $E_H$ of the H coils increases. As this is attributable to the increased voltage decrease caused by the generator output impedance Z, control is carried out to increase the linkage magnetic flux $\phi_L$ so as to increase the electromotive force $E_L$ of the L coils and offset the voltage decrease. Therefore, the relationship between the voltage $E_H$ developed by the H coils and the rotation speed N becomes as shown in FIG. 48. Namely, beyond a given rotation speed, the voltage $E_H$ remains constant notwithstanding any further increase in the rotation speed.

Figure 49:
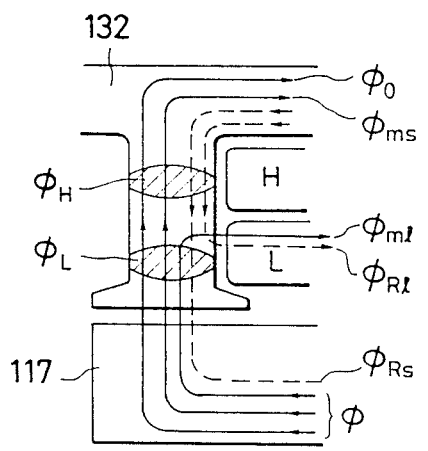
FIG. 49 is a magnified schematic view of a stator tooth portion in the vicinity of the N pole of the rotor, showing the magnetic flux distribution when load current flows through the high-voltage side coils and the low voltage side is load free.
Figure 50:
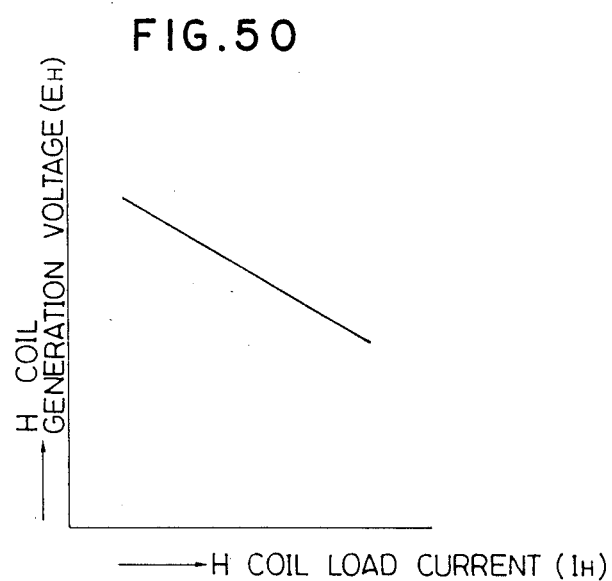
FIG. 50 is a graph showing load current vs generated voltage characteristics.

FIG. 49 relates to the case where the load current flows through the H coils and the L coils are load free. In this case, if the load on the H coils is increased with the rotation speed of the generator held constant, the L-coil linkage magnetic flux $\phi_L$ will be maintained constant by the regulator 80. However, since the H-coil linkage magnetic flux $\phi_H$ is reduced by that portion ($\phi_{ML}$) of the magnetic flux $\phi_{RL}$ leaking from the stator teeth and the magnetic flux supplied by the rotor which passes through the stator and returns to the rotor, the H-coil linkage magnetic flux $\phi_H$ will decrease with increasing load on the high-voltage side, resulting in a sharp decline in the electromotive force $E_H$. (FIG. 50)

Figure 51:
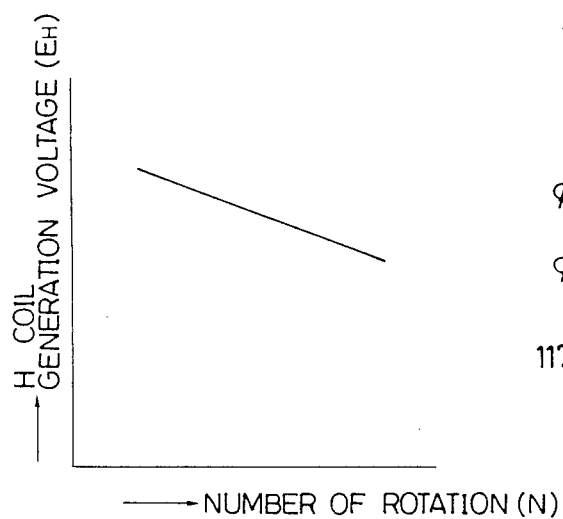
FIG. 51 is a graph showing rotation speed vs generated voltage characteristics under constant load condition.

Further, when the high-voltage side load is left unchanged and the rotation speed N is increased, it becomes necessary to reduce the linkage magnetic flux $\phi_L$ in order to maintain the low-voltage side electromotive force constant. As the magnetic flux $\phi_{RL}$, i.e. that portion of the magnetic flux $\phi_{RL}$ leaking from the stator teeth and the magnetic flux supplied by the rotor which passes through the stator and returns to the rotor, is unrelated to the rotation speed N, the reverse magnetic flux $\phi_{ML} + \phi_{RL}$ has to be subtracted from the declining linkage magnetic flux $\phi_L$. Therefore, the electromotive force $E_H$ on the high-voltage side declines with increasing rotation speed. (FIG. 51)

Figure 52:
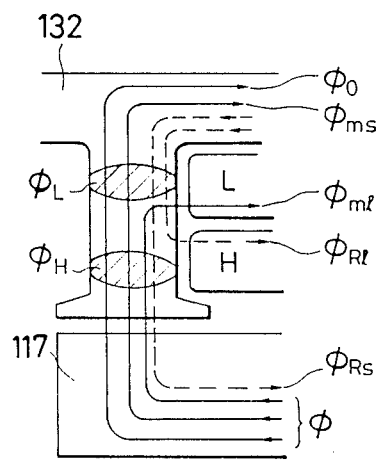
FIG. 52 is a magnified schematic view of a stator tooth portion in the vicinity of the N pole of the rotor, showing the magnetic flux distribution when the low-voltage side coil windings are disposed at the bottom of stator slots, the high-voltage side coil windings are disposed near the entrance of the slots, load current flows through the low-voltage side coils, and the high-voltage side coils are load free.

On the other hand, as shown in FIG. 52, when the low-voltage side L coils are disposed at the floor of the slots and the high-voltage side coils H are disposed near the entrance of the slots, then if the reverse magnetic flux caused by the L coils is defines as $\phi_R$, we have $$\phi_R = \phi_{RS} + \phi_{RL}$$

The magnetic flux $\phi_H$ intersecting the H coils is $$\phi_H = \phi_0 + \phi_{MS} + \phi_{ML} - \phi_{RS}$$

The magnetic flux $\phi_L$ intersecting the L coils is $$\phi_L = \phi_0 + \phi_{MS} - \phi_{RS} - \phi_{ML}$$

Thus the magnetic flux intersecting the H coils can be expressed as $$\phi_H = \phi_L + \phi_{ML} + \phi_{RL}$$

Figure 53:
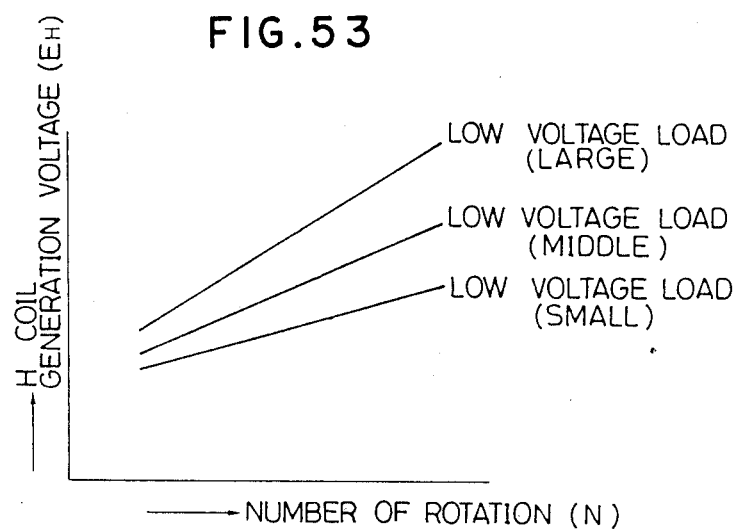
FIG. 53 is a graph showing the rotation speed vs generated voltage characteristics in the state illustrated in FIG. 52.

The magnetic flux intersecting the H coils thus includes not only the aforesaid magnetic flux $\phi_L$ required for the L coils to produce the constant electromotive force $E_H$ but also (a) the magnetic flux component $\phi_{ML}$ which is equal and opposite to the magnetic flux $\phi_{RS}$ that is the portion of the magnetic flux $\phi_{MS}$ supplied by the rotor for cancelling out the reverse magnetic flux $\phi_R$ that leaks between the H coils and the L coils, and the leakage component $\phi_{RL}$ of the magnetic flux $\phi_{RL}$ supplied by the rotor. These fluxes are independent of the rotation speed N. Therefore, with increasing rotation speed N, the H coils come to be intersected not only by $\phi_L$ but also by $\phi_{ML}+\phi_{RL}$ so that the electromotive force of the H coils increases with increasing rotation speed N. (FIG. 53)

Figure 54:
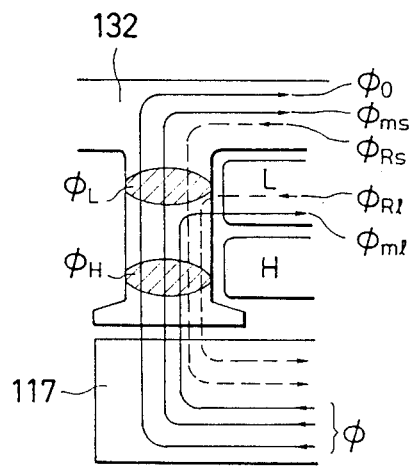
FIG. 54 is a magnified schematic view of a stator tooth portion in the vicinity of the N pole of the rotor, showing the magnetic flux distribution when load current flows through the high-voltage side coils and the low-voltage side is load free.

Moreover, as shown in FIG. 54, even when load current flows through the H coils (with the L coils in load-free condition), since it is necessary to maintain the electromotive force $E_L$ produced by the L coils constant, the magnetic flux $\phi_L$ intersecting the L coils will remain constant insofar as the rotation speed N is constant. Also, if the rotation speed is constant, then since the magnetic flux component $\phi_R(=\phi_{RS}+\phi_{RL})$ caused by the high-voltage side load current and the magnetic flux component $\phi_M(=\phi_{MS}+\phi_{ML})$ supplied by the rotor for cancelling out $\phi_R$ will cancel each other in the H coils, the magnetic flux $\phi_H$ intersecting the H coils will remain equal to the L-coil linkage flux $\phi_L$ irrespective of changes in the high-voltage side load current. The voltage $E_H$ produced by the H coils will thus remain constant. However, even though the voltage $E_H$ produced by the H coils remains constant, if the load current on the high-voltage side increases, the output voltage $V_1$ will decline because of the voltage reduction resulting from the output impedance Z of the H coils.

Therefore, it would be dangerous to dispose the H coils near the entrance of the slots since this would result in the generation of a large voltage on the high-voltage side should the rotation speed be increased with no load on the high-voltage side.

Further, it is the general practice to provide an automobile generator with ventilation holes, which makes it easy for rainwater, mud and the like to enter the generator together with the cooling air so that there is a danger of the coil insulation being degraded. A higher generated voltage thus increases the risk of an insulation breakdown. It also increases the risk of grave injury should a person touch an electrically conductive part of the generator by mistake.

That is to say, if H coils of the aforesaid type should be disposed near the entrance of the slots, a large and dangerous voltage will be generated on the high-voltage side when the rotation speed is increased with no load on the high-voltage side.

In view of the fact that the generator of this invention is intended for use in an automobile and will be operated over a wide range of rotation speeds which may extend to very high speeds, the H coils are disposed at the bottom of the slots.

The operation of the automobile generator 3b in accordance with this embodiment of the invention will now be explained.

When the ignition switch 79 has been turned on and the rotor having the field coil 14 is rotated by the engine, the stator will, in a relative sense, cut through the magnetic flux produced by the current passing through the filed coil 14. As the three coil pairs each consisting of one first (high-voltage) coil 13a and one second (low-voltage) coil 13b are disposed in the slots of the stator with the coils of each pair arranged one on top of the other, the first coils 13a and the second coils 13b will all cut through the same magnetic flux produced by the field coil 14 so that induced electromotive forces will arise in the respective coils.

One end of each second coil 13b is connected to the neutral C of a star connection and the other end thereof is connected to one end of one of the first coils 13a so that each pair of coils is in series connection. Thus a low-voltage three-phase ac output is obtained from connection points between the first and second coils 13a and 13b, and a high-voltage three-phase ac output is obtained from the opposite ends of the second coils 13b.

The automobile generator 3b of FIG. 44 simultaneously produces two voltages. Thus when a piece of electrical equipment designed to operate at, for example, 115 V is plugged into and operated from the outlet 19, charging of the battery 12 still continues. Thus there is no danger of the battery going dead.

Figure 55:
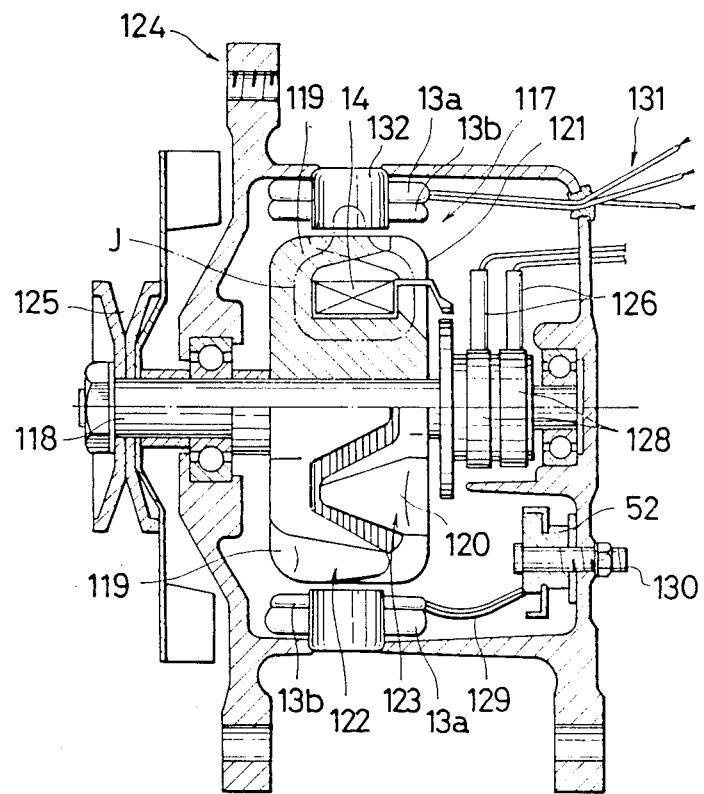
FIG. 55 is a sectional view showing the internal structure of a generator having a single pair of magnetic poles.

FIG. 55 shows the internal structure of dual-voltage automobile generator which, as explained in the foregoing, produces two different voltage outputs by using a single field coil 14 to induce electromotive forces in coil pairs each consisting of a first coil 13a and a second coil 13b wound one on top of the other in the same slots of the stator core.

The generator illustrated in FIG. 55 is one in accordance with the present invention which is provided with a rotor 117 having first pole pieces of one polarity (e.g. N polarity) and second pole pieces of the opposite polarity (S polarity) arranged alternately at appropriate intervals about its circumference and a stator 132 which faces radially inward in facing relationship with the rotor 117.

The rotor 117 is fixed on a rotating drive shaft 8 and has a plurality of first pole pieces 119 of a first polarity (for example, N polarity) and a plurality of second pole pieces 120 of the opposite polarity (S polarity) appropriately spaced alternately about its circumference. Between adjacent pole pieces 119 and 120, which are separated by an air gap, there are produced lines of force J running substantially in the circumferential direction.

The first and second pole pieces are respectively magnetized in the aforesaid polarities by dc current flowing through a field coil 14 wound on a core 121. For this purpose, the first pole pieces 119 are constituted as a unitary first comb-shaped pole structure 122 disposed on the axially outward side of the rotor 117 so as to be magnetically and mechanically coupled with the core 121, while similarly, the second pole pieces 120 are constituted as a unitary second comb-shaped pole structure 123 disposed on the opposite side of the rotor 117 so as to be magnetically and mechanically coupled with the core 121.

In other words, the rotor 117 is formed with a pair of comb-shaped pole structures 122, 123 of mutually opposite polarity disposed to face each other in the axial direction. The relationship between the comb-shaped pole structures 122 and 123 is such that each tooth (pole piece) 119 of the first comb-shaped pole structure 122 falls between two teeth (pole pieces) 120 of the second comb-shaped pole structure 12 and each tooth (pole piece) 120 of the second comb-shaped pole structure 123 falls between two teeth (pole pieces) 119 of the first comb-shaped pole structure 122. The two comb-shaped pole structures 122 and 123 are thus interdigitated.

As shown in FIG. 55, the so-constituted rotor 117 is housed in an appropriate casing 124 together with its drive shaft 118 and the stator 132 is disposed on the inner surface of the casing 124 so as to face radially inward in opposing relation to the rotor 117.

As explained earlier, stator 132 is constituted of three sets of coil pairs. Each pair consists of a first coil 13a and a second coil 13b which are wound one on top of the other in the same slots of the stator core. The coils 13a and 13b can be interconnected in the manner described earlier.

One end of the drive shaft 118 extends to the exterior of the casing 124 and has a pulley 125 fixed thereon. The pulley 125 is driven by a belt running between itself and a pulley (not shown) on the crankshaft of the automobile engine 2. Thus the rotation of the crankshaft at the time the engine 2 is running is transmitted to the drive shaft 118.

Excitation current is supplied to the field coil 14 from the automobile battery 12 via brushes 126 and slip rings 128, whereby the teeth-like pole pieces 119 and 120 are given N and S polarity, respectively.

Thus there are produced magnetic lines of force which, as shown by the closed loop in the figure, leave the first tooth-shaped pole pieces 119, cut through the first coils 13a and the second coils 13b, and then return to the core 121 via the other first pole pieces 119.

In this state, if the drive shaft 118 is rotated by power from the engine, the first and second coils 13a and 13b will, relatively speaking, cut through the magnetic lines of force J so that induced electromotive forces will be produced in the respective first and second coils 13a and 13b.

On the low-voltage side, this electric power is sent via wires 129 to a three-phase rectifier circuit 52 situated inside the casing 124 and, after rectification, is made available as battery charging voltage from a terminal 130. This output is also used as control voltage for field control, as explained earlier.

On the high-voltage side, the output is sent outside the generator via lead lines 131.

Figure 56:
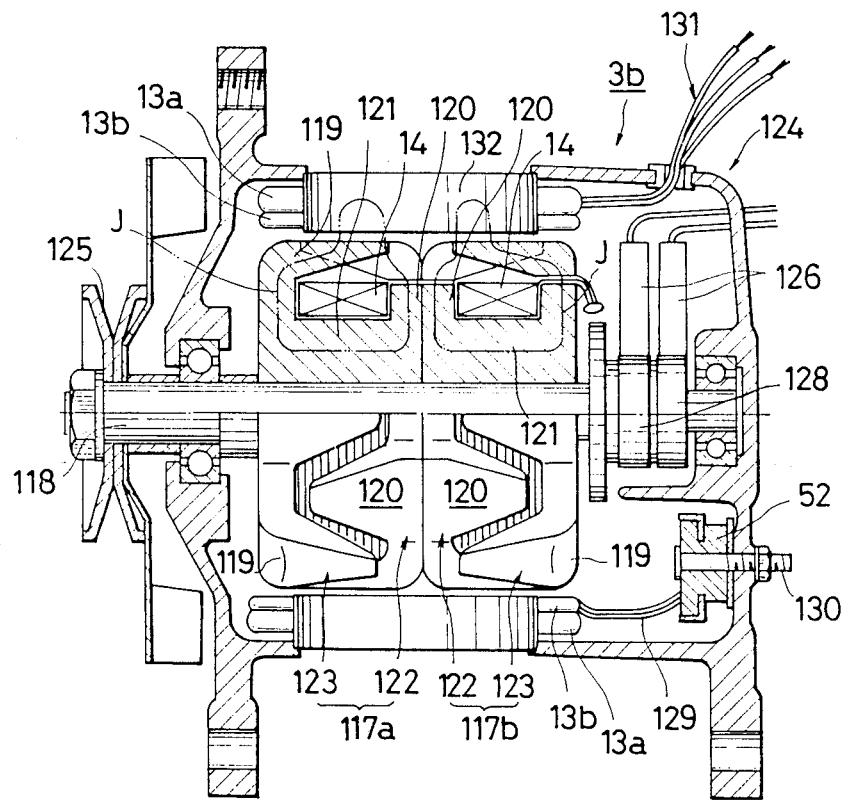
FIG. 56 is a sectional view showing the internal structure of a generator having two pairs of magnetic poles.

Another embodiment of the generator according to this invention is shown in FIG. 56. Differently from the generator shown in FIG. 55 which has only one pair of magnetic poles, the generator of FIG. 56 has two pairs. More specifically, the generator has a plurality (two in the illustrated embodiment) of rotors provided side by side on the same drive shaft and the relationship among the two rotors is such that the first (second) pole pieces of one are aligned with the first (second) pole pieces of the other. A single stator is provided to serve both rotors in common. The dual-voltage automobile generator shown in FIG. 56 employs the present invention in its structural arrangement.

Components of the generator shown in FIG. 56 which have the same function as those in the generator of FIG. 55 have been assigned like reference numerals and these components will not be explained further here.

As shown in FIG. 56, each of the rotors 117a, 117b used by the generator according to this embodiment is of identical structure to the rotor 117 shown in FIG. 55. These rotors 117a, 117b are fixed on the drive shaft 118 such that they are in back-to-back relationship in terms of polarity.

More specifically, presuming that the first comb-shaped pole structure 122 is of N polarity and the comb-shaped pole structure 123 is of S polarity and that the pole structures of the rotor 117a are, as viewed in the figure, disposed in the axial direction with the first comb-shaped pole structure 122 on the left and the second comb-shaped pole structure 123 on the right, then in the second rotor 117b situated axially to the right of the first rotor 117a the second comb-shaped pole structure 123 will be on the left and the first comb-shaped pole structure 122 will be on the right. However, in this connection it should of course be noted that in a generator of the illustrated type wherein the magnetic field is produced by supplying excitation current, the aforesaid polarity relationship will be produced when current flows through the field coils 14, 14 in mutually opposite directions and that where there are two or more of the field coils 14, their windings are, as was explained early, connected in parallel if it is desired to supply them with current as if they constituted a single circuit.

Further, the N pole pieces 119 of the rotor 117a are aligned in the circumferential direction with the N pole pieces 119 of the rotor 117b and the S pole pieces 120 of the rotor 117a are aligned in the circumferential direction with S pole pieces 120 of the rotor 117b.

Therefore, particularly in the case illustrated in FIG. 56, the S pole pieces 120 of the two rotors are in perfect back-to-back relation. Thus these pole pieces repel each other and neither is able to absorb magnetic force from the other. This means that the magnetic lines of force J produced by one of the rotors will not leak to the other rotor and that the lines of force J, J produced by the respective rotors will not interfere and cancel each other.

The rotors 117a, 117b disposed with respect to each other as described above are, as shown in FIG. 56, housed in the same casing 124 together with the drive shaft 118.

A single stator 132 is provided to oppose both of the rotors 117a, 117b arranged back to back in this way.

It is understood, of course, that similarly to what was explained earlier, this stator 132 has three pairs of coils each consisting of a first coil 13a and a second coil 13b, which two coils are wound one on top of the other in the same slots of a stator core.

The generator produces two outputs of different voltage.

The field coils 14, 14 of the rotors 117a, 117b are connected so as to constitute a single circuit which will be referred to as the field coil 14 and, similarly to the case of the generator of FIG. 55, the field coil 14 is supplied with dc current from outside via brushes 126 and slip rings 128, whereby the magnetic lines of force J, J are produced.

The stator coils 13a, 13b of the stator 132 thus cut through the sum of the magnetic lines of force produced by the rotors 117a, 117b and as a result proportionally stronger electric outputs are produced thereby.

Similarly to the case of the generator of FIG. 55, the induced ac electric power produced in this way is, on the low-voltage side, made available to the outside via wires 129, a rectifier circuit 52 and a terminal 130, and on the high-voltage side, made available to the outside via lead lines 131.

The voltages extracted in this way are respectively used for charging the battery and for producing a supply of 115 V ac power.

In the aforesaid embodiment, the low-voltage side coils and the high-voltage side coils can, if desired, be electrically insulated from each other.

As explained in the foregoing, since in the above-described generator according to the invention, the two different voltages are obtained by providing the windings of the high-voltage side coils at the bottom of the slots in the stator core and providing the windings of the low-voltage side coils near the entrance to the same slots, it not only becomes possible to obtain two voltages at the same time but also to provide a generator which is extremely safe since there is no risk of the high-voltage side coils producing a higher than rated voltage which might lead to coil burnout or to serious personal injury if someone should touch the high-voltage side lead lines.

Another embodiment of the generator 3b will now be described.

Figure 57:
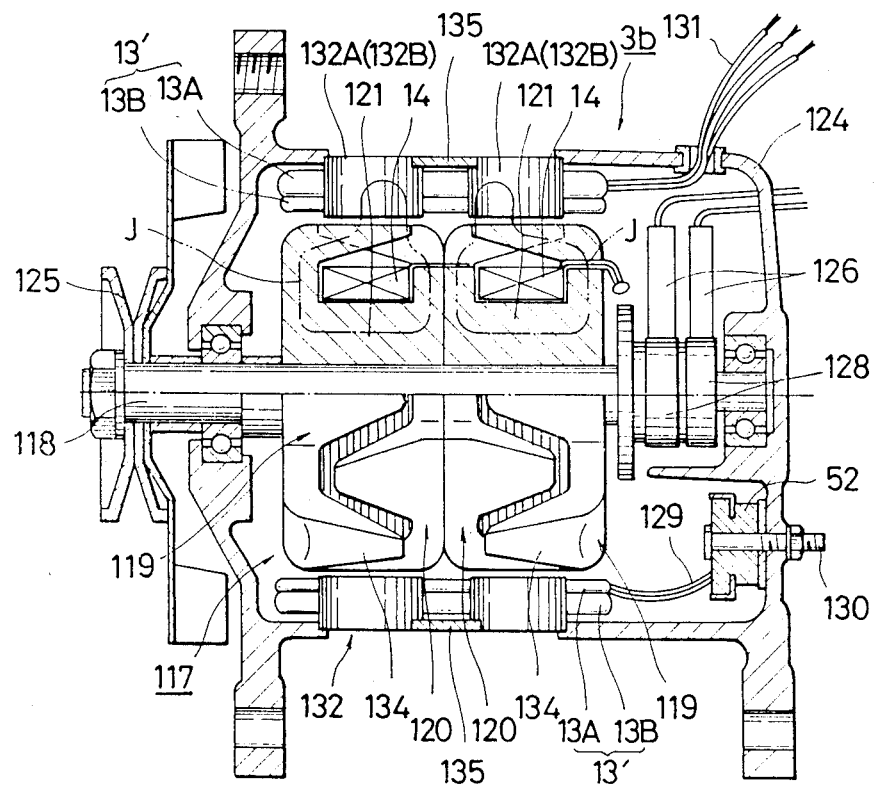
FIG. 57 is a sectional view showing the internal structure of another embodiment of the generator according to this invention.

Referring to FIG. 57, the generator 3b according to this embodiment has a rotor 117 supported within a casing 124 to be freely rotatable and a stator 132 which faces the rotor 117 across a minute gap.

The rotor 117 is constituted of a pair of magnetic field members 134 disposed side by side in the axial direction of the rotor 117. Each magnetic field members 134 is constituted of a plurality of first pole pieces 119' of one polarity (for example, N polarity) and a plurality of second pole pieces 120' of the other polarity (S polarity) appropriately space alternately about its circumference, thereby to form a first pole piece group 119 and a second pole piece group 120. The pole pieces 119' and 120' of each of the first and second pole piece groups are disposed interdigitally so that the overall arrangement is that of two interdigitated comb-shape pole structures. For each magnetic field member 13 there is provided a field coil 14 wound on a core 121, and the aforesaid polarity relationship is obtained by passing direct current in mutually opposite directions through these coils. For this purpose, each of the pole piece groups 119 and 120 is unified into a single body by the first pole pieces 119' and the second pole pieces 120' being connected together on their respective axially outward sides, and is magnetically and mechanically coupled with the core 121.

Figure 58:
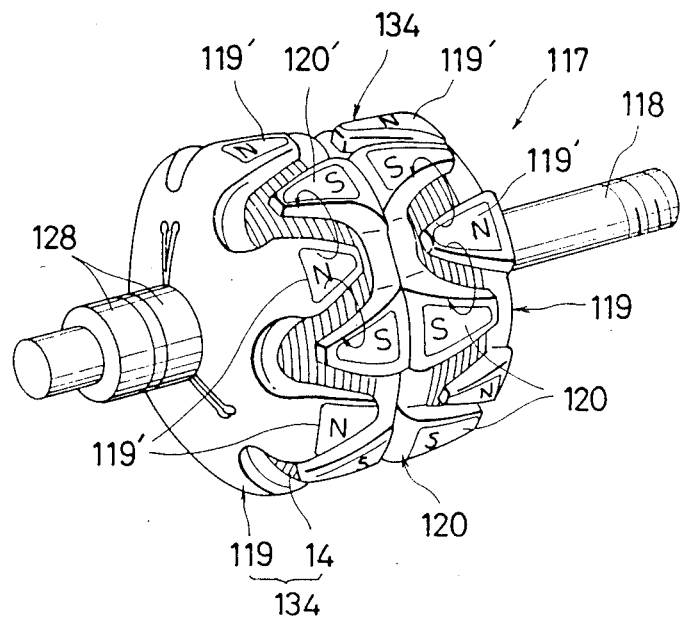
FIG. 58 is a perspective view of the rotor of the generator of FIG. 57.

In this generator 3b, two magnetic field members 134, 134 of the aforesaid structure are disposed side by side in the axial direction to constitute the rotor 117. More specifically, as shown in FIG. 58, the two magnetic field members 134 of the aforesaid structure are fixed on a drive shaft 118 in such manner that the pole piece groups in abutment are of the same polarity (S pole to S pole in the illustrated embodiment). As a result, the phase of the magnetic lines of force J are opposite between the two magnetic field members 134.

When the pole pieces 120' (or alternatively, 119') of the respective magnetic field members 134 are arranged back-to-back in the aforesaid manner, the magnetic lines of force of the respective magnetic field members 134 repel each other in the axial direction, so that there is no magnetic leakage in either direction and no problem of the lines of force canceling each other. Thus, close coupling of the magnetic field members 134 becomes possible and the magnetic density can be increased to enhance the generation efficiency.

On the other hand, the stator 132 associated with the rotor 117 has two armatures 132A each associated with one of the magnetic field members 134. Each armature 132A has an iron armature core 132B having slots in which, as the armature coils 13', there are wound first coils 13A and second coils 13B. As was mentioned earlier, the first coils 13A on the high-voltage side are disposed at the bottom of the slots, i.e. further from the rotor 117, whereby change in voltage output with change in rotational speed is minimize, facilitating voltage control and also enhancing safety.

Moreover, the outer layers of the armatures 132A are interconnected by a connector ring 135, thereby to constitute a stator 132 of unitary structure. The connector ring 135 can be constituted of either a magnetic or a non-magnetic material. The reason for this is that it is the nature of the magnetic lines of force J cutting across the armature coils 13', namely the first coils 13A and the second coils 13B, to return to the opposing pole piece 119' or 120' via the shortest distance so that no effect of the iron armature cores 132B occurs between the armatures 132A. When the stator 132 is constituted in this way, it becomes possible to eliminate a portion of the iron armature cores 132B so that the weight of the armatures A can be reduced and leakage of magnetic flux to the adjacent armature 132A can be prevented. Also, the gap existing between the armatures 132A serves to promote cooling of the first coils 13A and the second coils 13B.

Figure 59:
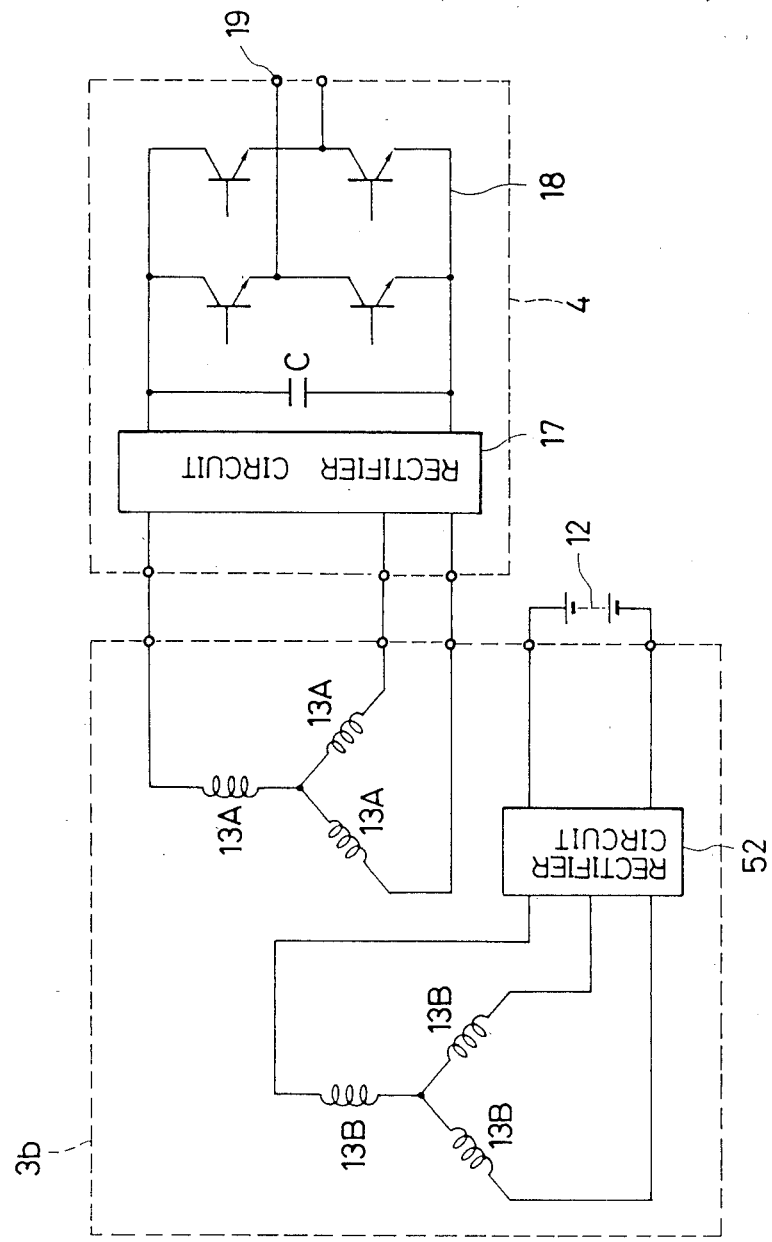
FIG. 59 is a circuit diagram of the generator of FIG. 57.
Figure 60:
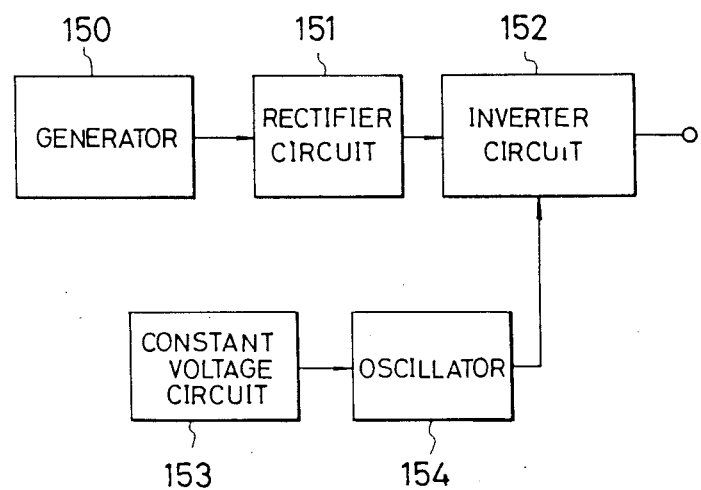
FIG. 60 is a block diagram of a conventional internal combustion engine-driven generator.

As shown in FIG. 59, three first coils 13A and three second coils 13B are respectively connected in three-phase star configuration and are wound in parallel as insulated from each other. The number of windings of each type of coil is set such that the first coils 13A will produce a high voltage and the second coils 13B will produce a low voltage. (It should be noted that the field coil 14 and the smoothing circuit have been omitted from the circuit in FIG. 59.)

The low voltage induced in the second coils 13B is rectified by a rectifier circuit 52 and is then used for charging the battery and other such purposes associated with the operation of the automobile. On the other hand, the high voltage induced in the first coils 13A is first rectified by a rectifier circuit 17 and then supplied to an inverter unit 4 where it is converted into ac line power of 115 V which can be used for operating ordinary electric appliances and the like. It is noted that while it is alternatively possible to dispose the coils 13A and 13B in delta connection, it is preferable for them to be connected in parallel. This is because one side of the inverter output is grounded so that series connection of the first coils 13A and the second coils 13B would increase the chance of short-circuiting. While it is possible to provide means for preventing short-circuiting, adequate protection cannot be expected since any earth current that arises would be high frequency current. The above-describe arrangement is therefore best used from the point of safety More specifically, where the first coils 13A and the second coils 13B are insulated and connected in parallel, it is not as dangerous for someone to touch the load because the earth current which flows in this case would have a 60 Hz square waveform corresponding to commercial ac line power regardless of the rotating speed of the generator 3b so that the circuit breaker provided in the circuit would maintain its sensitivity and operate effectively. Moreover, even if damage to the insulation should result in a complete short to ground or the like, the switching transistors in the invertor 18 will turn off, cutting of the power on the output side. Moreover, when the switching transistors turn off, no more earth current can flow, which protects the first coils 13A from burnout. On the other hand, when the first coils 13A and the second coils 13B are connected in series, there is a danger that earth current will flow through the low-voltage side rectifier circuit 52 and the battery 12, burning out the rectifier diodes and/or the coils and making it impossible to operate the automobile.

In the generator 3b of the structure described above, the rotor 117 is rotated by rotating power from the engine 2 transmitted to a pulley 125 on one end of the drive shaft 118 via a belt or other power transmission means, while at the same time current is supplied to the field coil 14 via slip rings 128. As a result, the pole pieces 119' and 120' are magnetized and caused to produce magnetic lines of force J so that induced electromotive forces are produced in the first coils 13A and the second coils 13B as they cut through the magnetic lines of force J. The electromotive force produced in the low-voltage coils 13B on the low-voltage side is supplied to the exterior of the casing 124 via the wires 129, the rectifier circuit 52 and the terminal 130, while the electromotive force produced in the high-voltage coils 13A is supplied to the high-voltage rectifier circuit 17 located outside the casing 124 and after being rectified is supplied to the invertor 18 which converts it into ac line power.

Thus in accordance with the embodiment of the invention shown in FIG. 57, the generator includes a rotor having two magnetic field members each comprising a plurality of pole pieces magnetized by a field coil in one polarity and a plurality of pole pieces magnetized by the field coil in the opposite polarity appropriately spaced alternately about its circumference with the magnetic field members being disposed in back-to-back relation in the axial direction of said rotor, and further includes a stator disposed around the rotor to face the field members across a minute gap, which stator has two armatures connected with each other in the axial direction by a connector ring. As a result of this structure, the generator can be reduced in weight to make it ideal for installation in an automobile. Moreover, since the generator uses a split stator the alternator coils can be directly cooled and thus are safe from accumulation of excessive heat, which enables suppression of the temperature of the generator as a whole. Moreover, since in the present embodiment, the coils are connected in parallel, it is possible to provide effective protective measures against current leakage and coil burnout thus ensuring that the automobile will not be made inoperable by such a cause. The generator is therefore very safe and has high practical value.

The overall arrangement of the automobile generator apparatus according to this invention has been explained in detail in the foregoing in accordance with its various features. In accordance with present invention, since, irrespective of the mode of operation of the automobile, it is possible to obtain a stable and high-quality ac line power output using the automobile engine 2 as the source of motive power, the automobile generator apparatus according to this invention has a wide range of applications—during emergency situations, at work sites and for leisure activities.

While the invention has been explained with respect to specific embodiments shown in the drawings, it is not limited to these embodiments and can be worked in any of various other ways falling within the scope of the appended claims.

What is claimed is:

1. An automobile generator apparatus comprising:
   a single-shaft, dual-output type generator including a stator having slots, a rotor disposed inside said stator and driven by an engine of an automobile, a high-voltage coil and a low-voltage coil disposed within each of said slots, a field coil wound on said rotor for producing a magnetic field acting on said high-voltage coil and low-voltage coil to obtain a high-voltage output from an output terminal of said high-voltage coil and a low-voltage output from an output terminal of said low-voltage coil, and a first rectifier circuit connected to said output terminal of said low-voltage coil;
   a battery connected to said output terminal of said low-voltage coil and connected in parallel to electric equipment of the automobile for serving as an electric power source and supplying field current to said generator;
   a second rectifier circuit connected to said output terminal of said high-voltage coil for converting high AC voltage generated by said generator into DC voltage;
   a constant voltage stabilization circuit connected to an output side of said second rectifier circuit for adjusting DC voltage output from said second rectifier circuit to a constant value;
   an inverter unit connected to an output side of said constant voltage stabilization circuit and provided with an outlet into which a load is plugged, for converting DC voltage output from said constant voltage stabilization circuit into AC voltage having a household frequency; and
   a controller unit for supplying control field current to said generator in order to adjust low voltage output from said generator to a constant value on the basis of a low-voltage signal output from said generator.

2. An apparatus according to claim 1, further comprising:
   an ignition coil for supplying electricity to a spark plug of the engine and an engine speed detection signal to said controller unit;
   a current sensor interposed between said generator and said inverter unit for detecting load current of said inverter unit and supplying a signal of the detected load current to said controller unit; and
   an accelerator actuator driven in accordance with a drive signal output from said controller on the basis of the detected load current signal from said current sensor and engine speed detection signal from said ignition coil for adjusting an accelerator system of the engine and optionally controlling the engine speed.

3. An apparatus according to claim 2, wherein said accelerator actuator has an operator detachably mounted on a mounted provided in the vicinity of an accelerator pedal disposed at a driver's seat of the automobile for controlling the engine speed, said operator being sued for operating the accelerator pedal when generating electricity with the automobile stopped.

4. An apparatus according to claim 3, further comprising a base member provided above said accelerator pedal, and an arm provided on a free end thereof with said accelerator actuator and rotatably fixed to said base member for lowering said accelerator actuator onto the accelerator pedal when generating electricity with the automobile stopped and raising said accelerator actuator above the accelerator pedal when generating electricity with the automobile driven.

5. An apparatus according to claim 4, wherein said arm is provided with a lock mechanism for keeping said accelerator actuator lowered onto and raised above the accelerator pedal.

6. An apparatus according to claim 1,
   wherein said inverter unit includes a first series circuit constituted of first and second switching elements, a second series circuit constituted of third and fourth switching elements, said first series circuit and second series circuit being connected in parallel between the terminals of a DC power source on an output side of said inverter unit, a load inserted between the point of connection of said first and second switching elements and the point of connection of said third and fourth elements and the point of connection of said third and fourth switching elements, and diodes each connected in parallel to each of said first to fourth switching elements, said inverter unit being driven in the manner of a single-phase inverter by repeating a unit cycle at a predetermined frequency, said unit cycle being defined by occurrence in order of a first conduction period, a rest period, a second conduction period and a rest period, said first conduction period being established by turning on said first and fourth switching elements to form a first closed circuit from the plus terminal of said DC power source through said first switching element, load and fourth switching element to the minus terminal of said DC power source, said second conduction period being established by turning on said second and third switching elements to form a second closed circuit from the plus terminal of said DC power source through said second switching element, load and third switching element to the minus terminal of said DC power source, said rest periods being each established so that none of said first and second closed circuits is formed during said rest period, said second and fourth switching elements or said first and third switching elements being on during said rest period.

7. An apparatus according to claim 2, wherein said inverter unit includes a first series circuit constituted of first and second switching elements, a second series circuit constituted of third and fourth switching elements, said first series circuit and second series circuit being connected in parallel between the terminals of a DC power source on an output side of said inverter unit, a load inserted between the point of connection of said first and second switching elements and the point of connection of said third and fourth switching elements, and diodes each connected in parallel to each of said first to fourth switching elements, said inverter unit being driven in the manner of a single-phase inverter by repeating a unit cycle at a predetermined frequency, said unit cycle being defined by occurrence in order of a first conduction period, a rest period, a second conduction period and a rest period, said first conduction period being established by turning on said first and fourth switching elements to form a first closed circuit from the plus terminal of said DC power source through said first switching element, load and fourth switching element to the minus terminal of said DC power source, said second conduction period being established by turning on said second and third switching elements to form a second closed circuit from the plus terminal of said DC power source through said second switching element, load and third switching element to the minus terminal of said DC power source, said rest periods being each established so that none of said first and second closed circuits is formed during said rest period, said second and fourth switching elements or said first and third switching elements being on during said rest period.

8. An apparatus according to claim 6, wherein said inverter unit is provided therein with a waveform signal generating portion capable of generating a signal for missing central portions of squarewaves of the voltage output from said inverter unit when an excessively large current flows temporarily through said load.

9. An apparatus according to claim 7, wherein said inverter unit is provided therein with a waveform signal generating portion capable of generating a signal for missing central portions of squarewaves of the voltage output from said inverter unit when an excessively large current flows temporarily through said load.

10. An apparatus according to claim 1, wherein said controller unit is provided with a regulator which directly detects a value of low current through the output terminal of said low-voltage coil or detects the low current value indirectly from a value of high voltage appearing at the output terminal of said high-voltage coil and varying in proportion to the low current value; said regulator serving to detect and monitor a value of low voltage appearing at the output terminal of said low-voltage coil and control the current supplied to said field coil to maintain the low voltage value constant up to the time that the detected low current value exceeds a prescribed level and, from the time that the detected low current value exceeds the prescribed value, serving to detect and monitor the high voltage value and control the current supplied to said field coil to maintain the high voltage value constant.

11. An apparatus according to claim 2, wherein said controller unit is provided with a regulator which directly detects a value of low current through the output terminal of said low-voltage coil or detects the low current value indirectly from a value of high voltage appearing at the output terminal of said high-voltage coil and varying in proportion to the low current value; said regulator serving to detect and monitor a value of low voltage appearing at the output terminal of said low-voltage coil and control the current supplied to said field coil to maintain the low voltage value constant up to the time that the detected low current value exceeds a prescribed level and, from the time that the detected low current value exceeds the prescribed value, serving to detect and monitor the high voltage value and control the current supplied to said field coil to maintain the high voltage value constant.

12. An apparatus according to claim 1, wherein said high-voltage coil and said low-voltage coil are disposed within said slot of said stator so that a position of said high-voltage coil is more apart from said rotor than a position of said low-voltage coil.

13. An apparatus according to claim 2, wherein said high-voltage coil and said low-voltage coil are disposed within said slot of said stator so that a position of said high-voltage coil is more apart from said rotor than a position of said low-voltage coil.

14. An apparatus according to claim 1, wherein said constant voltage stabilization circuit includes a switching transistor.

15. An apparatus according to claim 2, wherein said constant voltage stabilization circuit includes a switching transistor.

16. An apparatus according to claim 10, further comprising:

a control transistor mounted on said regulator and connected in series to said field coil for controlling the field current of said field coil;

a shorting circuit mounted on said regulator and connected in parallel to said field coil; and a control circuit mounted on said regulator for outputting an excessive voltage signal to said shorting circuit when the voltage detected at the output terminal of said low-voltage coil reaches an excessively high level to establish a short circuit between the opposite ends of said field coil and deliberately destroy said control transistor.

17. An apparatus according to claim 11, further comprising:

a control transistor mounted on said regulator and connected in series to said field coil for controlling the field current of said field coil;

a shorting circuit mounted on said regulator and connected in parallel to said field coil; and a control circuit mounted on said regulator for outputting an excessive voltage signal to said shorting circuit when the voltage detected at the output terminal of said low-voltage coil reaches an excessively high level to establish a short circuit between the opposite ends of said field coil and deliberately destroy said control transistor.

18. An apparatus according to claim 10, wherein said rotor has a plurality of N and S pole pieces appropriately spaced alternately in the circumference direction thereof and comprises two field members axially aligned in back-to-back relation and each constituted of a plurality of N and S pole pieces appropriately spaced alternately in the circumferential direction; said stator surrounds said rotor so as to face said stator across a slight gap and comprises two armatures disposed to face said field members across a slight gap, connected in the axial direction by a connector ring and provided therein with said high-voltage coil and said low-voltage coil.

19. An apparatus according to claim 11, wherein said rotor has a plurality of N and S pole pieces appropriately spaced alternately in the circumference direction thereof and comprises two field members axially aligned in back-to-back relation and each constituted of a plurality of N and S pole pieces appropriately spaced alternately in the circumferential direction; said stator surrounds said rotor so as to face said stator across a slight gap and comprises two armatures disposed to face said field members across a slight gap, connected in the axial direction by a connector ring and provided therein with said high-voltage coil and said low-voltage coil.

20. An apparatus according to claim 1, wherein said inverter unit is disposed in a control output unit of the automobile in which there are provided an internal frequency control unit which generates a control signal for converting the output generated by said generator into an output having a frequency of household AC line power and supplies said control signal to said inverter unit, a multipolar connector which is provided therein with an external frequency control unit and into which a synchronized operation adapted cord connector capable of being electrically connected to control output units of a plurality of different automobiles is plugged, and switch means for switching said control signal of said internal frequency control unit into a control signal from said external frequency control unit when said cord connector is plugged into said multipolar connector and supplying said control signal of said external frequency control unit into said inverter unit.

21. An apparatus according to claim 2, wherein said inverter unit is disposed in a control output unit of the automobile in which there are provided an internal frequency control unit which generates a control signal for converting the output generated by said generator into an output having a frequency of household AC line power and supplied said control signal to said inverter unit, a multipolar connector which is provided therein with an external frequency control unit and into which a synchronized operation adapted cord connector capable of being electrically connected to control output units of a plurality of different automobiles is plugged, and switch means for switching said control signal of said internal frequency control unit into a control signal from said external frequency control unit when said cord connector is plugged into said multipolar connector and supplying said control signal of said external frequency control unit into said inverter unit.

* * * * *